(12) United States Patent
Lee et al.

(10) Patent No.: US 8,761,098 B2
(45) Date of Patent: Jun. 24, 2014

(54) METHOD FOR TRANSMITTING PILOT SYMBOLS IN DOWNLINK MULTIPLE-INPUT MULTIPLE-OUTPUT SYSTEM

(75) Inventors: Moon Il Lee, Anyang-si (KR); Jaho Koo, Anyang-si (KR); Hyunsoo Ko, Anyang-si (KR); Jae Hoon Chung, Anyang-si (KR); Bin Chul Ihm, Anyang-si (KR); Yeong Hyeon Kwon, Anyang-si (KR)

(73) Assignee: LG Electronics Inc., Seoul (KR)

(*) Notice: Subject to any disclaimer, the term of this patent is extended or adjusted under 35 U.S.C. 154(b) by 362 days.

(21) Appl. No.: 13/139,719

(22) PCT Filed: Dec. 3, 2009

(86) PCT No.: PCT/KR2009/007190
§ 371 (c)(1),
(2), (4) Date: Jul. 27, 2011

(87) PCT Pub. No.: WO2010/071311
PCT Pub. Date: Jun. 24, 2010

(65) Prior Publication Data
US 2011/0274067 A1    Nov. 10, 2011

Related U.S. Application Data

(60) Provisional application No. 61/122,416, filed on Dec. 15, 2008.

(30) Foreign Application Priority Data

Sep. 8, 2009    (KR) .................. 10-2009-0084444

(51) Int. Cl.
*H04W 72/04* (2009.01)
(52) U.S. Cl.
USPC ...................................... 370/329; 455/452.1

(58) Field of Classification Search
CPC .................................................. H04W 72/048
See application file for complete search history.

(56) References Cited

U.S. PATENT DOCUMENTS

2007/0293172 A1* 12/2007 Shi et al. ................ 455/187.1
2009/0016312 A1*  1/2009 Tao et al. ................... 370/344
2011/0134867 A1*  6/2011 Lee et al. ................... 370/329

FOREIGN PATENT DOCUMENTS

KR   1020020026475      4/2002
KR   1020040032985      4/2004
KR   1020080036115      4/2008

* cited by examiner

*Primary Examiner* — Jianye Wu
(74) *Attorney, Agent, or Firm* — Lee, Hong, Degerman, Kang & Waimey

(57) ABSTRACT

The present invention relates to a method for transmitting pilot signals in a downlink multiple-input multi-output (MIMO) system which supports a first user equipment (UE) for supporting an N number of transmitter antennas from among a total M number of transmitter antennas, and a second UE for supporting said M (wherein, M>N) number of transmitter antennas. The method comprises the steps of: enabling a base station to map pilot symbols in a resource block (RB) on a subframe for transmitting user-specific pilot symbols which can be recognized only by the second UE; and enabling the base station to transmit the subframe in which the pilot symbols are mapped. The cell-specific pilot symbols for transmitter antenna port 0 to N−1, which can be recognized by both the first UE and the second UE, and the user specific pilot symbols for transmitter antenna ports N to M−1, which can be recognized only by the second UE, are mapped in the allocated resource block.

18 Claims, 59 Drawing Sheets

Antenna port 5

Antenna port 5

US 8,761,098 B2

METHOD FOR TRANSMITTING PILOT SYMBOLS IN DOWNLINK MULTIPLE-INPUT MULTIPLE-OUTPUT SYSTEM

This application is the National Stage filing under 35 U.S.C. 371 of International Application No. PCT/KR2009/007190, filed on Dec. 3, 2009, which claims the benefit of earlier filing date and right of priority to Korean Patent Application No. 10-2009-0084444, filed on Sep. 8, 2009, and also claims the benefit of U.S. Provisional Application Ser. No. 61/122,416, filed on Dec. 15, 2008, the contents of which are all hereby incorporated by reference herein in their entirety.

FIELD OF THE INVENTION

The present invention relates to a method for efficiently providing a pilot symbol in an environment where an antenna is added to a conventional system, in a multiple-input multiple-output (MIMO) communication system.

BACKGROUND ART

LTE Physical Structure

A 3GPP (3$^{rd}$ Generation Project Partnership) LTE (Long Term Evolution) supports a type 1 Radio Frame Structure that is applicable to an FDD (Frequency Division Duplex) and a type 2 Radio Frame Structure that is applicable to a TDD (Time Division Duplex).

FIG. 1 illustrates the structure of a type 1 radio frame. The type 1 radio frame consists of 10 subframes, and each subframe consists of 2 Slots.

FIG. 2 illustrates the structure of a type 2 radio frame. The type 2 radio frame consists of 2 half frames, and each half frame consists of 5 subframes, a DwPTS (Downlink Pilot Time Slot), a Guard Period (GP), and an UpPTS (Uplink Pilot Time Slot). Herein, one subframe consists of 2 slots. The DwPTS is used for initial cell search, synchronization, or channel estimation performed by a user equipment. The UpPTS is used for channel estimation performed by a base station and for uplink transmission synchronization performed by the user equipment. The guard period corresponds to a period for eliminating interference occurring in an uplink due to a multiple path delay of a downlink signal between an uplink and a downlink. More specifically, regardless of the type of the radio frame, one frame is configured of 2 slots.

FIG. 3 illustrates a slot structure of an LTE downlink. As shown in FIG. 3, a signal being transmitted from each slot may be expressed by a Resource Grid, which consists of $N_{RB}^{DL}N_{SC}^{RB}$ number of subcarriers and $N_{symb}^{DL}$ number of OFDM (Orthogonal Frequency Division Multiplexing) symbols. Herein, $N_{RB}^{DL}$ represents a number of Resource Blocks (RBs) within a downlink, $N_{SC}^{RB}$ represents a number of subcarriers configuring one RB, $N_{symb}^{DL}$ and represents a number of OFDM symbols included in a downlink slot.

FIG. 4 illustrates a slot structure of an LTE uplink. As shown in FIG. 8, a signal being transmitted from each slot may be expressed by a Resource Grid, which consists of $N_{RB}^{UL}N_{SC}^{RB}$ number of subcarriers and $N_{symb}^{UL}$ number of OFDM (Orthogonal Frequency Division Multiplexing) symbols. Herein, $N_{RB}^{UL}$ represents a number of Resource Blocks (RBs) within an uplink, $N_{SC}^{RB}$ represents a number of subcarriers configuring one RB, and $N_{symb}^{UL}$ represents a number of OFDM symbols included in an uplink slot.

A Resource Element is a resource unit that is defined by indexes (a, b) within the downlink slot and the uplink slot. Herein, "a" indicates an index within a frequency axis, and "b" represents an index within a time axis.

FIG. 5 illustrates the structure of a downlink subframe. Referring to FIG. 5, in a subframe, a maximum of 3 OFDM symbols located at the beginning of a first slot correspond to a control region allocated to control channel(s). The remaining OFDM symbols correspond to a data region allocated to Physical Downlink Shared Channel(s) (PDSCH(s)). Examples of a downlink control channel used by a 3GPP LTE may include a PCFICH (Physical Control Format Indicator Channel), a PDCCH (Physical Downlink Control Channel), a PHICH (Physical Hybrid ARQ Indicator Channel), and so on.

Definition of the Multiple-Input Multiple-Output (MIMO) Technology

As an abbreviation for Multiple-Input Multiple-Output, MIMO refers to a method evolved from the conventional method of using only one transmit antenna and only one receive antenna, wherein the method can enhance transmission and reception data efficiency by adopting multiple transmit antennas and multiple receive antennas. More specifically, this corresponds to a technology that can increase the capacity or enhance the performance by using multiple antennas in a transmitter or a receiver of a wireless communication system. Hereinafter, the term MIMO will be referred to as multiple antennas.

A multiple antenna technology refers to an application of the technology of completing a message by gathering (or collecting) a plurality of data segments received from multiple antennas without relying on a single antenna path in order to receive the message. Instead, the MIMO technique may combine a plurality of data segments that is received through a plurality of antennas, thereby receiving the entire data. Since the multiple antennas technology may enhance data transmission rate (or speed) within a specific range or increase the system range with respect to a specific data transmission rate (or speed), the multiple antennas technology corresponds to a next generation mobile communication technology that can be broadly used in mobile communication terminals and relay stations. This technology is being highly recognized as a promising next generation technology that can overcome the problem of limited transmission amount in mobile communication.

FIG. 6 illustrates a block view showing the structure of a general multiple antennas (MIMO) communication system. As shown in FIG. 6, if the number of transmit antennas is increased to $N_T$ and the number of receive antennas is increased to $N_R$ at the same time, unlike in the case wherein multiple antennas are used only in the transmitter or the receiver, a logical channel transmission capacity increases in proportion with the number of antennas. Therefore, the transmission rate may be enhanced, and the frequency efficiency may be drastically enhanced. The transmission rate respective to the increase in the channel transmission capacity may be increased as much as a value of a maximum transmission rate ($R_o$) multiplied by a rate increase ratio ($R_i$) when logically using a single antenna.

$$R_i = \min(N_T, N_R) \qquad \text{Equation 1}$$

For example, a MIMO communications system using 4 transmit antennas and 4 receive antennas may theoretically gain a transmission rate 4 times greater than that of a single antenna system. After the theoretical capacity increase of such multi antennas system has been proven in the mid 90s, diverse technologies for realizing a substantial enhancement in the data transmission rate is still under active research and development. Moreover, some of the technologies are already being reflected and applied in diverse standards in wireless communication, such as the 3$^{rd}$ generation mobile communications, the next generation wireless LAN, and so on.

Referring to the trend in the many researches on multi antennas up to the most recent research, research and development on a wide range of perspectives have been actively carried out, wherein the fields of research include research in the aspect of information theory associated with multi antennas communication capacity calculation, research in wireless (or radio) channel measurement and drawing out models, research in time-spatial signal processing technology for enhancing transmission reliability and enhancing transmission rate, and so on, in diverse channel environments and multiple access environments.

Channel Estimation

In a wireless communication system environment, due to a multiple path time delay, fading may occur. Herein, the process of compensating for any distortion occurring in a signal due to an abrupt change in the environment caused by such fading and of recovering the transmitted signal is referred to as channel estimation. Generally, in order to perform such channel estimation, channel estimation is performed by using a signal that is mutually known by the transmitting end and the receiving end. A signal that is mutually known by the transmitting end and the receiving end is referred to as a pilot signal or a reference signal (hereinafter referred to as RS).

In a wireless communication system using an orthogonal frequency division transmission method, there exist a method of allocating a reference signal to all subcarriers and a method of allocating a reference signal in-between data subcarriers.

In order to gain the channel estimation performance, a symbol configured only of reference signals, such as preamble signals is used. Generally, when using such symbol, since the reference signal density is high, the channel estimation performance may be enhanced as compared to the method of allocating a reference signal in-between data subcarriers. However, in this case, since the transmission amount of data decreases, the method of allocating a reference signal in-between data subcarriers is used in order to increase the data transmission amount. However, when using this method, since the reference signal density decreases, the channel estimation performance may be degraded. Therefore, an adequate positioning is required in order to minimize such degrading.

The receiver performs channel estimation using reference signals in accordance with the following process. Since the receiver is informed of the information on the reference signal, the receiver estimates channel information between the receiver and the transmitter from the received signal. The receiver may then use the estimated channel information value so as to accurately perform demodulation on the data transmitted from the transmitter.

When it is given that the reference signal transmitted from the transmitter is referred to as p, that the channel information, which the reference signal experiences during transmission of the reference signal, is referred to as h, that a thermal noise occurring in the receiver is reference to as n, and that the signal received by the receiver is referred to as y, the received signal y may be expressed as
y=hp+n. At this point, Since the reference signal p is already known by the receiver, the reference signal p may be used so as estimate channel information (h') as shown in Equation 2 below.

$$h'+y/p=h+n/p=h+n'$$ Equation 2

At this point, accuracy in the channel estimation value h' estimated by using the reference signal p is decided based upon the n' value. Therefore, in order to accurately estimate the h' value, it is imperative that n' converges with 0. And, therefore, channel estimation should be performed by using a large number of reference signals. When channel estimation is performed by using a large number of reference signals, the influence of n' may be minimized.

Method of Allocating User Equipment Specific Reference Signals in a 3GPP LTE Downlink System Among the above-described radio (or wireless) frame structure supported by the 3GPP LTE, the structure of a radio frame applicable to FDD will now be described in detail. Herein, one frame is transmitted during a time period of 10 msec, and this frame is configured of 10 subframes. One subframe is transmitted during a time period 1 msec.

One subframe is configured of 14 or 12 OFDM (Orthogonal Frequency Division Multiplexing) symbols, and any one of 128, 256, 512, 1024, 1536, and 2048 may be selected and used as the number of subcarriers for an OFDM symbol.

FIG. 7 illustrates a user equipment specific (user specific) downlink reference signal structure with respect to a subframe using a normal Cyclic Prefix (normal CP), wherein 1 TTI (Transmission Time Interval) has 14 OFDM symbols. Referring to FIG. 7, R5 represents a user specific reference signal, and 1 indicates an OFDM symbol position within a respective subframe.

FIG. 8 illustrates a user equipment specific downlink reference signal structure, with respect to a subframe using an extended Cyclic Prefix (extended CP), wherein 1 TTI (Transmission Time Interval) has 12 OFDM symbols.

FIG. 9 to FIG. 11 respective illustrate a downlink reference signal structure common to all user equipments for a system having 1, 2, and 4 transmit antennas, when 1 TTI has 14 OFDM symbols. Referring to FIG. 9 to FIG. 11, R0 represents a pilot symbol for transmit antenna 0, R1 represents a pilot symbol for transmit antenna 1, R2 represents a pilot symbol for transmit antenna 2, and R3 represents a pilot symbol for transmit antenna 3. In order to eliminate interference of all the other transmit antennas to a transmit antenna, the other transmit antennas do not transmit signal on the subcarrier used for transmission of a pilot symbol by the transmit antenna.

FIG. 7 and FIG. 8 correspond to user equipment specific downlink reference signal structures, which can be used together with the user equipment common downlink reference signals of FIG. 9 to FIG. 11. For example, in OFDM symbols #0, #1, and #2 of the first slot to which control information is transmitted, the user equipment common downlink reference signals of FIG. 9 to FIG. 11 are used. And, in the remaining OFDM symbols, the user specific downlink reference signals are used.

Also, by multiplying a pre-defined sequence (e.g., Pseudo-random (PN), m-sequence, etc.) by a downlink reference signal for each cell, interference caused by a signal of the pilot symbol received by the receiver from a neighboring cell may be decreased, thereby enhancing the channel estimation performance. A PN sequence may be applied by the OFDM symbol within a subframe, and PN sequence may be applied differently according to a cell ID, a subframe number, an OFDM symbol position, and user equipment ID.

For example, in case of the structure of a 1 Tx pilot symbol of FIG. 9, it can be known that 2 pilot symbols of a transmit antenna are used in a specific OFDM symbol including pilot symbols. In case of the 3GPP LTE system, there are systems configured of various types of bandwidths. Herein, the range of bandwidth types is between 6 RB (Resource Block) and 110 RB. Therefore, the number of pilot symbols of 1 transmit antenna included in 1 OFDM symbol is equal to $2 \times N_{RB}$, and a sequence that is used by being multiplied by a downlink reference signal for each cell shall have the length of $2 \times N_{RB}$. At this point, $N_{RB}$ indicates the number of RBs respective to the bandwidth, and a binary sequence or a complex sequence may be used as the sequence. $r(m)$ of Equation 3 shown below indicates an example of a complex sequence.

$$r(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 2N_{RB}^{max} - 1$$

Equation 3

In Equation 1 shown above, $N_{RB}^{max}$ indicates the number of RBs respective to the maximum bandwidth. Therefore, according to the above-mentioned description, the corresponding number may be decided to be equal to 110, and c may be defined as a PN sequence corresponding to a Gold sequence. Equation 3 may be expressed for a user equipment specific downlink reference signal as following Equation 4.

$$r(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 2N_{RB}^{PDSCH} - 1$$

Equation 4

In Equation 4, $N_{RB}^{PDSCH}$ indicates the number of RBs corresponding to downlink data assigned to a specific user equipment. Therefore, the length of the sequence may vary depending upon the data size assigned to the user equipment.

The above-described structure of the user equipment specific downlink reference signal may transmit only 1 data stream, and, since a simple extension is unavailable, multiple streams cannot be transmitted. Therefore, the structure of the user equipment specific downlink reference signal is required to be extended so that multiple data streams can be transmitted.

DETAILED DESCRIPTION OF THE INVENTION

Technical Objects

The technical object which the present invention seeks to achieve is to provide a structure of a user equipment specific downlink reference signal that allows multiple data streams to be transmitted.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

According to an aspect of the present invention, in a downlink MIMO (Multi Input Multi Output) system that supports a first UE (User Equipment) supporting N number of transmit antennas among a total of M number of transmit antennas and a second UE supporting M (M>N) number of transmit antennas, a method for transmitting pilot signals comprises: mapping, by a base station, a pilot symbol to a Resource Block (RB) region within a subframe in which a user specific pilot symbol, which can only be recognized by the second UE, can be transmitted; transmitting the subframe having the pilot symbol mapped thereto, and wherein cell-specific pilot symbols of transmit antenna ports 0 to N−1, which can be recognized by the first UE and the second UE, and user specific pilot symbols of transmit antenna ports N to M−1, which can only be recognized by the second UE, are mapped to the allocated (or assigned) resource block region.

At this point, the user specific pilot symbols, which can only be recognized by the second UE, may correspond to user specific pilot symbols for channel measurement between a base station and a user equipment.

At this point, mapping positions of the user specific pilot symbols respective to transmit antenna ports N to M−1, which can only be recognized by the second UE, may be cyclically shifted in accordance with at least one of a time axis and a frequency axis.

At this point, the method further includes transmitting information indicating the Resource Block (RB) region of the subframe in which a user specific pilot symbol, which can only be recognized by the second UE, can be transmitted, wherein the information is transmitted to the second UE through a PDCCH that can be recognized by the second UE.

At this point, in case a normal Cyclic Prefix is applied, and when indexes starting from 0 are sequentially assigned to OFDM symbols within the subframe, the user specific pilot symbols respective to transmit antenna ports N to M−1, which can only be recognized by the second UE, may be mapped to OFDM symbols having index numbers 0, 3, 6, and 9.

At this point, N may be equal to 4, and M may be equal to 8.

According to another aspect of the present invention, in a downlink MIMO (Multi Input Multi Output) system that supports a first UE (User Equipment) supporting N number of transmit antennas among a total of M number of transmit antennas and a second UE supporting M (M>N) number of transmit antennas, a method for feeding-back channel information comprises: receiving information indicating a Resource Block (RB) region within a subframe having a user specific pilot symbol, which can only be recognized by the second UE, mapped thereto; receiving the subframe indicated by the information; and feeding back channel information between the base station and the second UE by using cell specific pilot symbols included in the resource block region and user specific pilot symbols, and wherein cell-specific pilot symbols of transmit antenna ports 0 to N−1, which can be recognized by the first UE and the second UE, and user specific pilot symbols of transmit antenna ports N to M−1, which can only be recognized by the second UE, are mapped to the resource block region.

At this point, mapping positions of the user specific pilot symbols respective to transmit antenna ports N to M−1, which can only be recognized by the second UE, may be cyclically shifted in accordance with at least one of a time axis and a frequency axis.

At this point, the information may be broadcasted to the second UE through a PDDCH (Physical Downlink Control Channel) that can be recognized by the second UE.

At this point, N may be equal to 4, and M may be equal to 8.

At this point, in case a normal Cyclic Prefix is applied, and when indexes starting from 0 are sequentially assigned to OFDM symbols within the subframe, the user specific pilot symbols respective to transmit antenna ports N to M−1, which can only be recognized by the second UE, may be mapped to OFDM symbols having index numbers 0, 3, 6, and 9.

Effects of the Invention

According to the present invention, pilot symbols may be efficiently transmitted to both legacy user equipments of the system and new user equipments newly introduced to the system.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BEST MODE FOR CARRYING OUT THE PRESENT INVENTION

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide a full and complete understanding of the present invention. However, it will be apparent to those skilled in the art that the present invention can be realized even without the detailed features described herein. For example, although the following description is given based upon specific terms, the description of the present invention is not required to be limited only to such terms, and the same meaning may also be indicated by other arbitrary terms. Furthermore, the same reference numbers may be used for the same or similar elements throughout the entire description of the present invention.

Throughout the entire description of the present invention, when a particular part is said to "comprise (or include)" a specific element, unless specifically written or indicated otherwise, this does not signify that another element is excluded from the specific part but signifies that the specific part may also include other elements. Also, terms such as " . . . unit", " . . . device", "module", and so on, which are indicated in the description of the present invention, indicates units that process at least one function or operation. And, this may be realized in the form of hardware or software, or a combination of hardware and software.

First of all, before describing the structure of a pilot symbol, the different types of pilot symbol will now be described in detail.

The pilot symbol of a user equipment specific (or dedicated) pilot symbol may be largely divided into two different types. One corresponds to a pilot symbol for measurement, which refers to a pilot symbol that can measure the channel of a physical or virtual antenna, and the other corresponds to a pilot symbol for data demodulation. Most particularly, the pilot symbol for data demodulation corresponds to a pilot symbol, wherein the same format of pre-coding, which is used for data transmission, or the same format of another type of transmission method to the pilot symbol is applied, so that a channel estimation value can be applied when performing data demodulation, without any modification. Occasionally, a method of using a pilot symbol for channel estimation and a method of using a pilot symbol for data demodulation may be used in combination.

Figure 1:
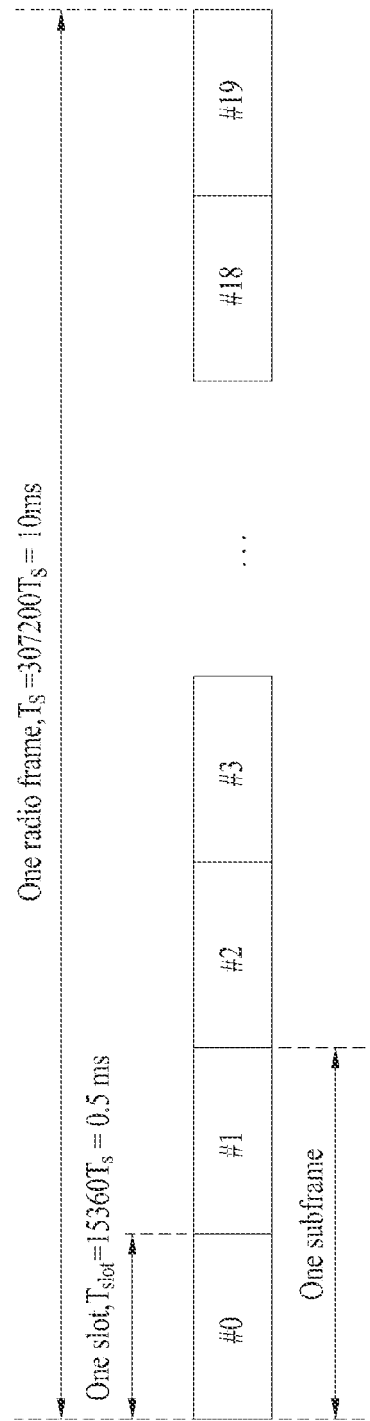
FIG. 1 illustrates the structure of a type 1 radio frame.
Figure 2:
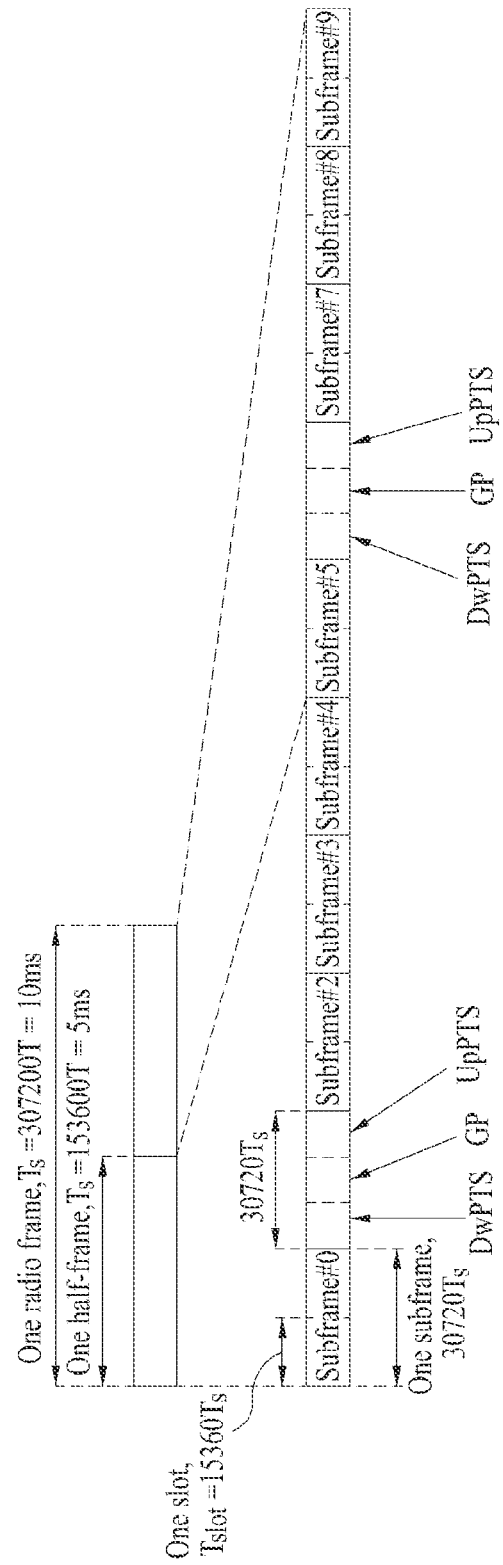
FIG. 2 illustrates the structure of a type 2 radio frame.
Figure 3:
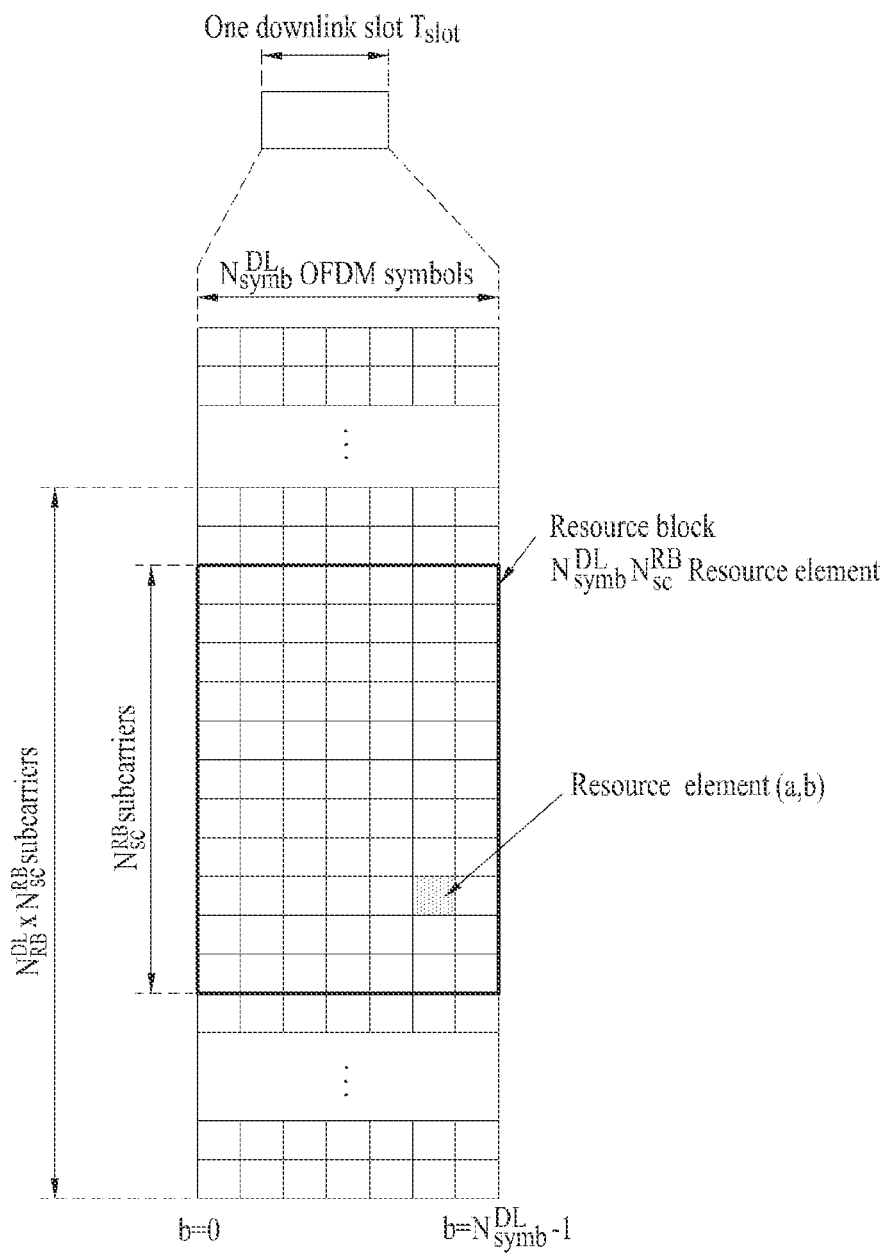
FIG. 3 illustrates a slot structure of an LTE downlink.
Figure 4:
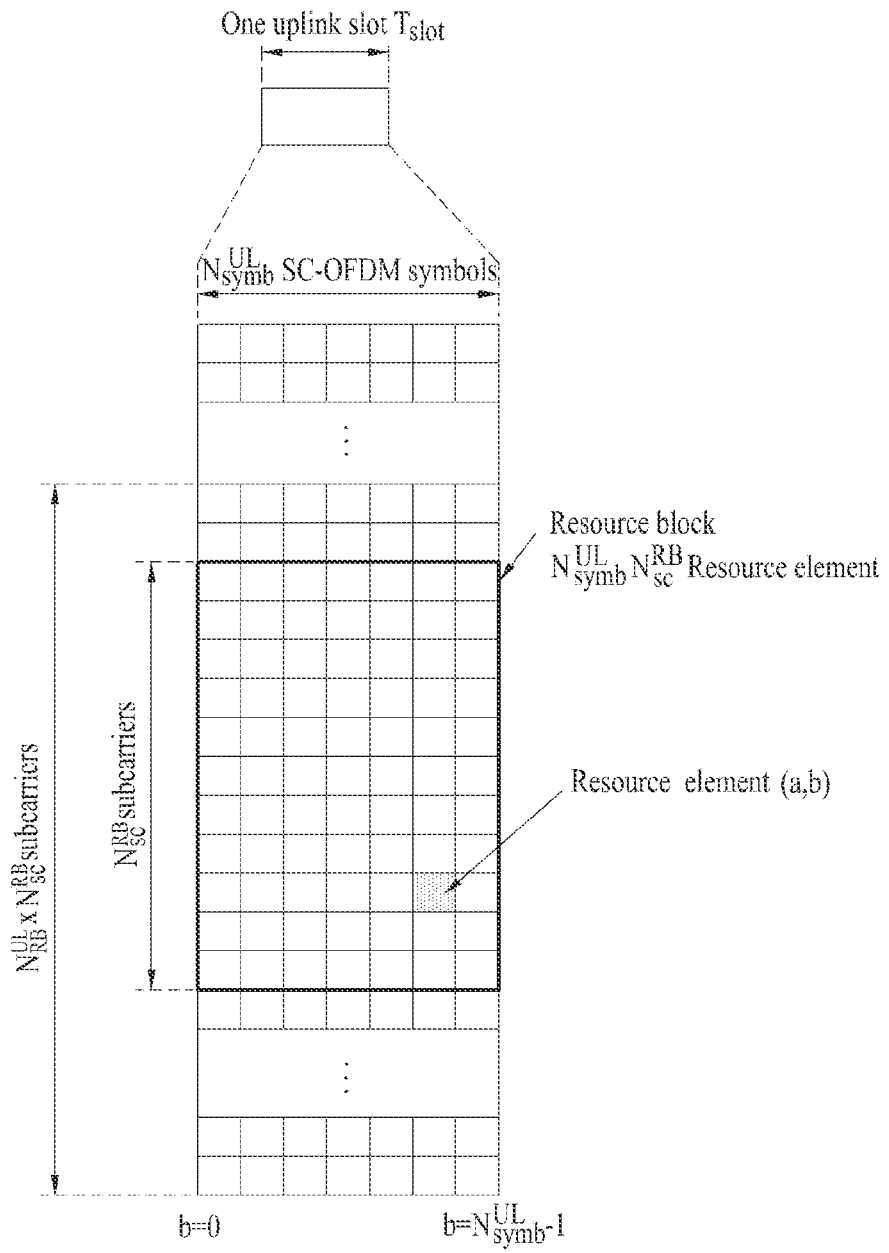
FIG. 4 illustrates a slot structure of an LTE uplink.
Figure 5:
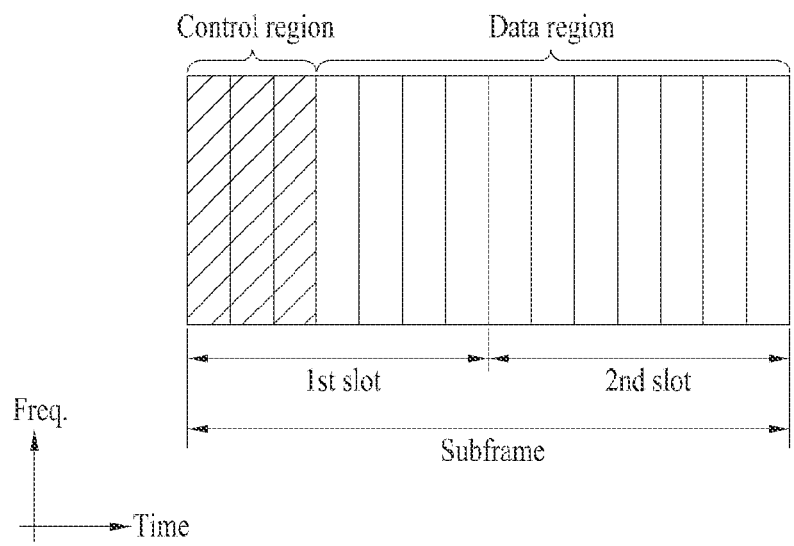
FIG. 5 illustrates the structure of a downlink subframe.
Figure 6:
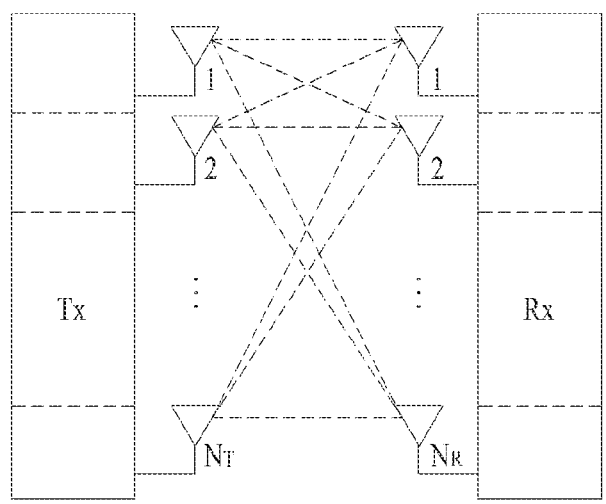
FIG. 6 illustrates a block view showing the structure of a general multiple antennas (MIMO) communication system.
Figure 7:
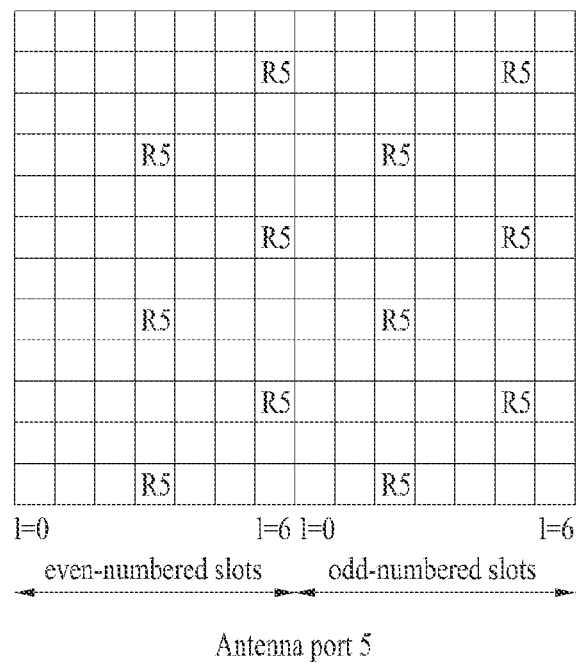
FIG. 7 illustrates a user equipment specific downlink reference signal structure with respect to a subframe using a normal Cyclic Prefix (normal CP), wherein 1 TTI (Transmission Time Interval) has 14 OFDM symbols.
Figure 8:
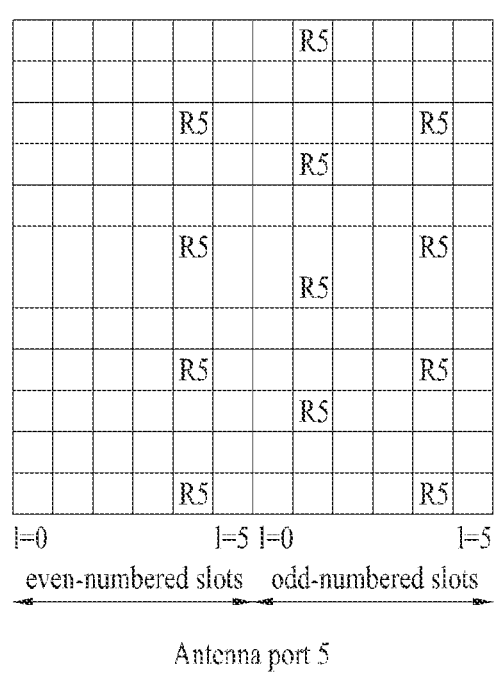
FIG. 8 illustrates a user equipment specific downlink reference signal structure, with respect to a subframe using an extended Cyclic Prefix (extended CP), wherein 1 TTI has 12 OFDM symbols.
Figure 9:
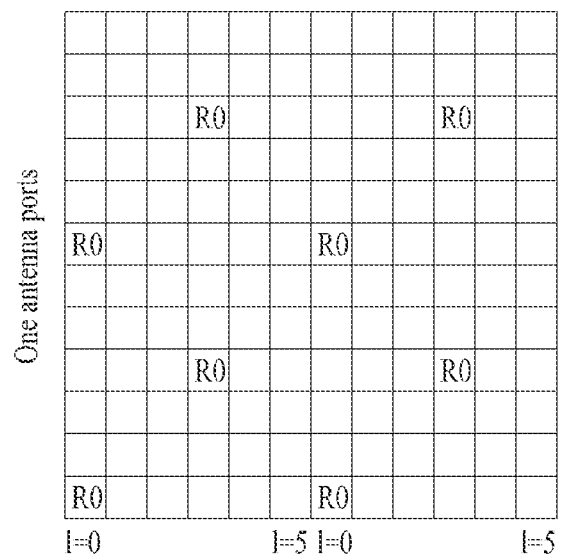
FIG. 9 to FIG. 11 respective illustrate a downlink reference signal structure common to all user equipments for a system having 1, 2, and 4 transmit antennas, when 1 TTI has 14 OFDM symbols.
Figure 10:
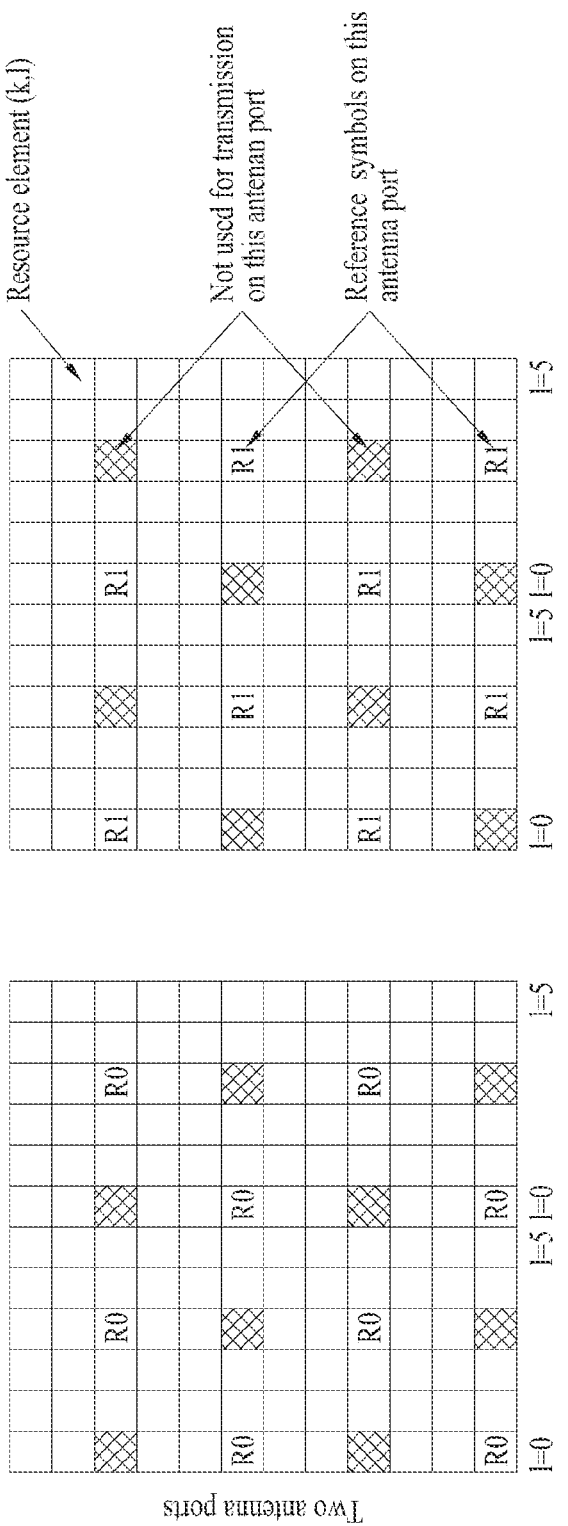
Figure 11:
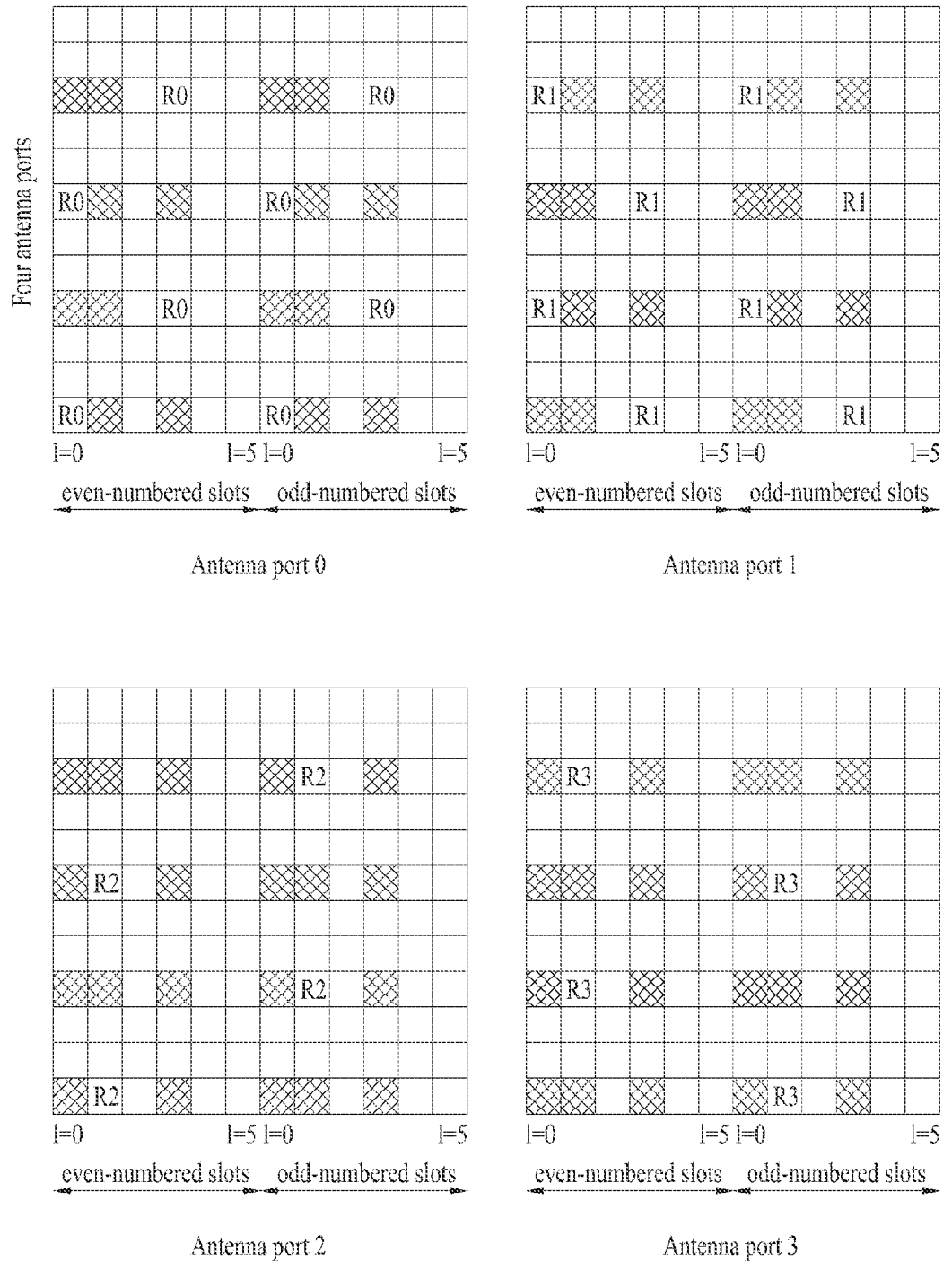
Figure 12:
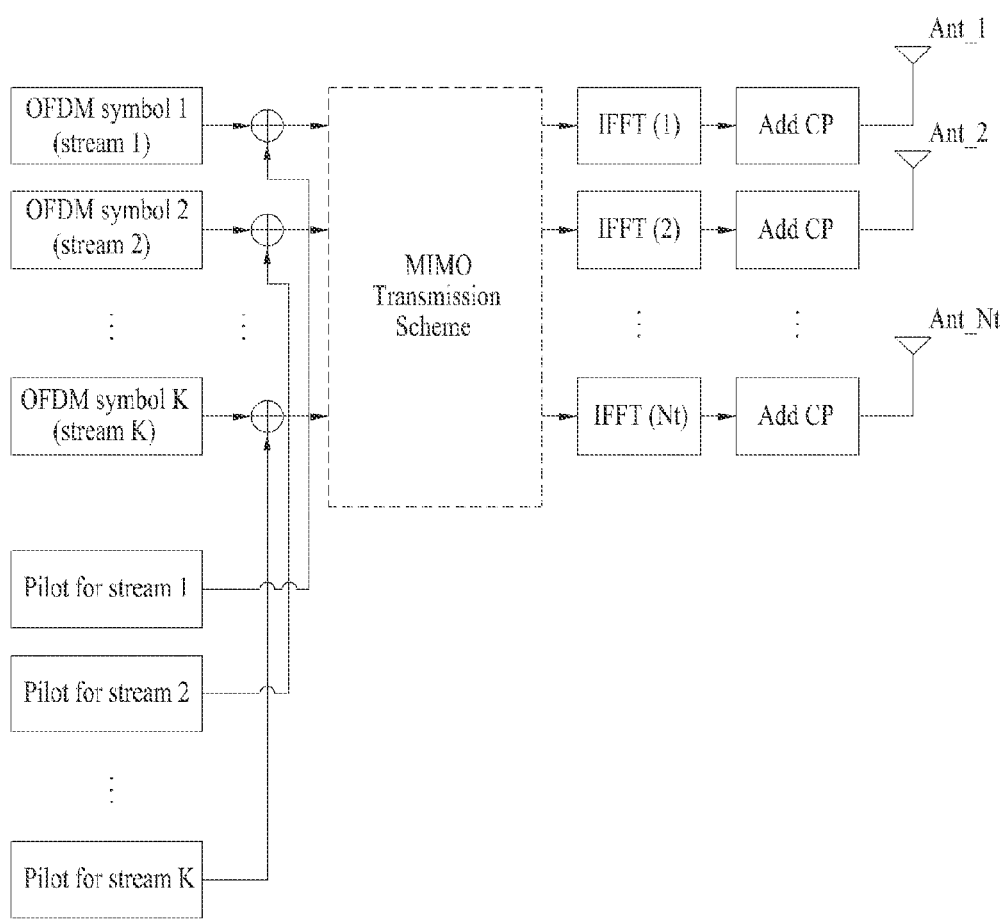
FIG. 12 illustrates a structure corresponding to when a user equipment specific pilot symbol is used for data demodulation.

FIG. 12 illustrates a structure corresponding to when a user equipment specific pilot symbol is used for data demodulation. Referring to FIG. 12, it is assumed that the number of streams is equal to K, and that the number of transmit antennas is equal to $N_t$. At this point, as shown in FIG. 12, at this point, it may be known that, in case of the pilot symbol that is used for the purpose of demodulation, a number of pilot symbol sequences equal to the number of streams (or corresponding to the spatial multiplexing rate, rank) is applied. At this point, since the number of streams should always be less than the number of transmit antennas, the value K is always less than $N_t$. Therefore, it can be known that the overhead of the pilot symbol in case that $K<N_t$ is always less than that in case that each transmit antenna transmits its pilot symbol.

Figure 13:
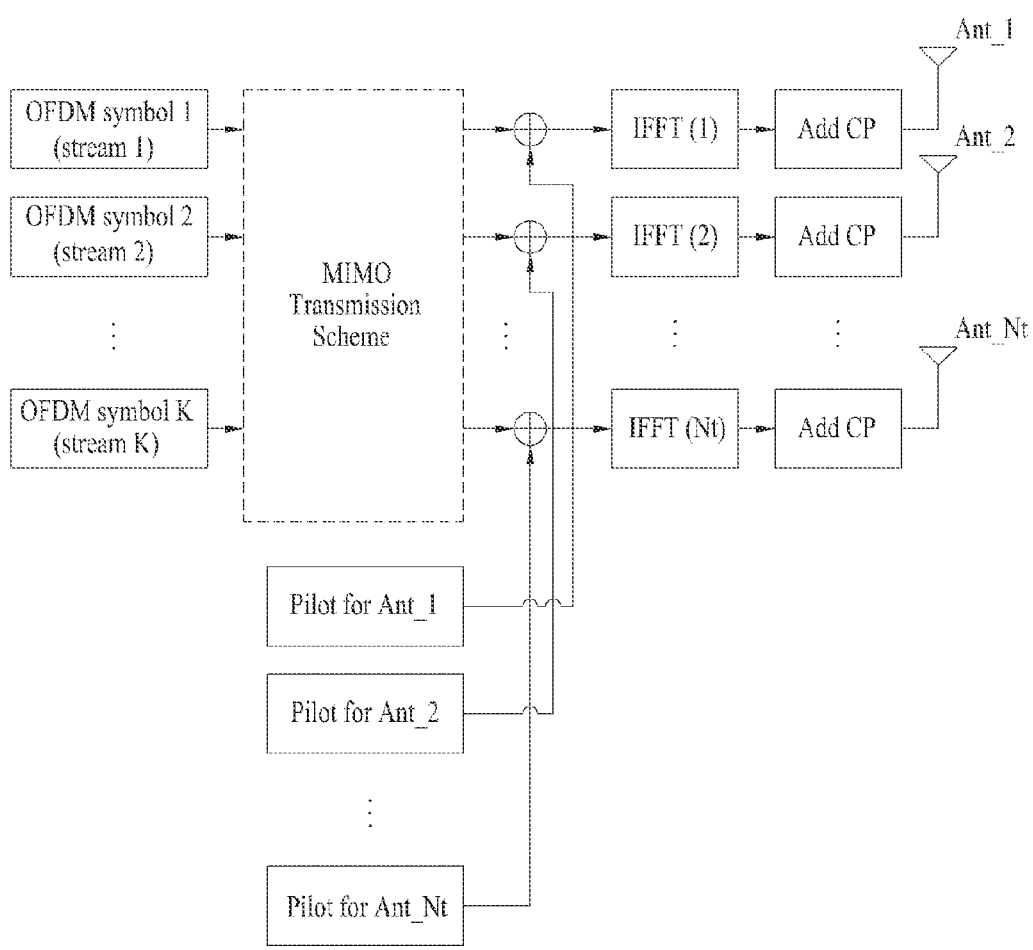
FIG. 13 illustrates a structure corresponding to when a user equipment specific pilot symbol is used for measurement.

FIG. 13 illustrates a structure corresponding to when a user equipment specific pilot symbol is used for measurement. At this point, the measurement includes all the operations of a user equipment, such as channel status information feedback, synchronization, and so on. By using the method of FIG. 13, the channel of each physical antennas may be estimated, and an appropriate multiple antenna method may be configured to be applied to each channel status.

By combining both of the above-described methods, a base station can configure a pilot symbol so that a user equipment can perform demodulation and measurement at the same time, or configure a pilot symbol so that the user equipment can perform the two methods according to an identical cycle period or different cycle periods. Alternatively, a pilot symbol may also be configured so that a user specific pilot symbol for demodulation is basically transmitted for data transmission and that a user specific pilot symbol for measurement is additionally transmitted. At this point, even though the pilot symbol for measurement is user equipment specific, in order to allow other user equipments to use the same pilot symbol for measurement, the pilot symbol for measurement may transmit information about the pilot symbol through broadcasting as additional information. Also, cell specific pilot symbols are also transmitted by using the same method of FIG. 13.

Figure 14:
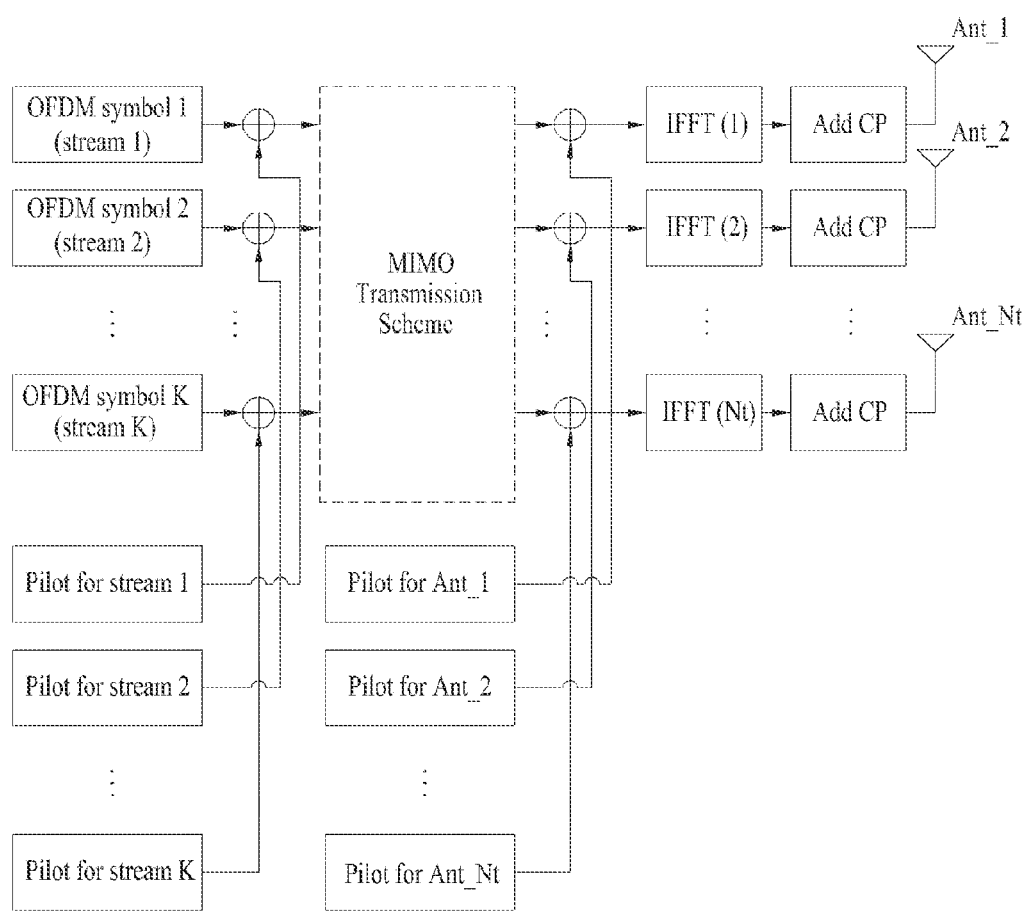
FIG. 14 illustrates a structure corresponding to a case where a method of using user equipment specific pilot symbols for data demodulation and a method of using user equipment specific pilot symbols for measurement are combined.

FIG. 14 illustrates a structure corresponding to a case where a method of using user equipment specific pilot symbols for data demodulation and a method of using user equipment specific pilot symbols for measurement are combined. As shown in FIG. 14, in case of combining the two methods, the overhead of the pilot symbol may be minimized and the performance may be maximized.

In the present invention, a structure, wherein a cell specific pilot symbol is transmitted along with a user specific pilot symbol, will be referred to as a hybrid pilot structure. Hereinafter, a hybrid pilot structure according to an embodiment of the present invention will now be described in detail.

Figure 15:
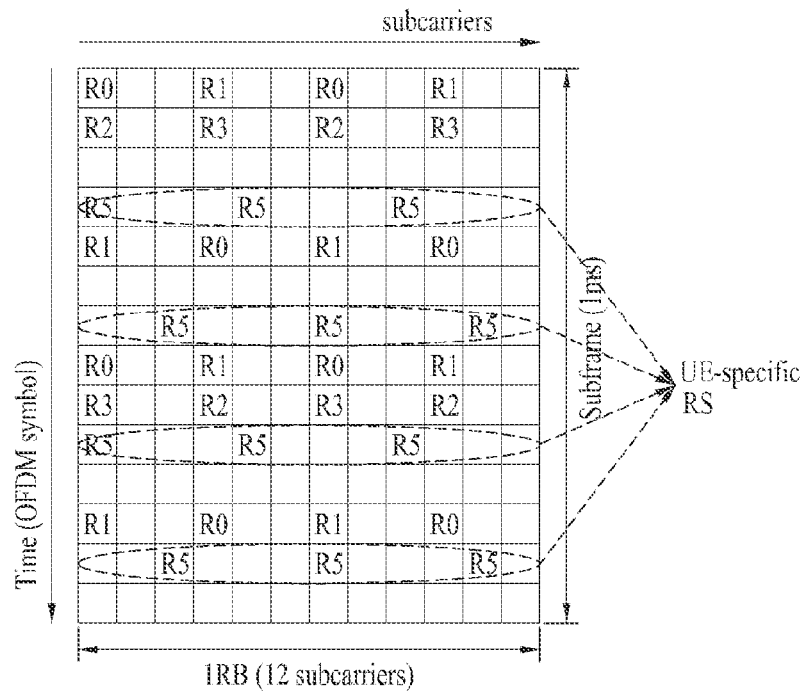
FIG. 15 illustrates a hybrid pilot structure according to an embodiment of the present invention.

FIG. 15 illustrates a hybrid pilot structure according to an embodiment of the present invention. As shown in FIG. 15, it can be known that the conventional user equipment specific pilot symbol R5 is transmitted along with cell specific pilot symbols R0 to R3. At this point, the cell specific pilot symbols correspond to pilot symbols that can be used by all user equipments, and the user specific pilot symbol corresponds to a pilot symbol that can be used by a user equipment that is assigned with the corresponding RB (Resource Block). The RB for the user specific pilot symbol may be allocated (or assigned) for each subframe or in accordance with a predetermined cycle period. However, when R5 is used as a pilot symbol for measurement and when the corresponding information is transmitted to other user equipments, the corresponding pilot symbol may be used for enhancing the channel estimation performance of other user equipments as well.

Figure 16:
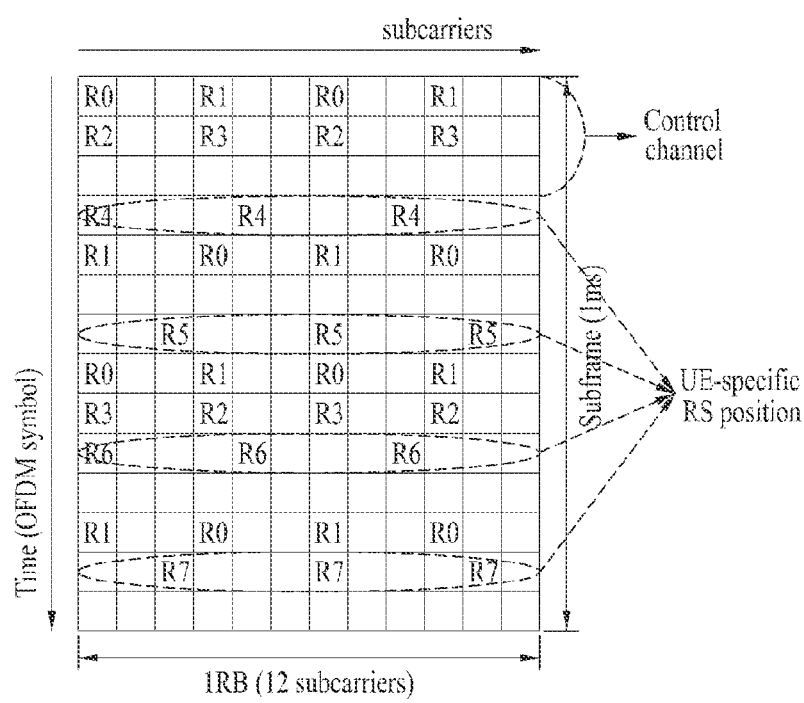
FIG. 16 illustrates a hybrid pilot structure according to an embodiment of the present invention.

FIG. 16 illustrates a hybrid pilot structure according to an embodiment of the present invention. When the user specific pilot symbol of FIG. 15 is configured to be transmitted through a larger number of transmit antennas as shown in FIG. 16, pilot symbols respective to a larger number of transmit antennas may be transmitted. As shown in FIG. 16, the user equipment specific pilot symbol can carry information on a total of 4 transmit antennas. Therefore, when considering 4 transmit antennas of the cell specific pilot symbols and the 4 transmit antennas of the remaining user equipment specific pilot symbols, pilot symbols respective to a total of 8 transmit antennas may be transmitted. Since the cell specific pilot symbol can also be received by other user equipments, a conventional (or legacy) user equipment (e.g., user equipment of the LTE system) that can receive only the signals of 4 transmit antennas receives only the cell specific pilot symbols R0 to R3, and a user equipment (e.g., user equipment of the LTE-A system) that can receive the signals of 8 transmit antennas receives signals of the 8 transmit antennas by using the 4 additional transmit antennas.

At this point, if the position of the RB having the pilot symbols R4 to R7 of the 4 additional transmit antennas positioned therein is notified to another user equipment (e.g., the UE of the LTE-A system), the channel estimation performance of the other user equipment may be additionally enhanced. Also, information on the pilot symbols R4 to R7 should be notified to other user equipments only when the pilot symbol R4 to R7 are transmitted for the purpose of measurement.

Figure 17:
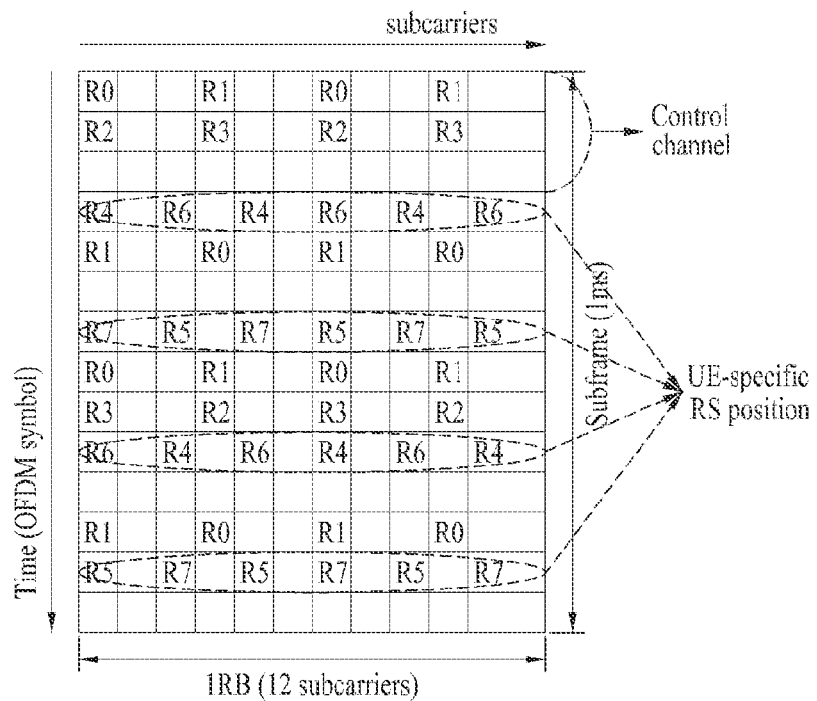
FIG. 17 illustrates a hybrid pilot structure according to an embodiment of the present invention.

FIG. 17 illustrates a hybrid pilot structure according to an embodiment of the present invention. The pilot symbol structure of FIG. 16 may be configured as shown in FIG. 17 by increasing the pilot overhead in order to enhance the channel estimation performance of the transmit antenna transmitting R4 to R7.

The positions of R4 to R7 of FIG. 17 may be changed. However, in this case, it is preferable that the user specific pilot symbol is used at a fixed position.

Figure 18:
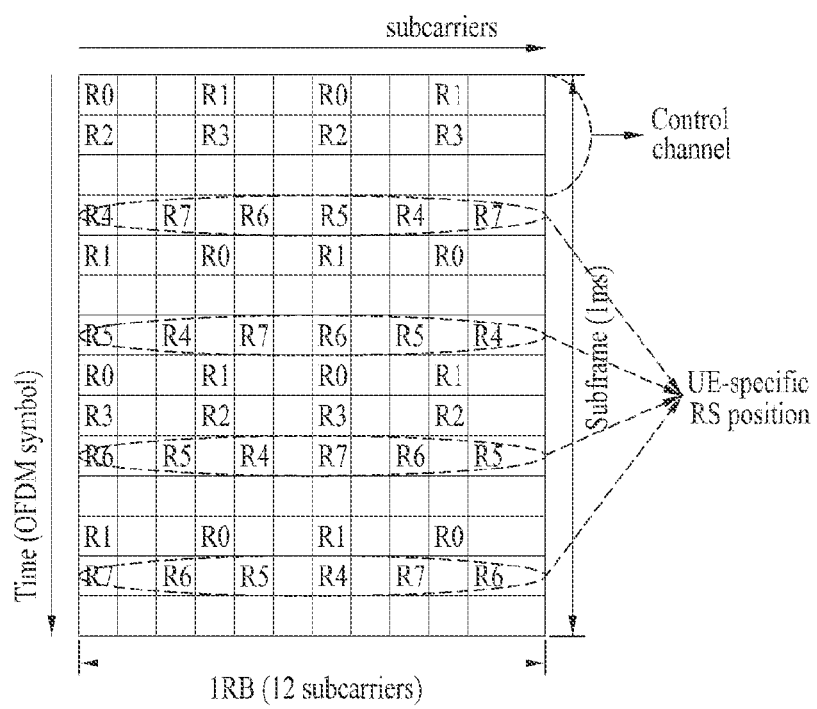
FIG. 18 and FIG. 19 illustrate hybrid pilot structures according to an embodiment of the present invention.
Figure 19:
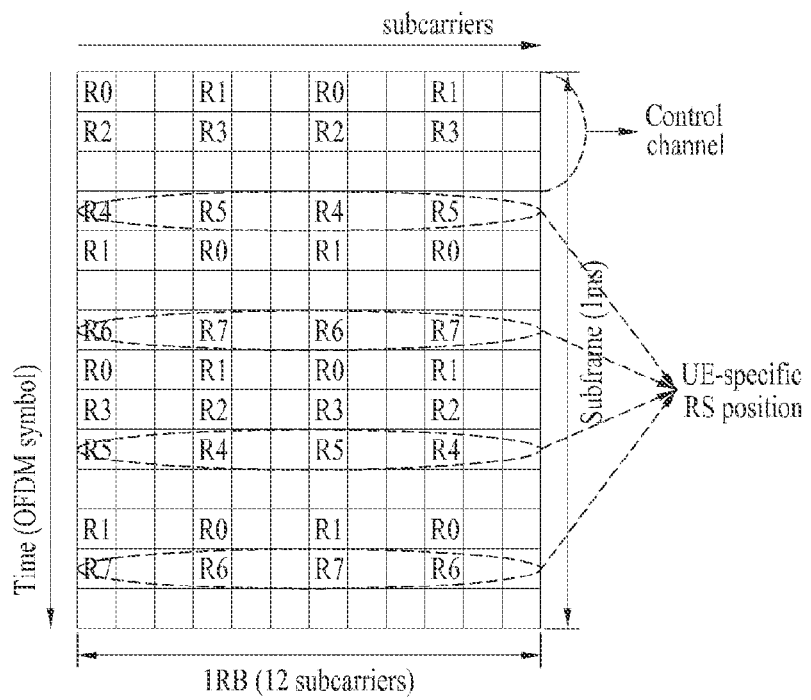

FIG. 18 and FIG. 19 illustrate hybrid pilot structures according to an embodiment of the present invention. As shown in FIG. 18 and FIG. 19, the positions of pilot symbols R4 to R7 may be changed.

In a subframe, depending upon the position of an OFDM symbol, a cell specific pilot symbol and a user specific pilot symbol may be predefined to be used. For example, in an OFDM symbol using a normal Cyclic Prefix (normal CP), the pilot symbols used in the 3rd, 6th, 9th, and 12th OFDM symbols correspond to user specific pilot symbols, and the remaining pilot symbols may be used as cell specific pilot symbols.

An RB, to which the above-described user equipment specific pilot symbol is transmitted, may be decided for each subframe, radio frame, or predetermined region, so that another user equipment can use the pilot symbol for measurement. Herein, a PDCCH (Physical Downlink Control Channel), which can be read by all LTE-A user equipments, may be configured in each subframe so that information on the RB can be broadcasted through the PDCCH. The PDCCH may be configured to be transmitted only when an RS for measurement is transmitted, or may also be configured to be transmitted in each subframe. At this point, the method for configuring the PDCCH for broadcasting will be described as follows.

There is a method of using a specific (or particular) UE ID by masking the UE ID to the PDCCH. Accordingly, all LTE-A UEs recognize the PDCCH, which is detected using the specific UE ID, as a broadcast channel for the LTE-A UEs.

There is also a method of storing the PDCCH at a specific position and using the stored PDCCH. Herein, a predetermined number of CCEs (Control Channel Elements), the CCE being an element of the PDCCH, may be stored, and the LTE-A UE may be configured to receive information of the PDCCH at a specific position.

A zone can be predefined in a frequency-time domain so that pilot symbols R4 to R7 are always transmitted on the zone. At this point, R4 to R7 may be configured of cell specific pilot symbols.

As described above, R0 to R3 is always used as cell specific pilot symbols, and R4 to R7 may also be used as cell specific pilot symbols or user equipment specific pilot symbols for measurement. All of the pilot symbols structures that will hereinafter be described may be configured to have the same structures as described above.

Hereinafter, the structure of a pilot symbol according to an embodiment of the present invention will now be described.

Figure 20:
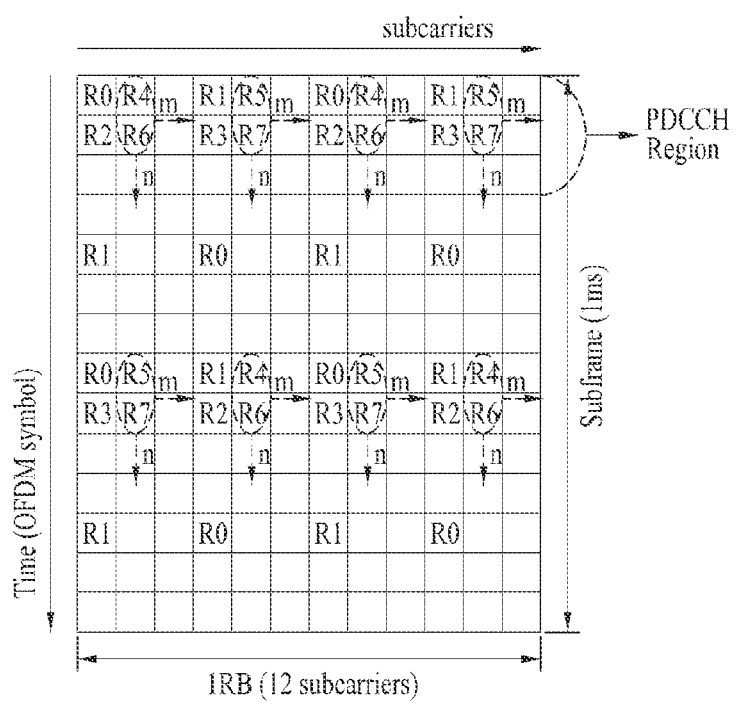
FIG. 20 illustrates a pilot structure according to an embodiment of the present invention.

FIG. 20 illustrates a pilot structure according to an embodiment of the present invention. Pilot symbols of transmit antennas numbers 4 to 7 of FIG. 20 may be cyclically shifted to m number of subcarriers (wherein m is an integer) and may also be cyclically shifted to n number of OFDM symbols (wherein n is an integer). In this case, it may be determined that there is no degrading in the channel estimation performance caused by the cyclic shift. For example, m=1 indicates that all pilot symbols R4 to R7 are cyclically shifted rightwards (the increasing direction of subcarrier indexes) by one subcarrier index, and m=−1 indicates that all pilot symbols R4 to R7 are cyclically shifted leftwards (the decreasing direction of subcarrier indexes) by one subcarrier index. Also, n=1 indicates that pilot symbols R4 to R7 are cyclically shifted downwards (the increasing direction of OFDM symbol indexes) by one OFDM symbol index, and n=−1 indicates that pilot symbols R4 to R7 are cyclically shifted upwards (the decreasing direction of OFDM symbol indexes) by one OFDM symbol index. However, it is impossible for R4 to R7 to be cyclically shifted to the positions where R0 to R3 exist.

Hereinafter, exemplary structures of diverse pilot symbols according to an embodiment of the present invention will now be described.

Figure 21:
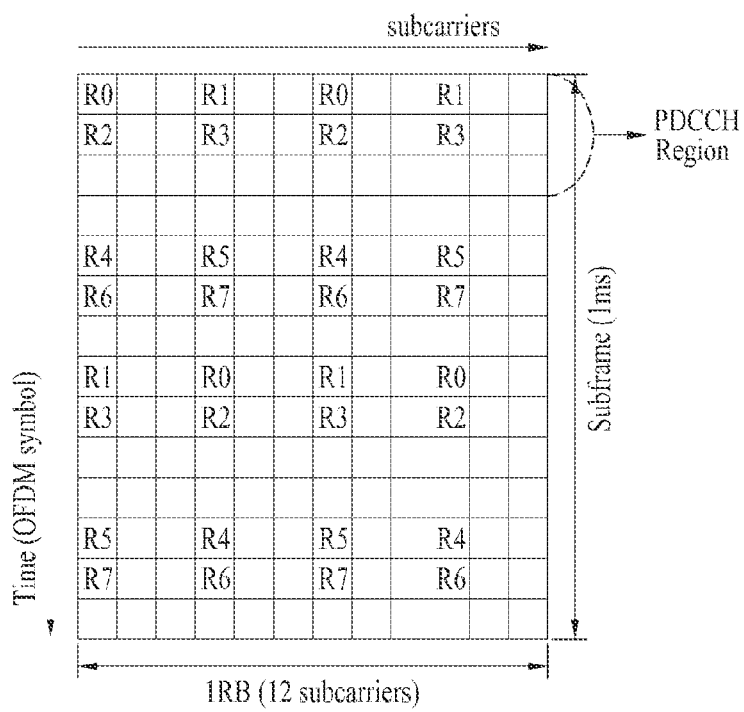
FIG. 21 to FIG. 23 illustrate pilot structures according to an embodiment of the present invention.
Figure 22:
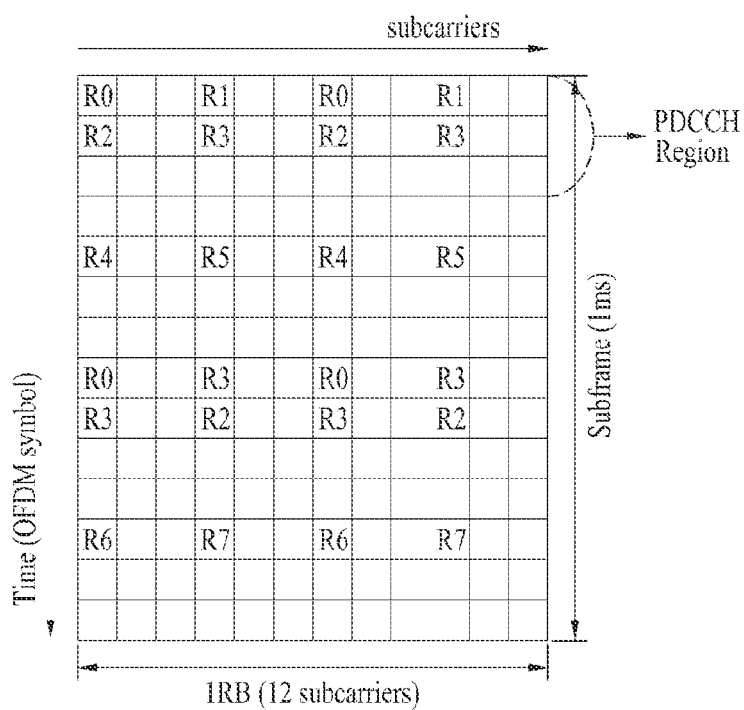

FIG. 21 and FIG. 22 illustrate pilot structures according to an embodiment of the present invention. Pilot structures may be configured as shown in FIG. 21 and FIG. 22.

Figure 23:
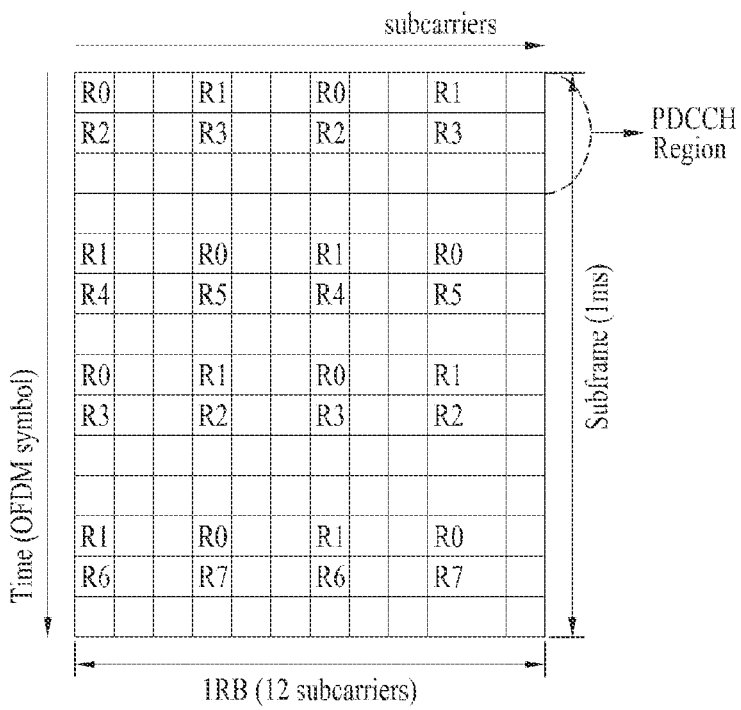

FIG. 23 illustrates a pilot structure according to an embodiment of the present invention. FIG. 24 to FIG. 38 illustrate structures cyclically shifting R4 to R7 within the pilot structure of FIG. 23 along a subcarrier direction or along an OFDM symbol direction.

Figure 24:
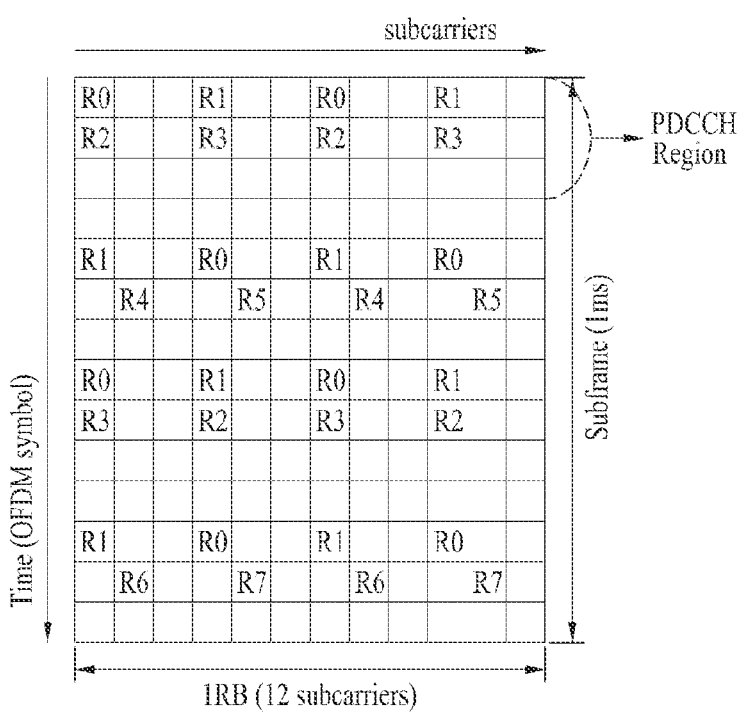
FIG. 24 to FIG. 38 illustrate structures cyclically shifting R4 to R7 within the pilot structure of FIG. 23 along a subcarrier direction or along an OFDM symbol direction.
Figure 25:
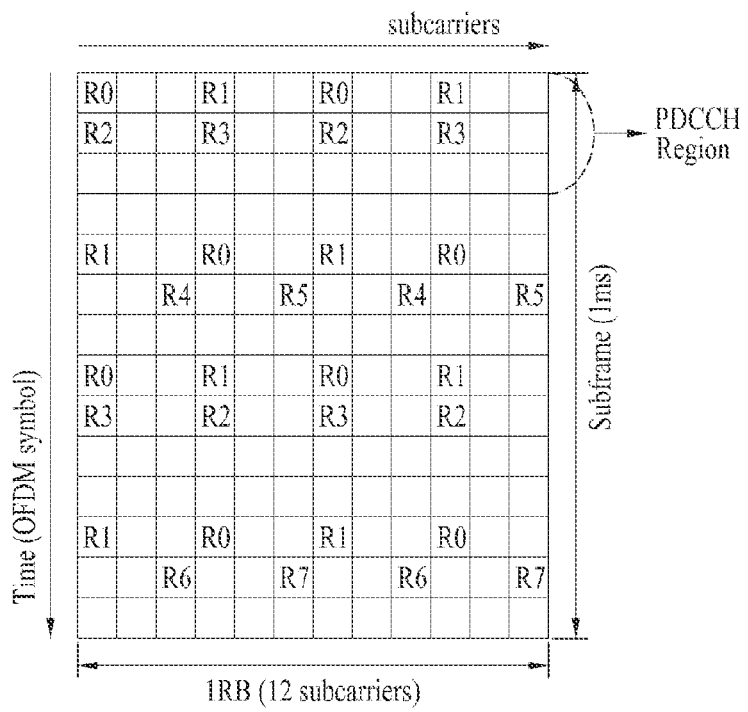
Figure 26:
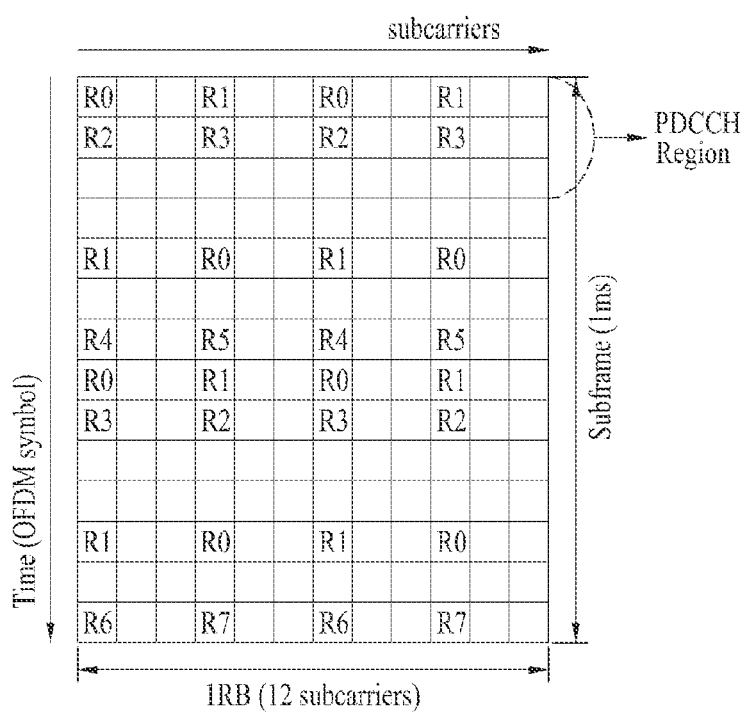
Figures 27, 28:
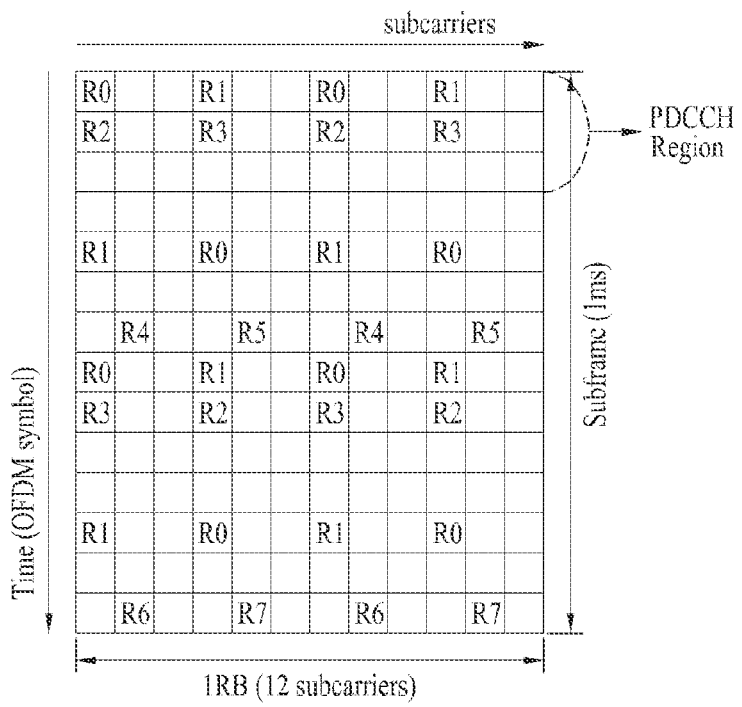
Figure 29:
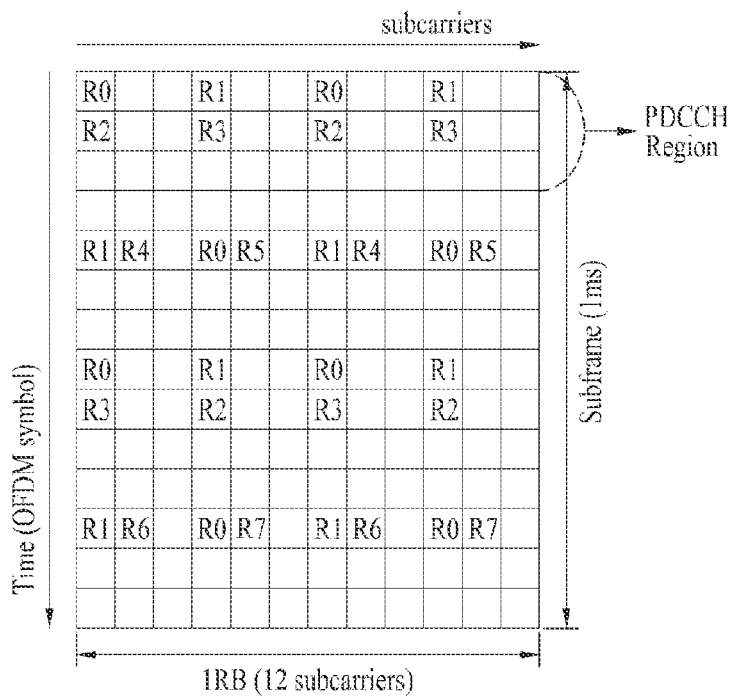
Figure 30:
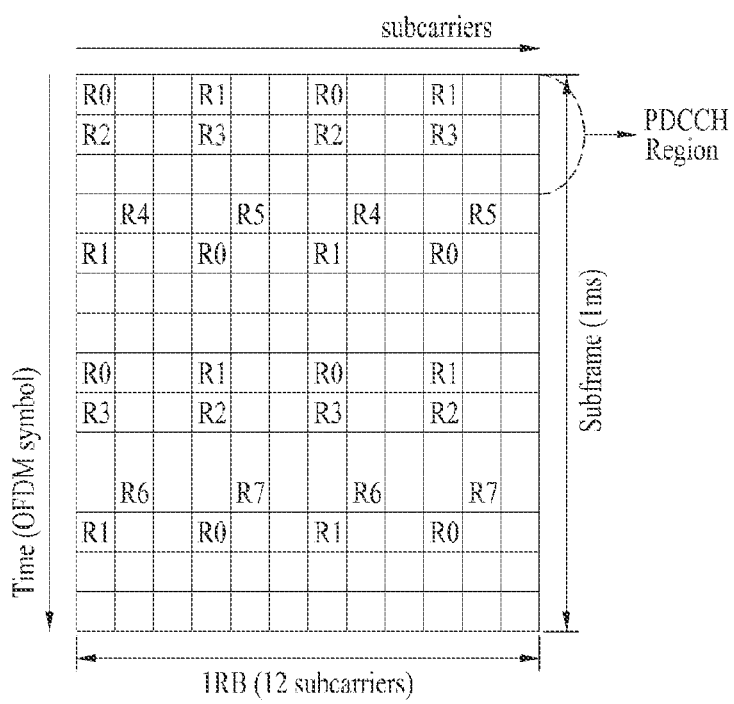
Figure 31:
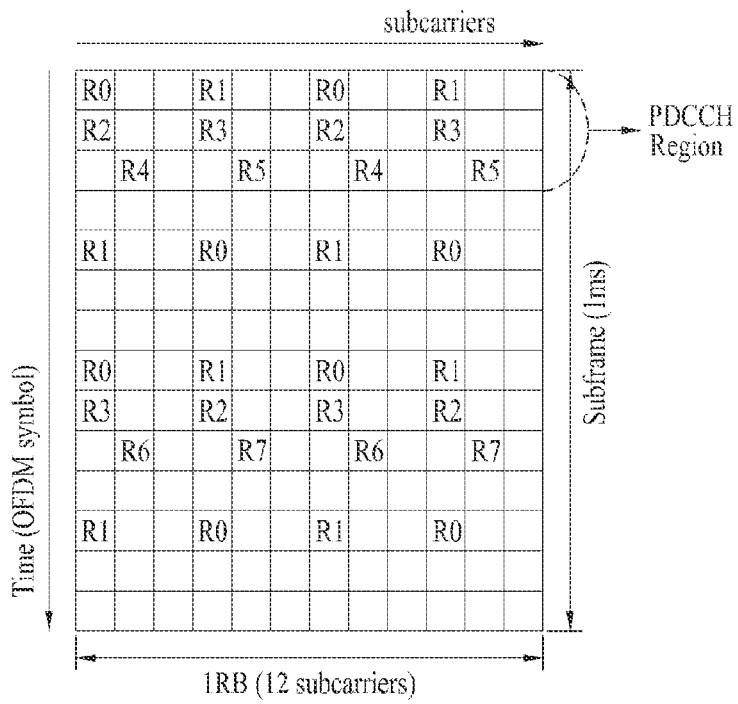
Figure 32:
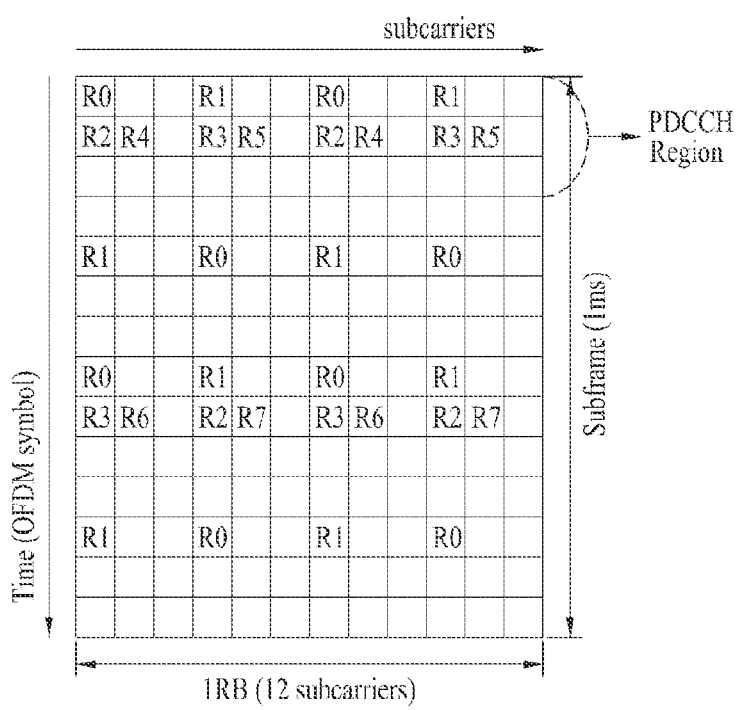
Figure 33:
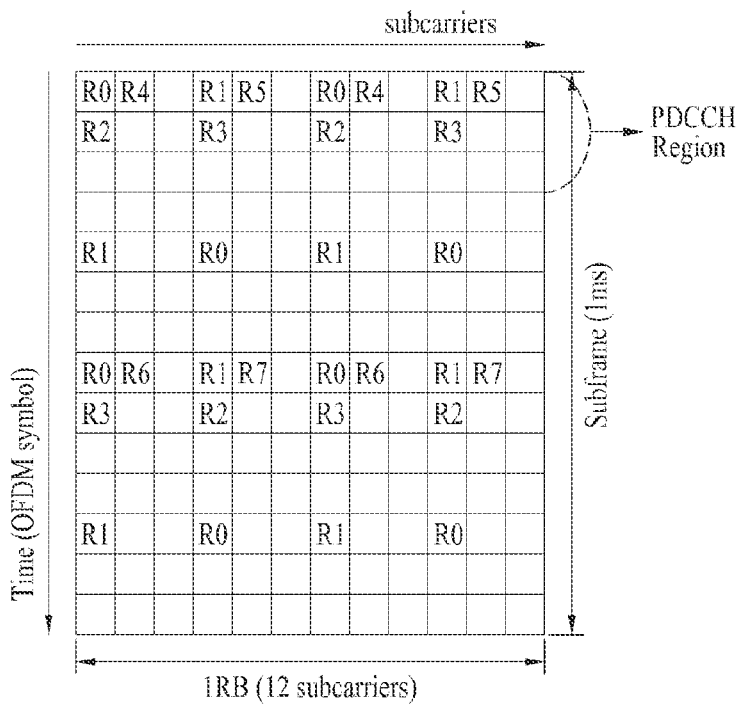
Figure 34:
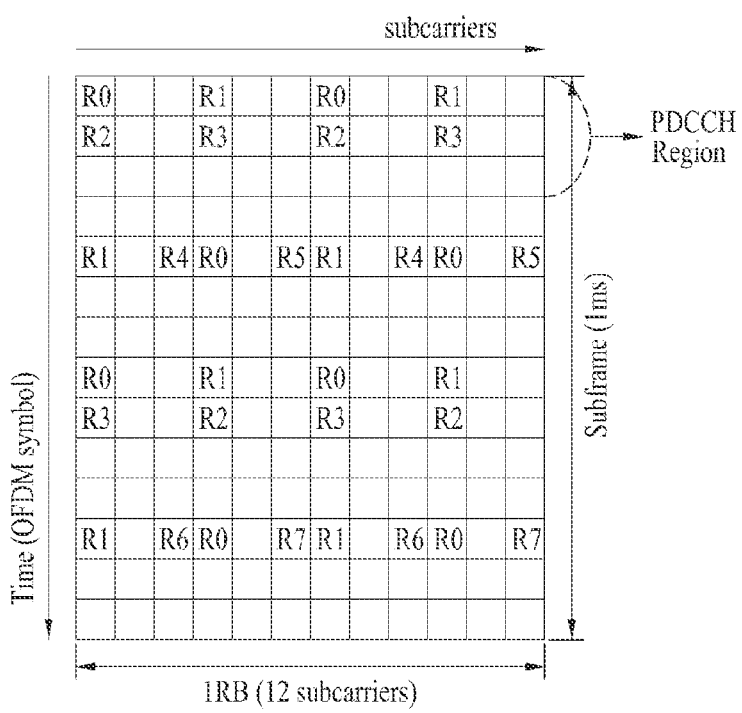
Figure 35:
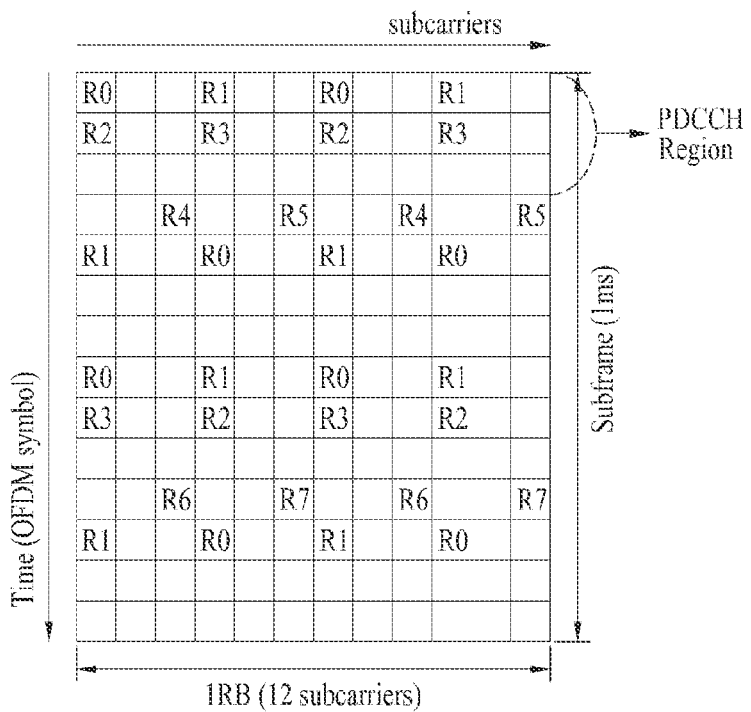
Figure 36:
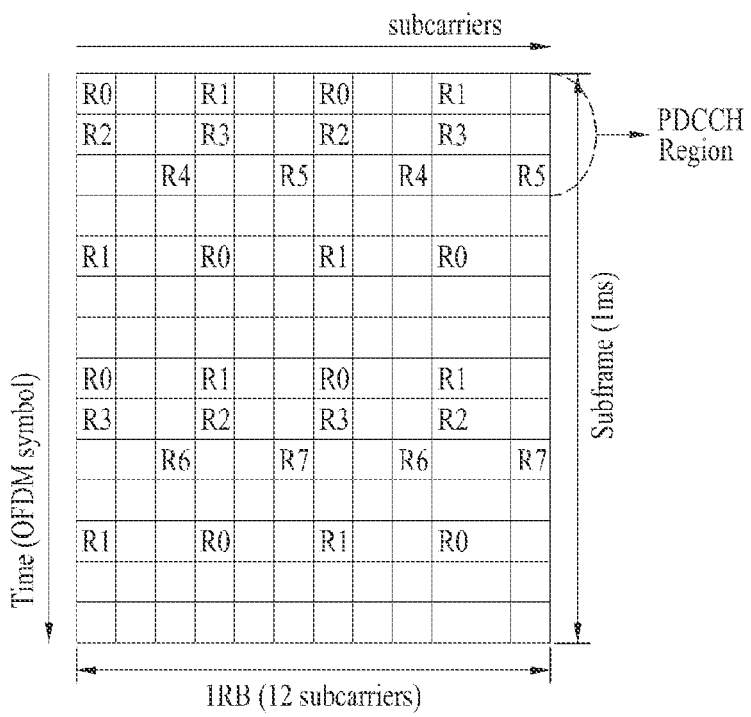
Figure 37:
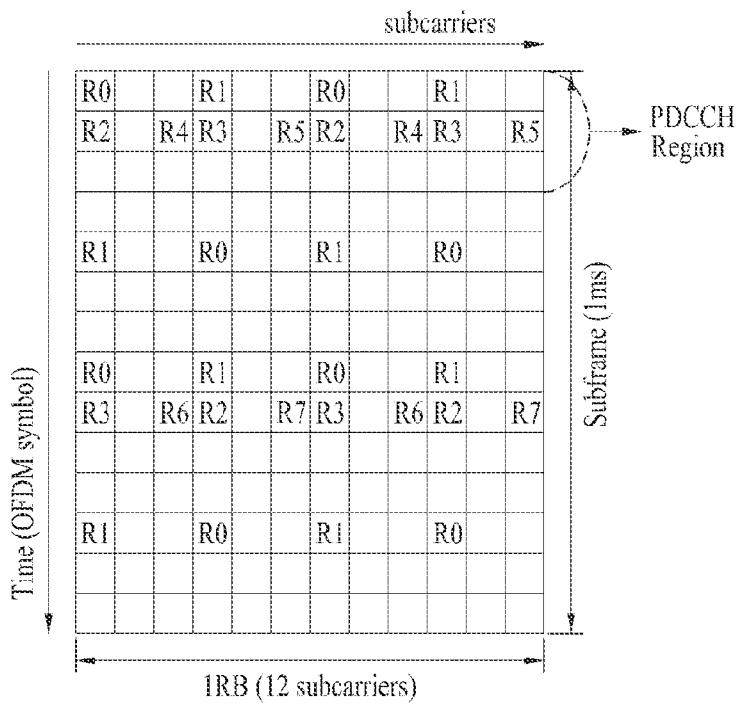
Figure 38:
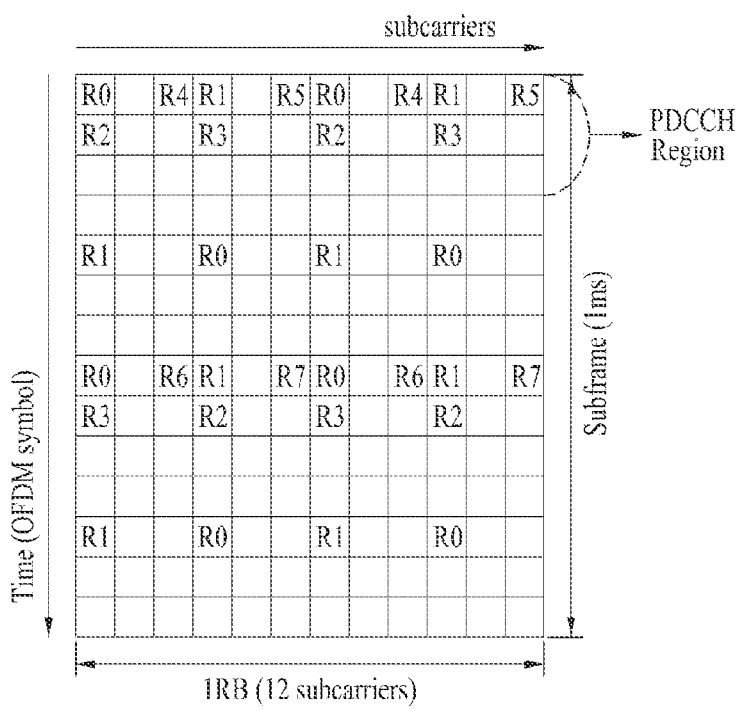

More specifically, FIG. 24 illustrates a structure shifting R4 to R7 by as much as m=1, in the pilot structure of FIG. 23. FIG. 25 illustrates a structure shifting R4 to R7 by as much as m=2, in the pilot structure of FIG. 23. FIG. 26 illustrates a structure shifting R4 to R7 by as much as n=1 in the pilot structure of FIG. 23. FIG. 28 illustrates a structure shifting R4 to R7 by as much as m=1, n=1, in the pilot structure of FIG. 23. FIG. 28 to FIG. 38 correspond to pilot structures having R4 to R7 cyclically shifted along a cyclic subcarrier direction or an OFDM symbol direction, based upon the above-described method with reference to FIG. 20.

Figure 39:
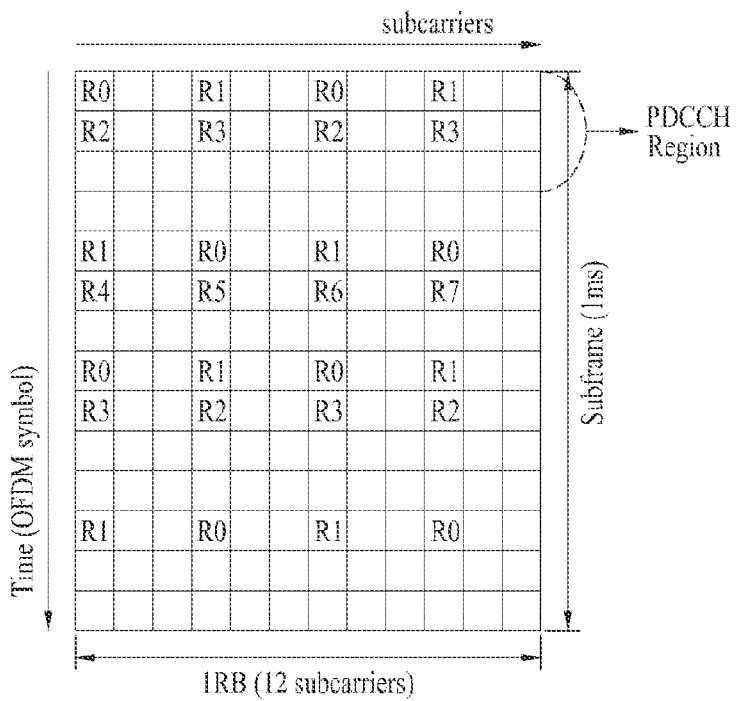
FIG. 39 illustrates a pilot structure according to an embodiment of the present invention.

FIG. 39 illustrates a pilot structure according to an embodiment of the present invention. FIG. 40 to FIG. 74 illustrate structures cyclically shifting R4 to R7 within the pilot structure of FIG. 39 along a subcarrier direction or along an OFDM symbol direction.

Figure 40:
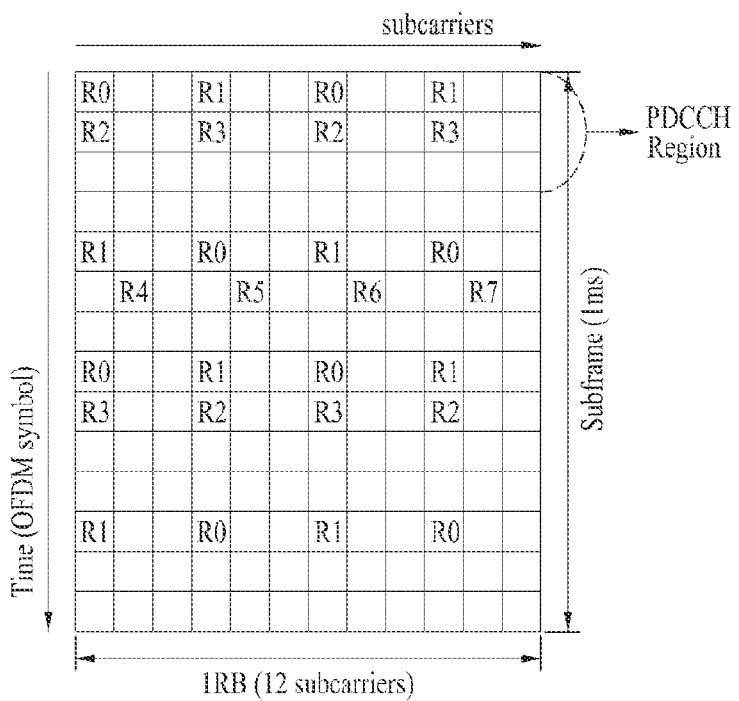
FIG. 40 to FIG. 74 illustrate structures cyclically shifting R4 to R7 within the pilot structure of FIG. 39 along a subcarrier direction or along an OFDM symbol direction.
Figure 41:
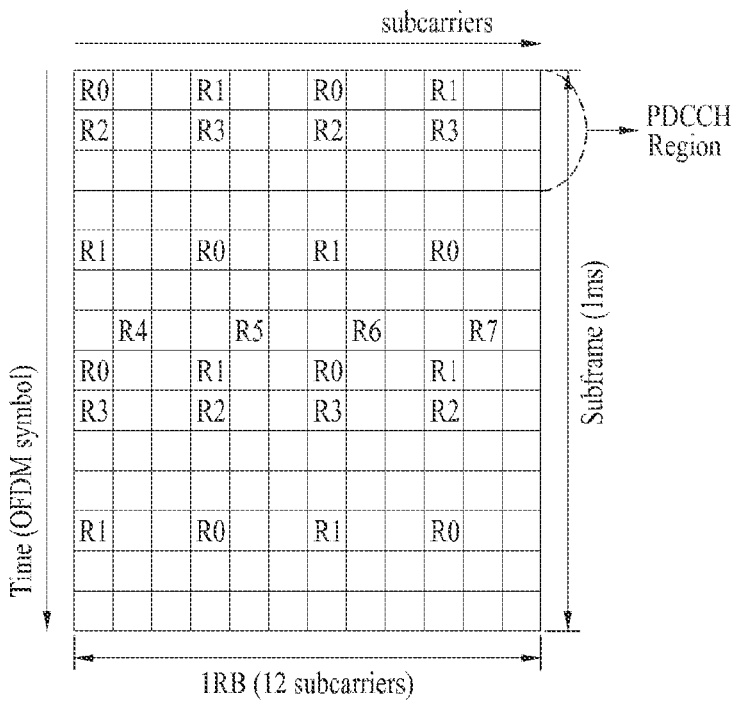
Figure 42:
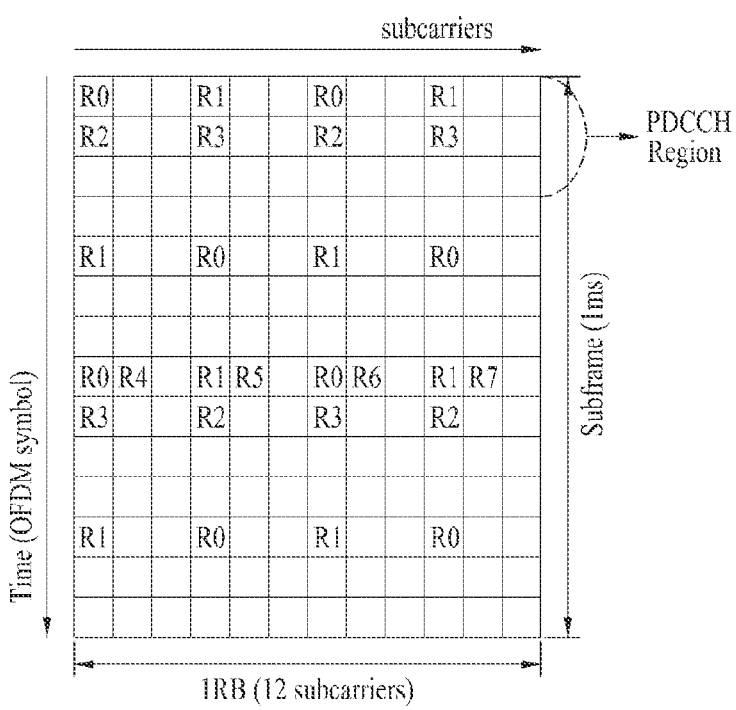
Figure 43:
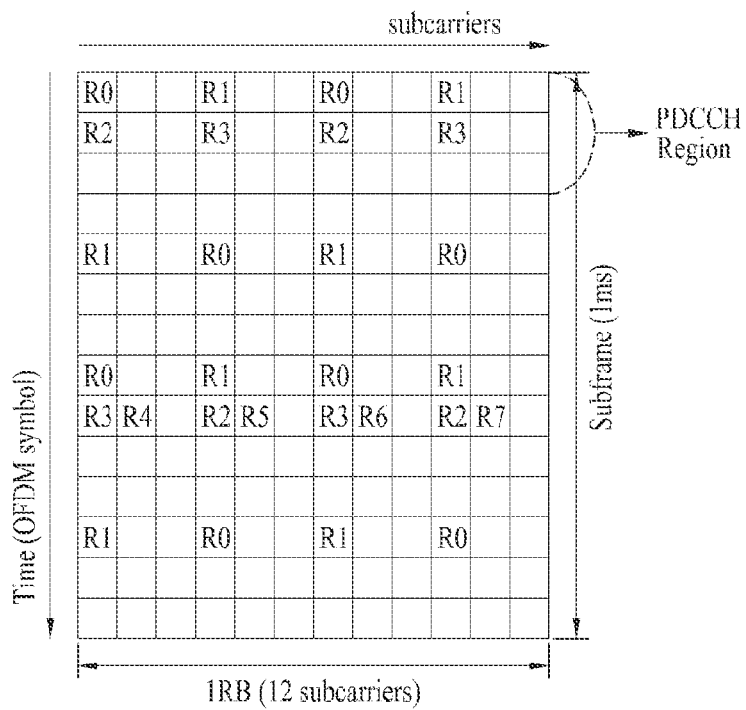
Figure 44:
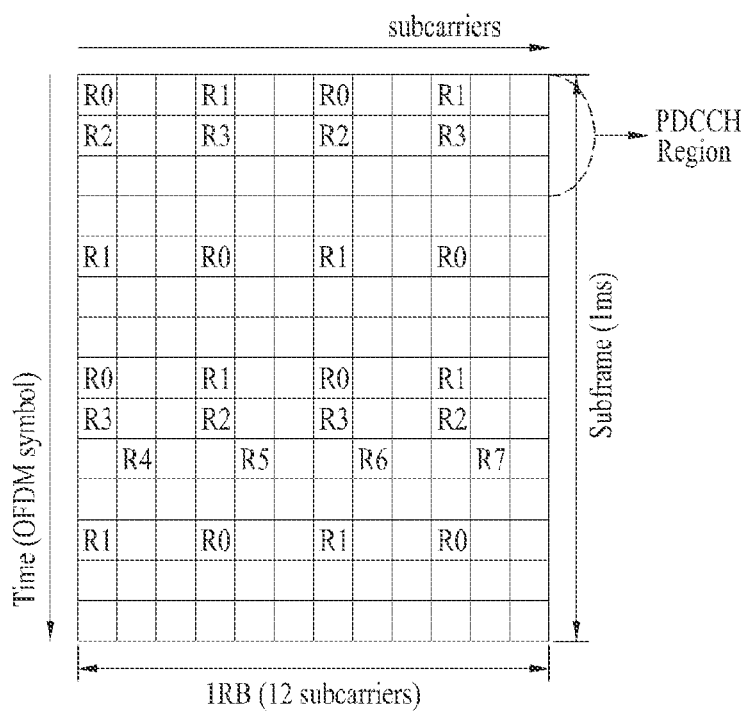
Figure 45:
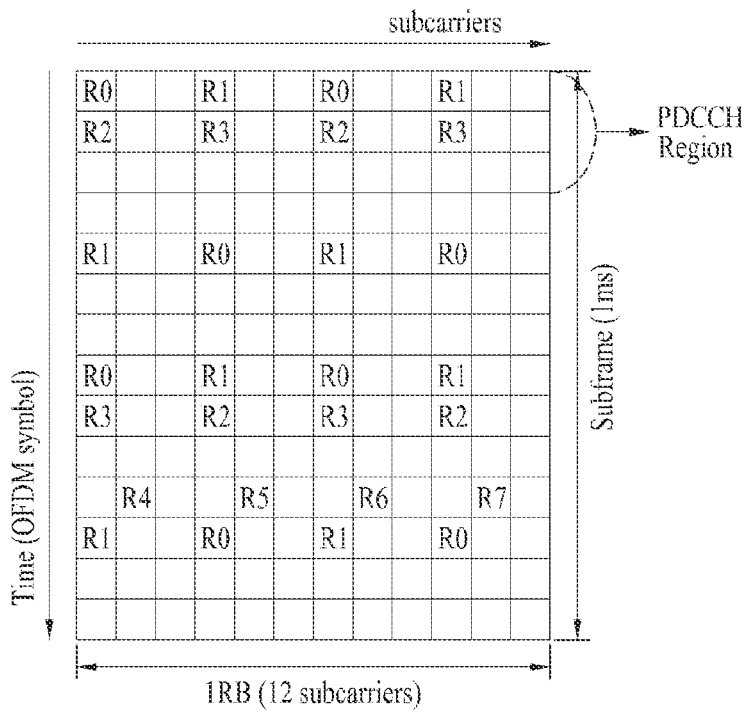
Figure 46:
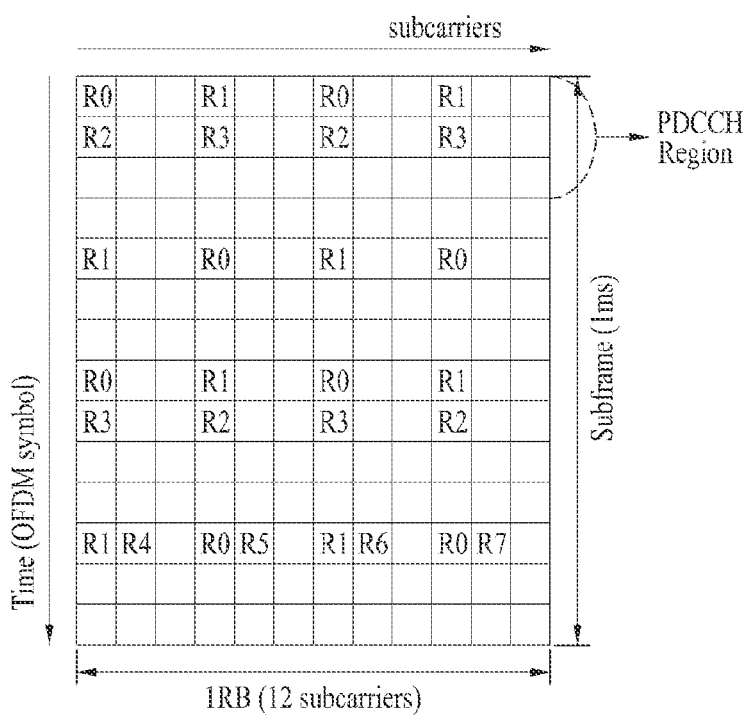
Figure 47:
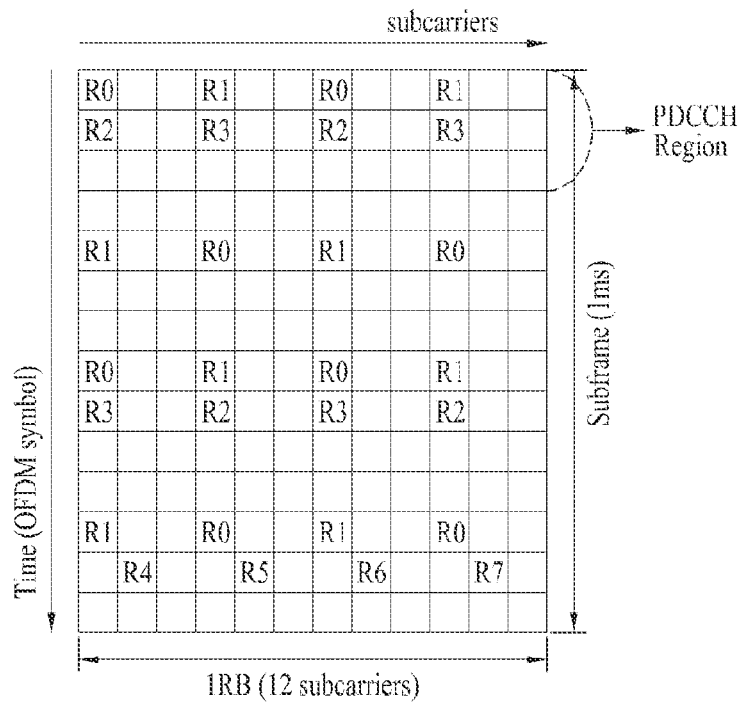
Figure 48:
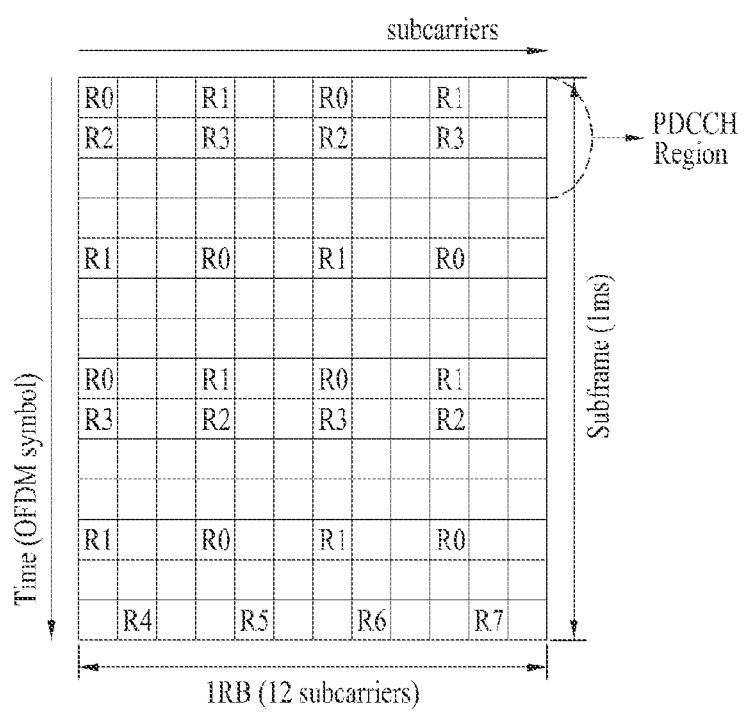
Figure 49:
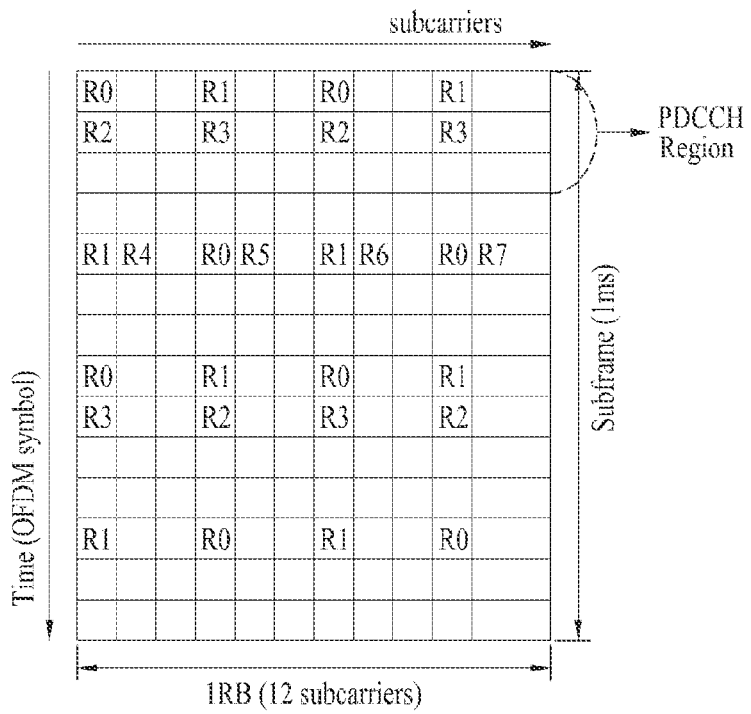
Figure 50:
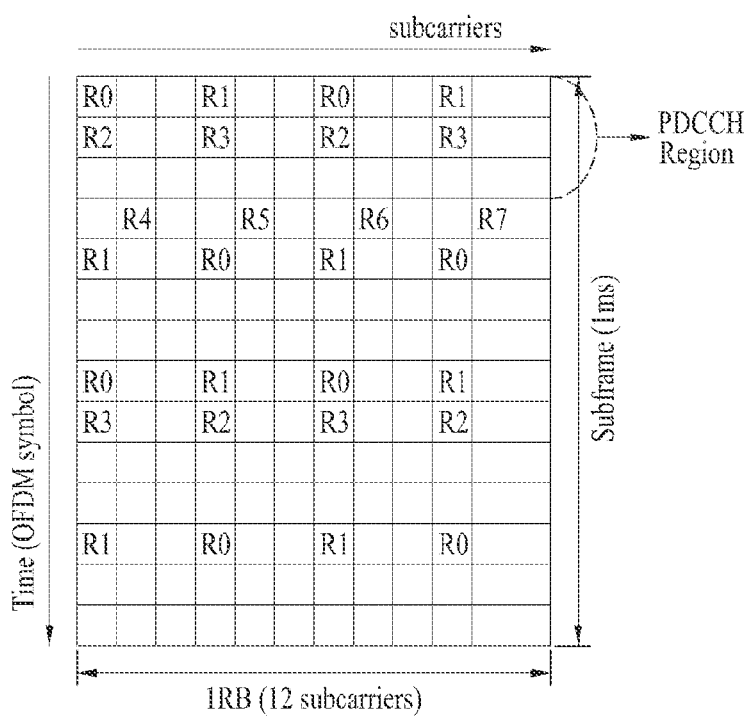
Figure 51:
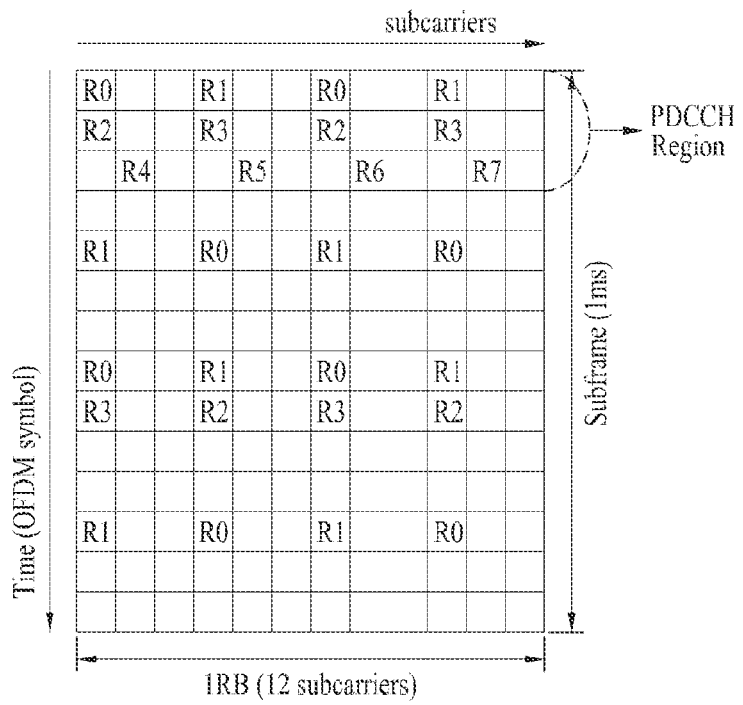
Figure 52:
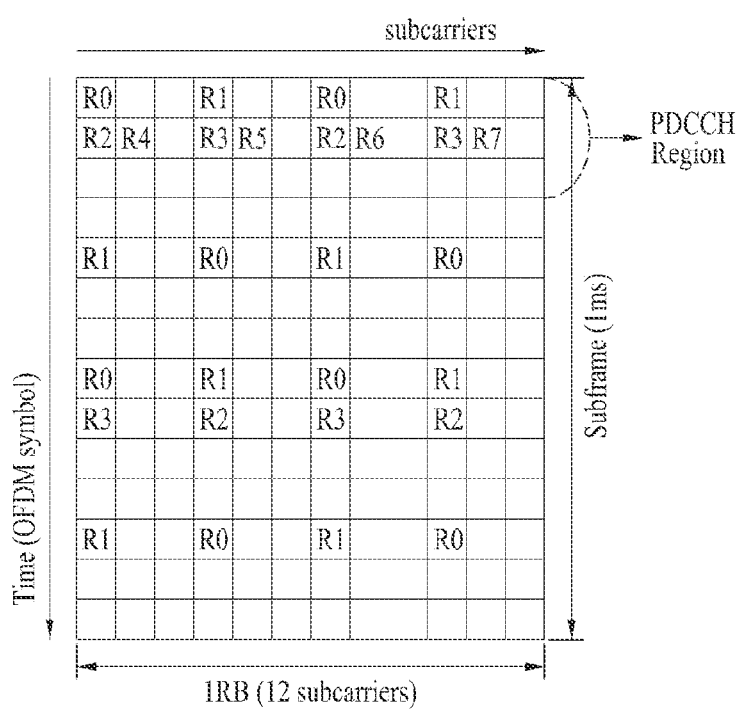
Figure 53:
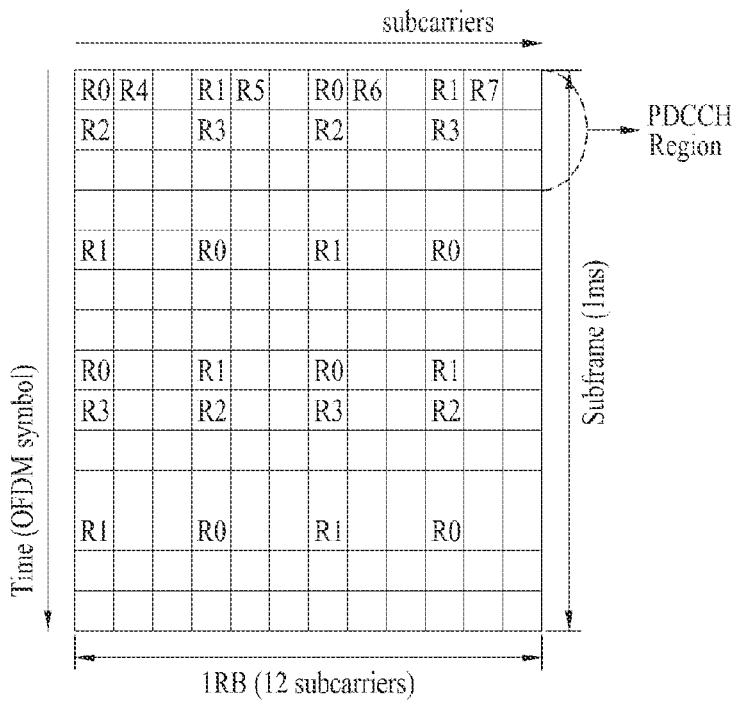
Figure 54:
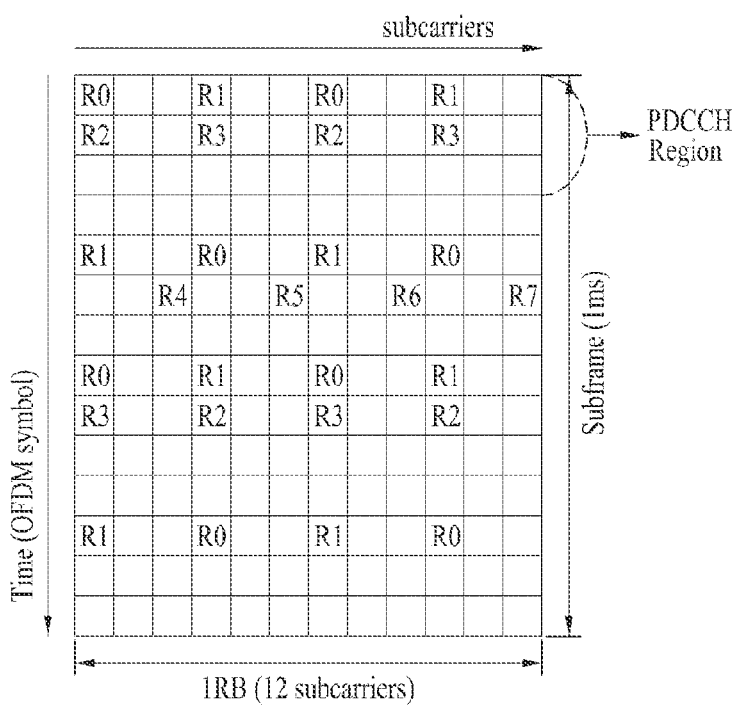
Figure 55:
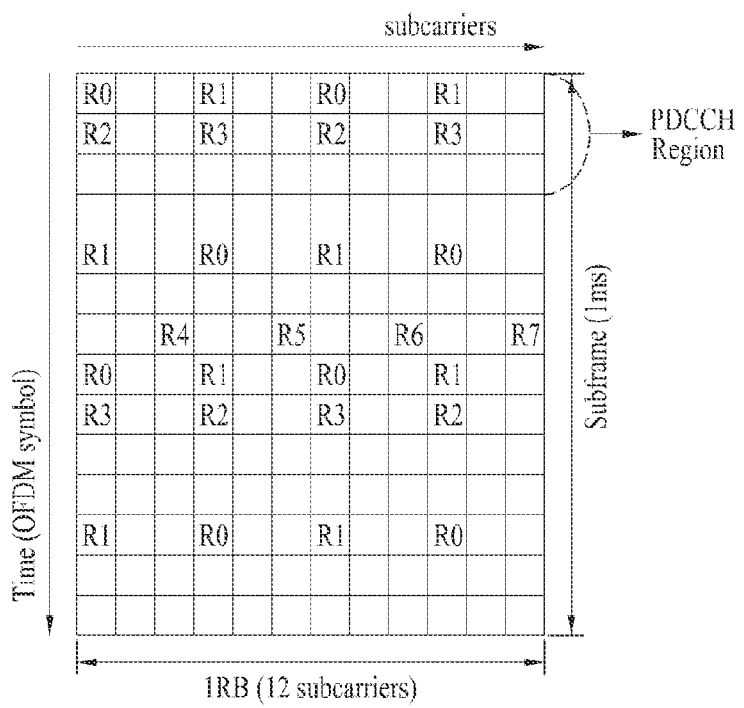
Figure 56:
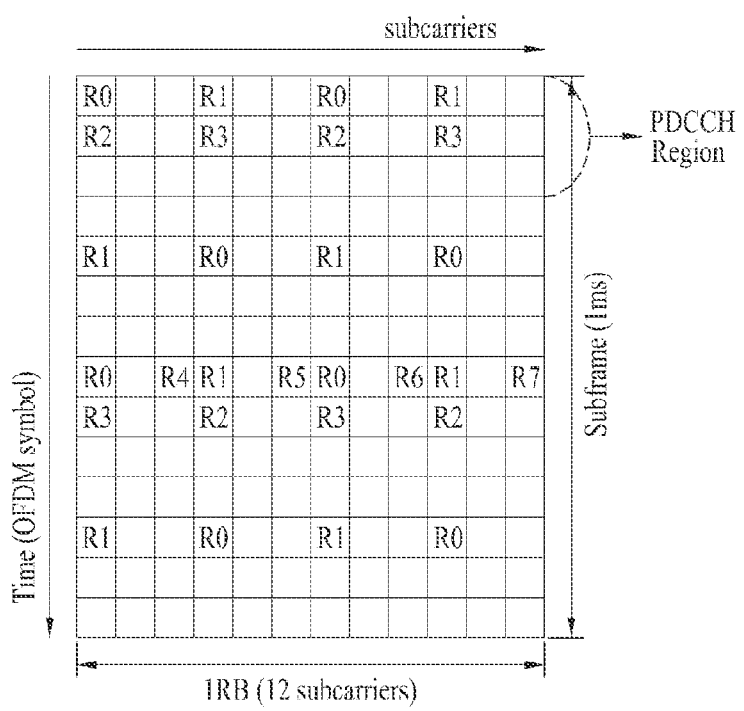
Figure 57:
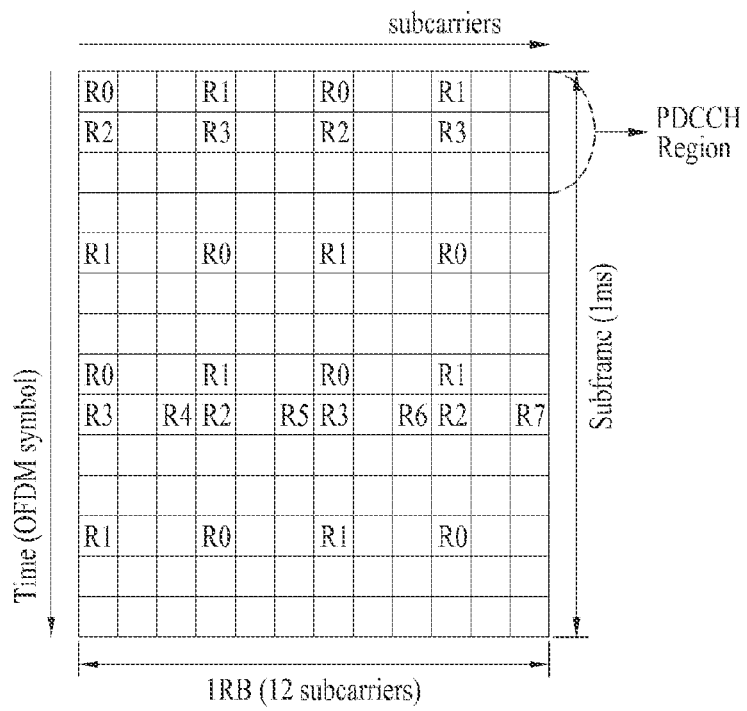
Figure 58:
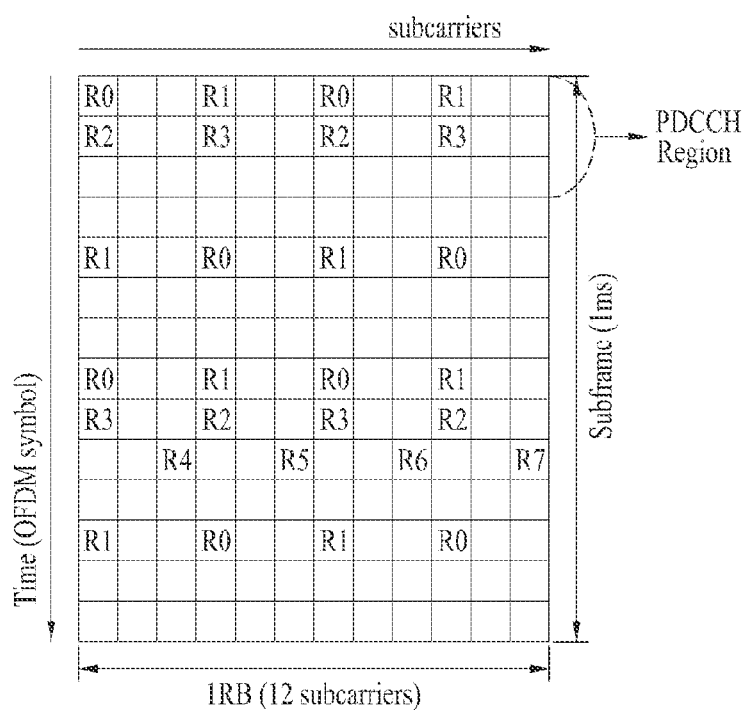
Figure 59:
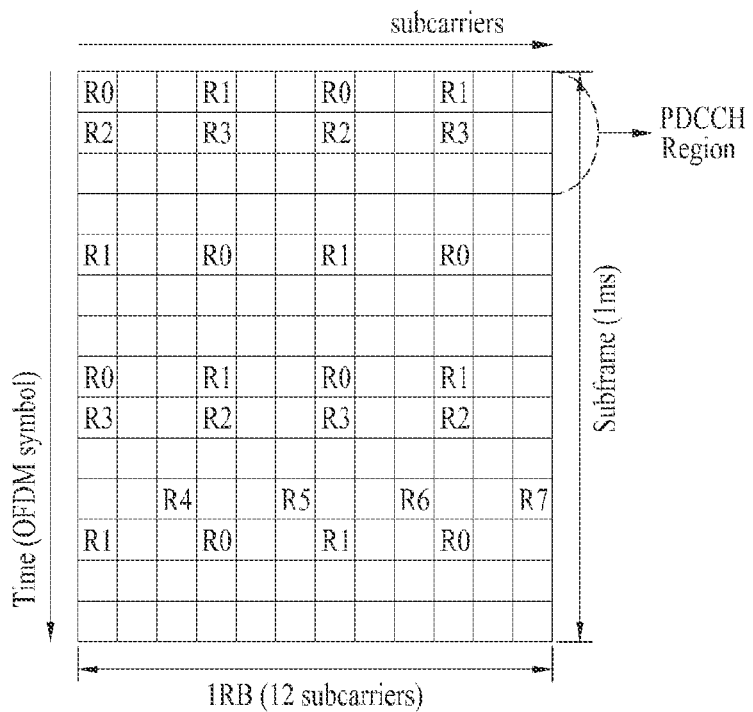
Figure 60:
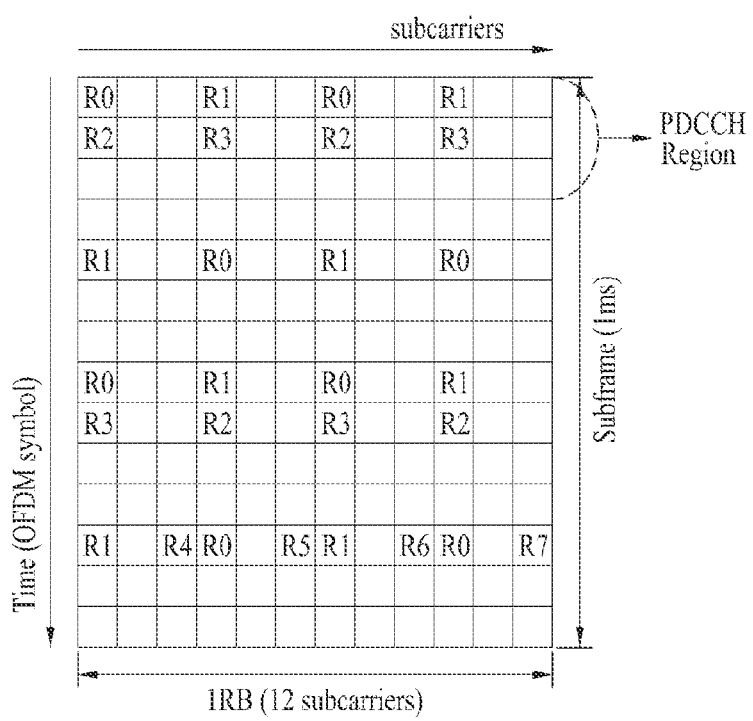
Figure 61:
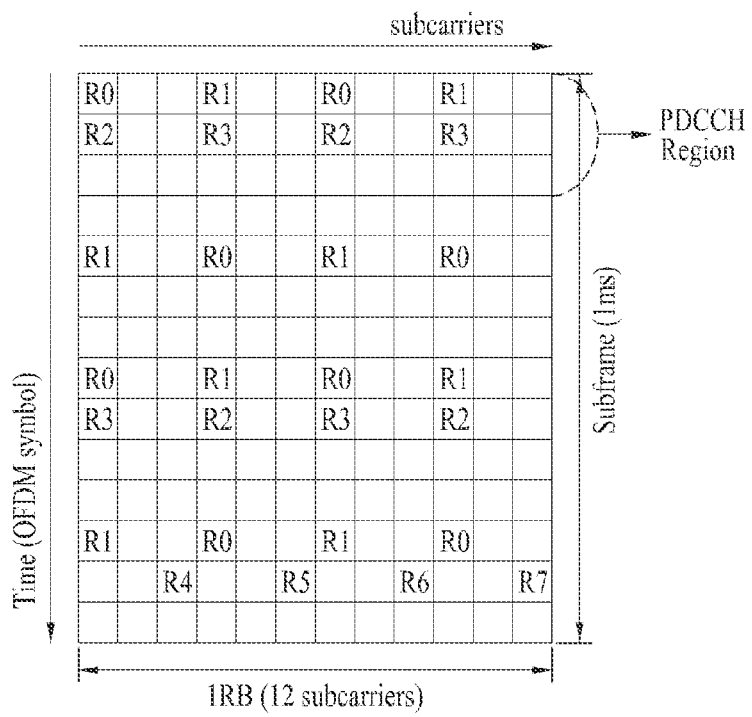
Figure 62:
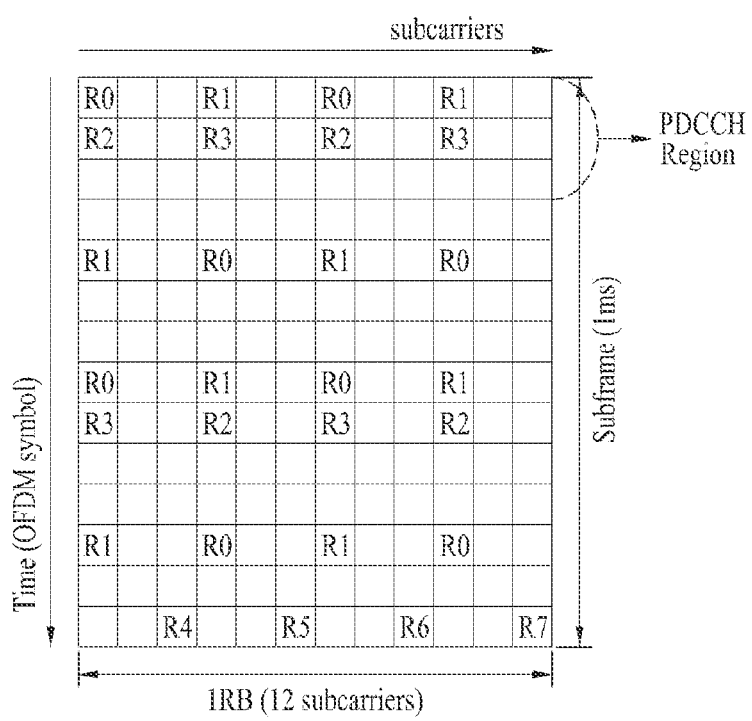
Figure 63:
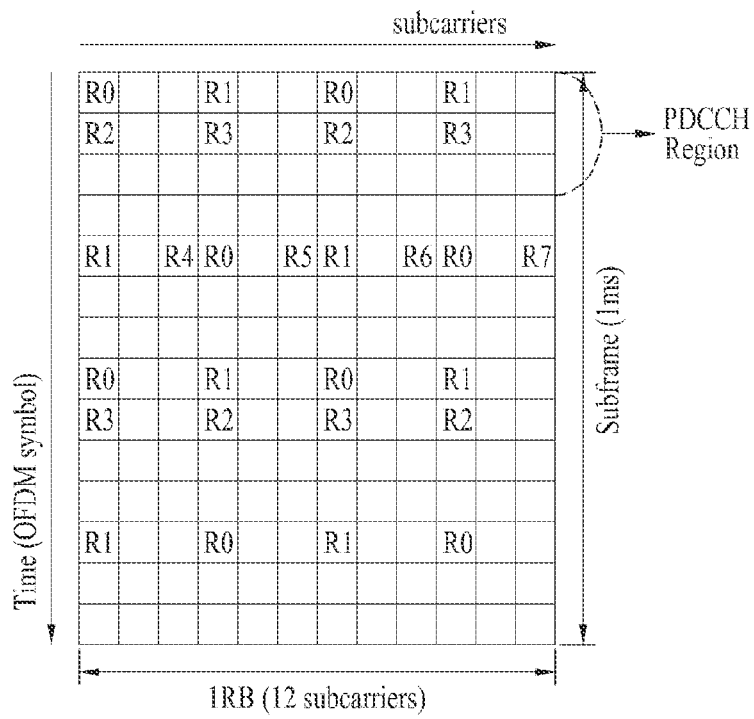
Figure 64:
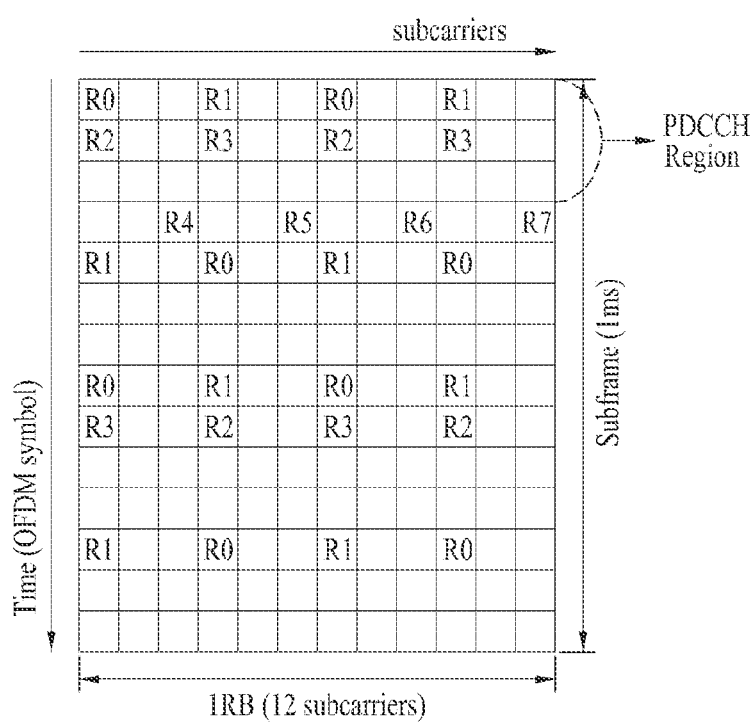
Figure 65:
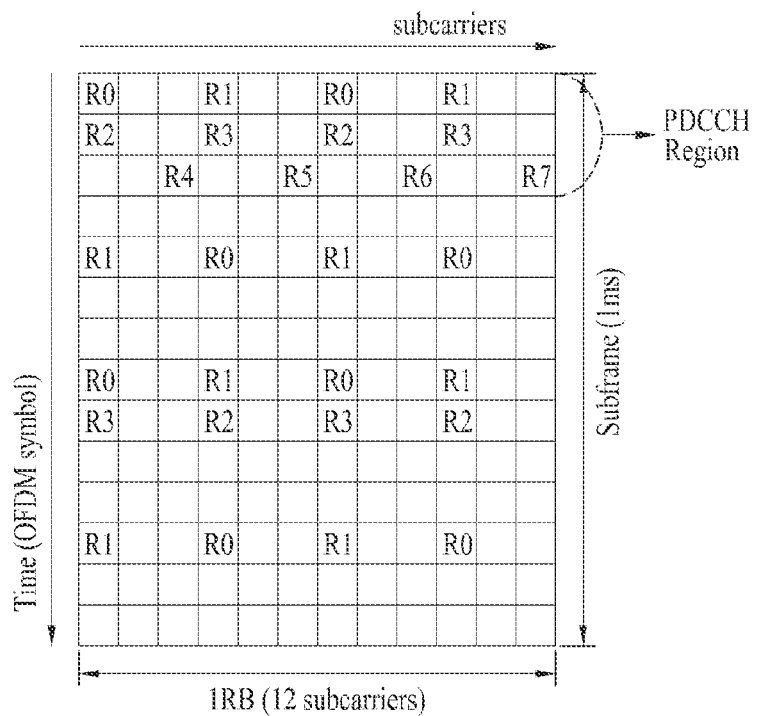
Figure 66:
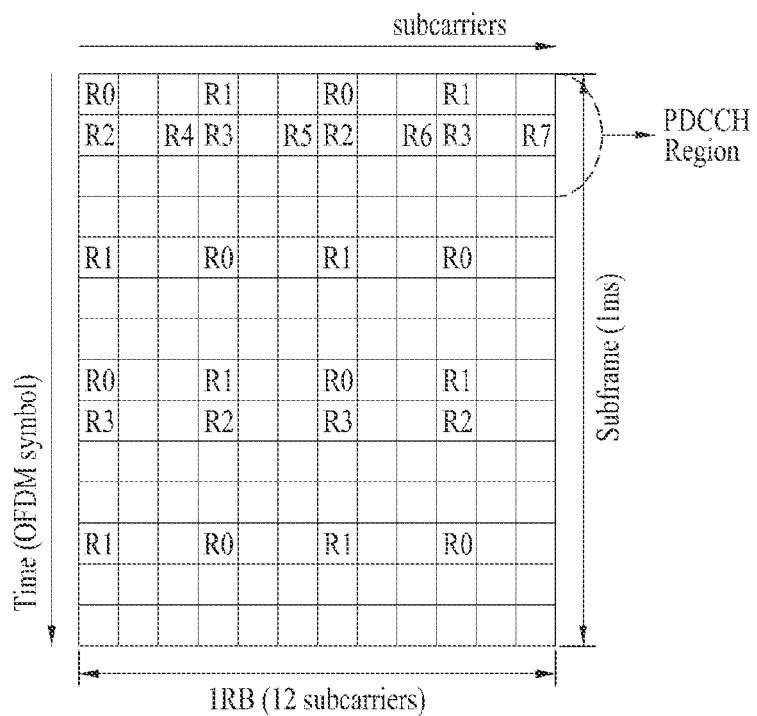
Figure 67:
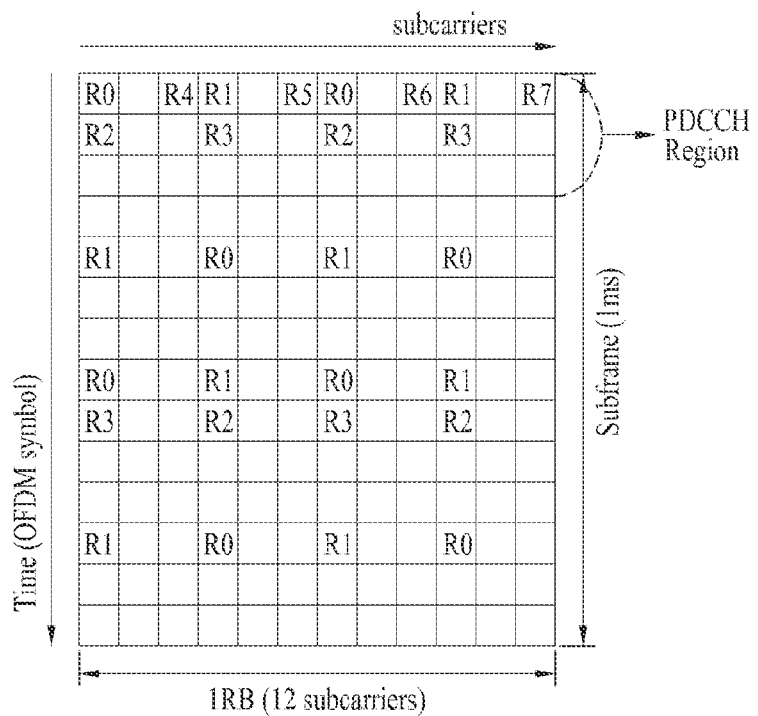
Figure 68:
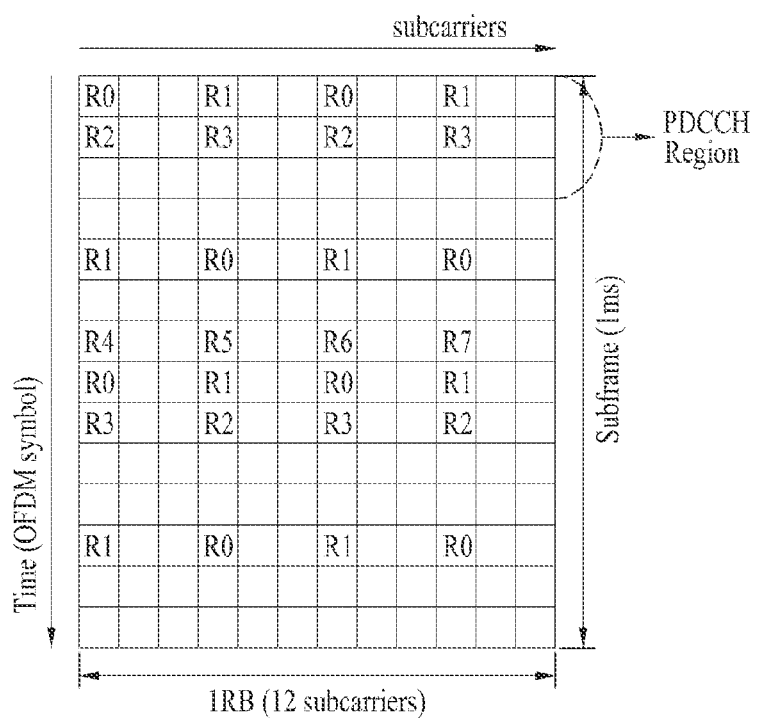
Figure 69:
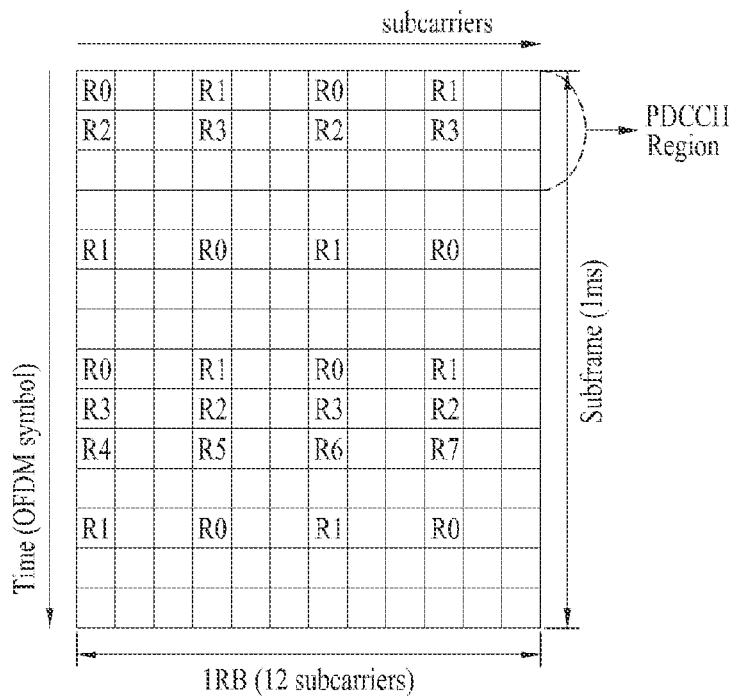
Figure 70:
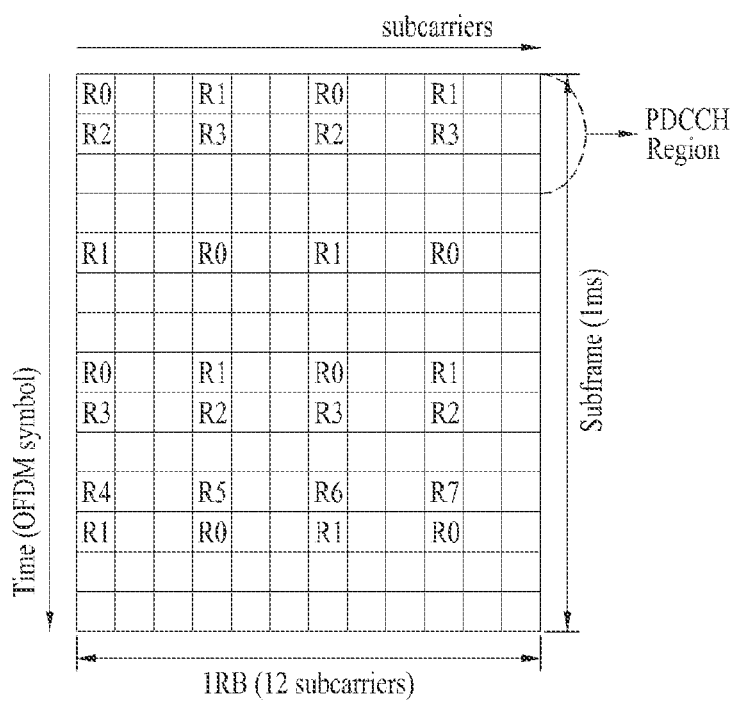
Figure 71:
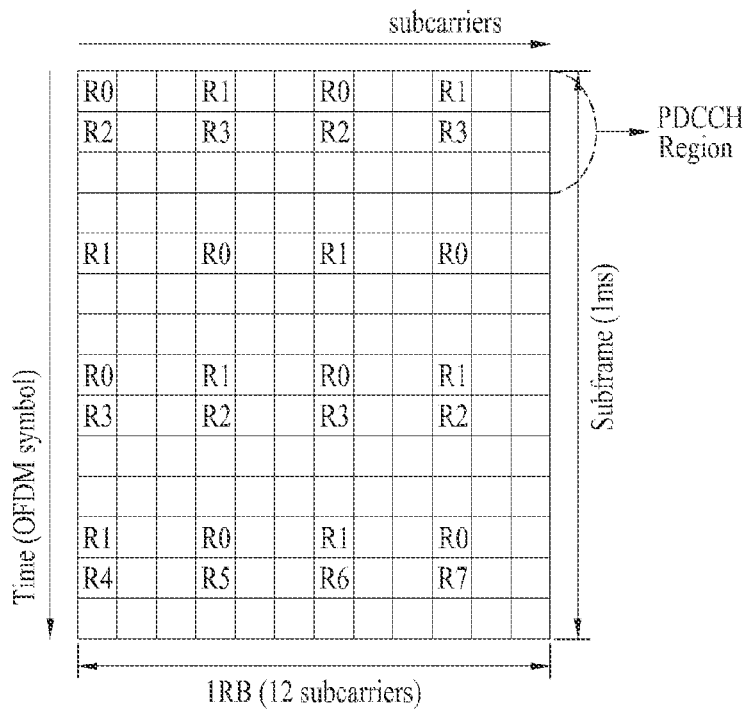
Figure 72:
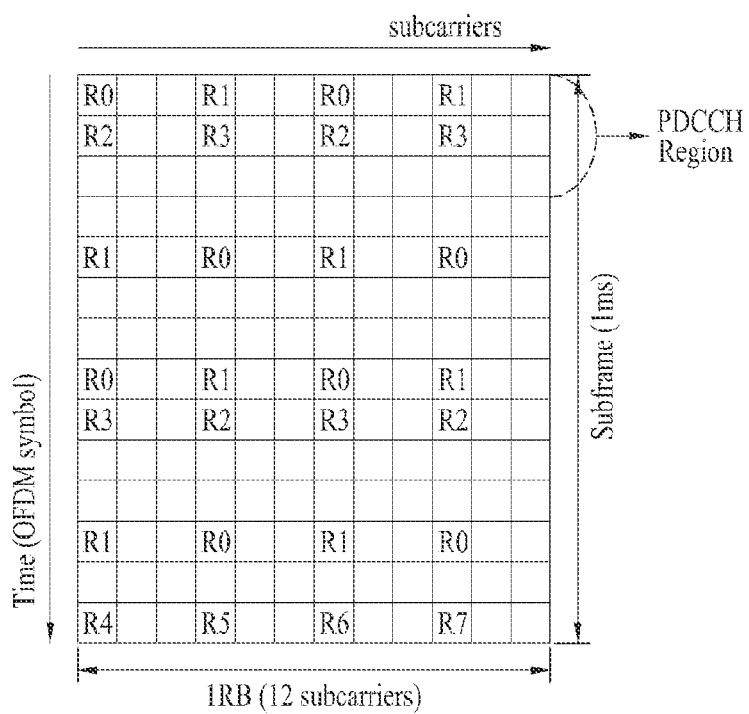
Figure 73:
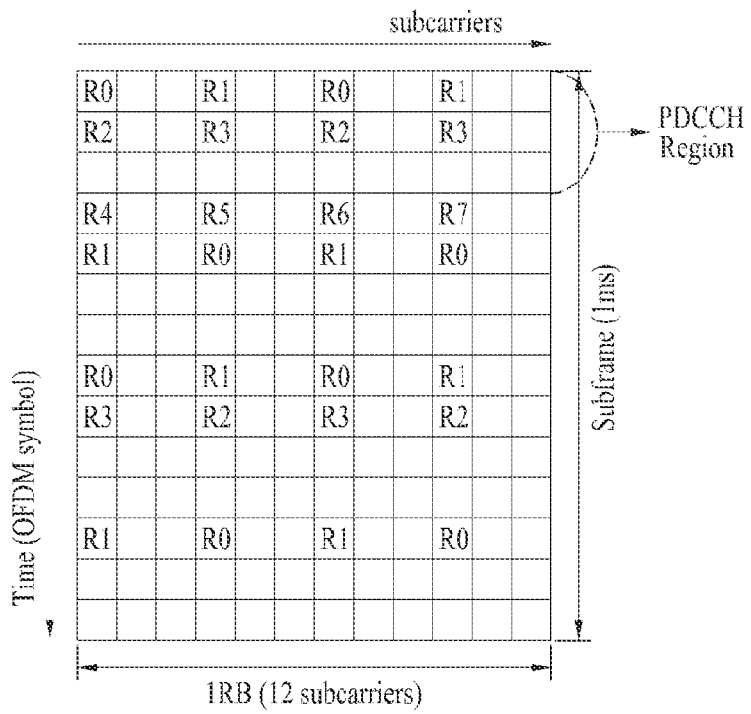
Figure 74:
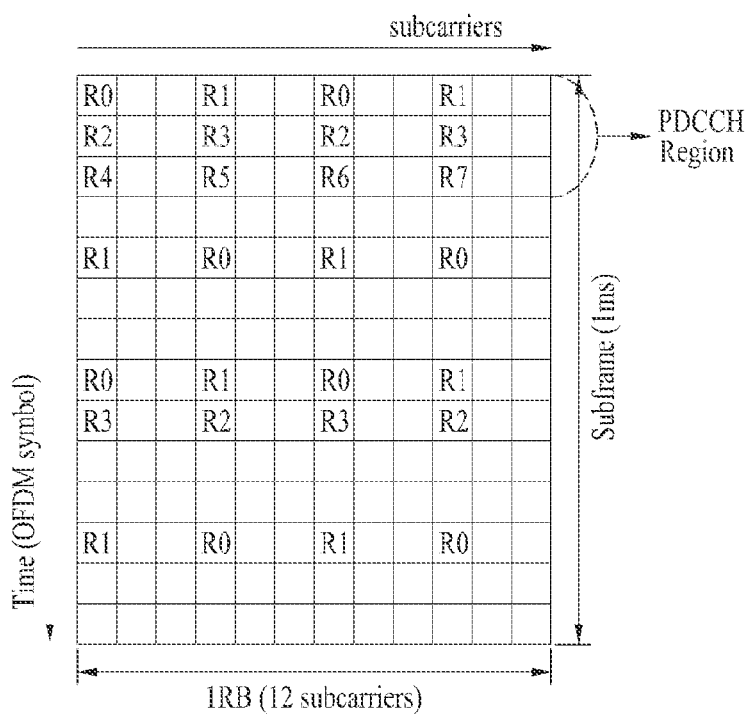

More specifically, FIG. 40 illustrates Fig. illustrates a structure shifting R4 to R7 by as much as m=1, in the pilot structure of FIG. 39. FIG. 41 illustrates a structure shifting R4 to R7 by as much as m=1, n=1, in the pilot structure of FIG. 39. FIG. 42 illustrates a structure shifting R4 to R7 by as much as m=1, n=2 in the pilot structure of FIG. 39. FIG. 43 illustrates a structure shifting R4 to R7 by as much as m=1, n=3, in the pilot structure of FIG. 39. The remaining FIG. 44 to FIG. 74 correspond to pilot structures having R4 to R7 of the pilot structure of FIG. 23 cyclically shifted along a cyclic subcarrier direction or an OFDM symbol direction, based upon the above-described method with reference to FIG. 20.

Figure 75:
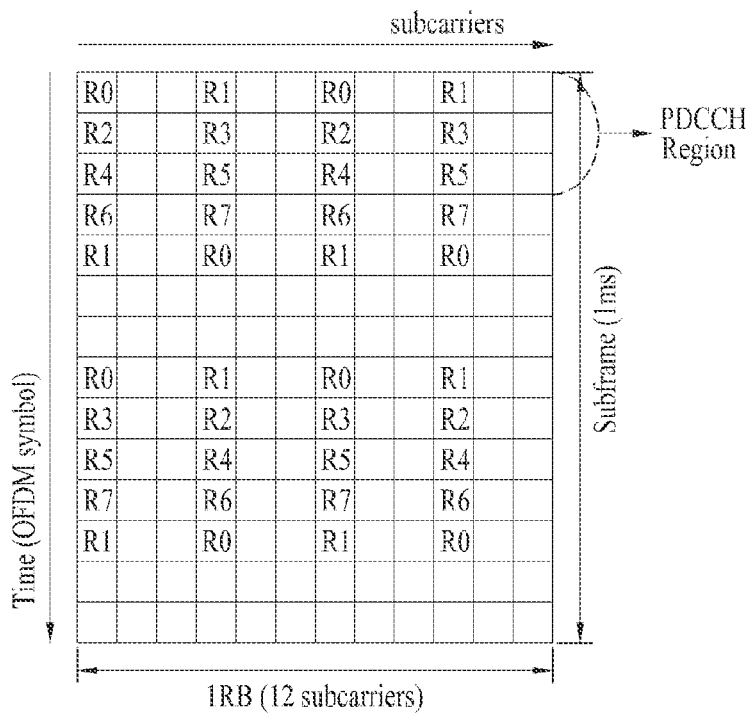
FIG. 75 illustrates a pilot structure according to an embodiment of the present invention.
Figure 76:
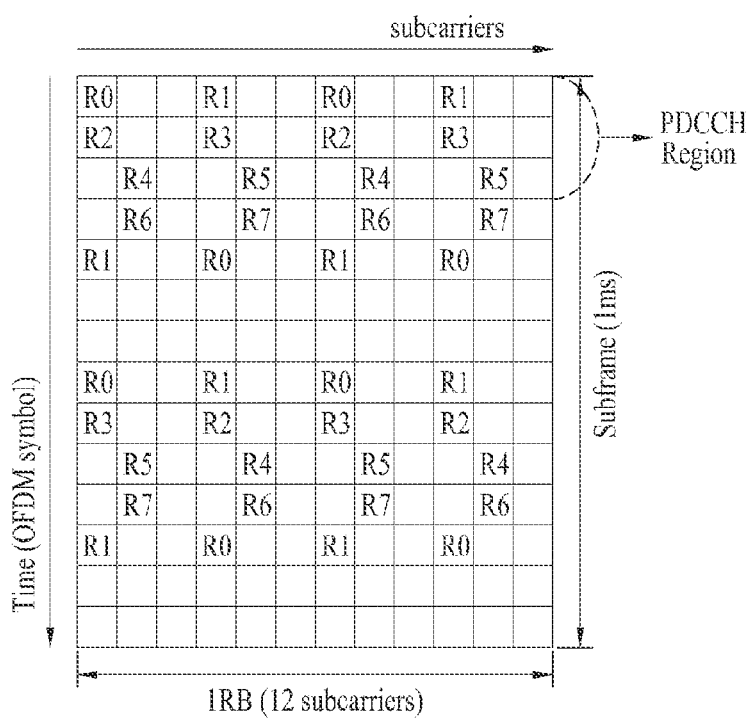
FIG. 76 illustrates a structure cyclically shifting R4 to R7 within the pilot structure of FIG. 75 along a subcarrier direction or along an OFDM symbol direction.

FIG. 75 illustrates a pilot structure according to an embodiment of the present invention. FIG. 76 illustrates a structure cyclically shifting R4 to R7 within the pilot structure of FIG. 75 along a subcarrier direction or along an OFDM symbol direction. More specifically, FIG. 76 illustrates a pilot structure shifting R4 to R7 by as much as m=1, in the pilot structure of FIG. 75.

Figure 77:
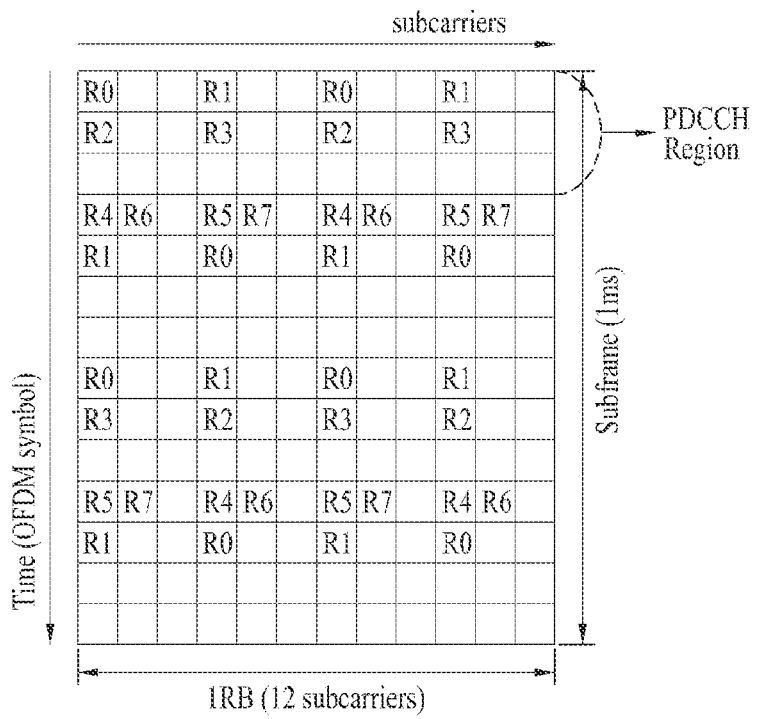
FIG. 77 illustrates a pilot structure according to an embodiment of the present invention.
Figure 78:
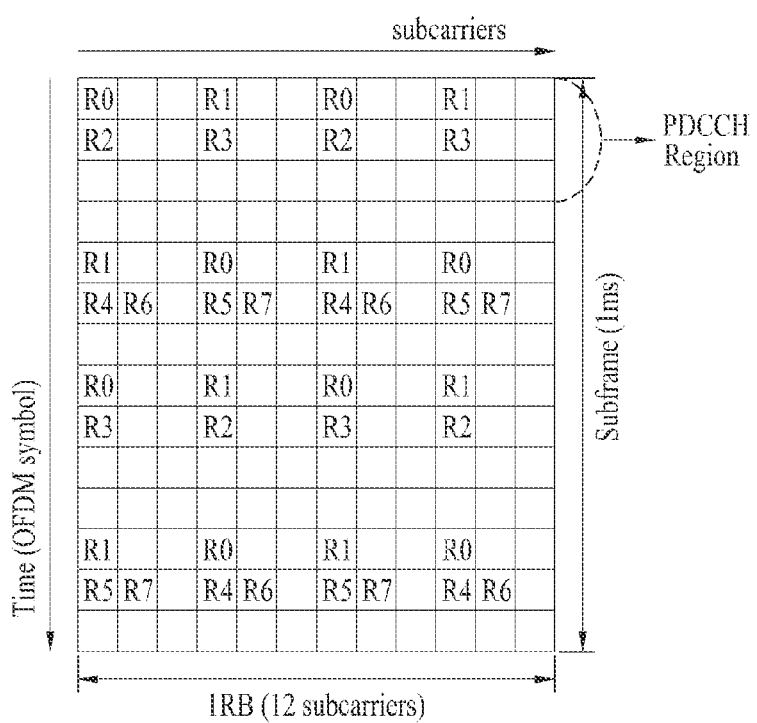
FIG. 78 to FIG. 93 illustrate structures cyclically shifting R4 to R7 within the pilot structure of FIG. 77 along a subcarrier direction or along an OFDM symbol direction.
Figure 79:
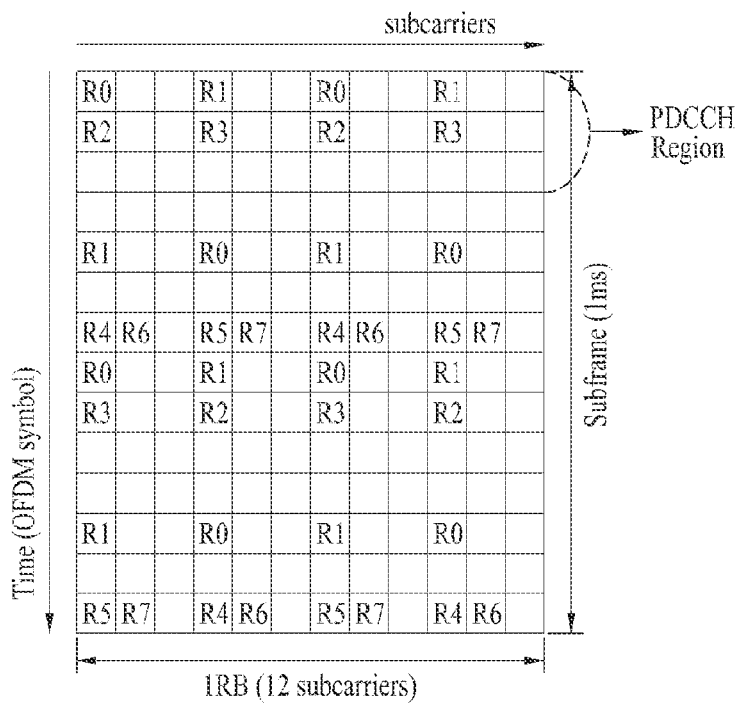
Figure 80:
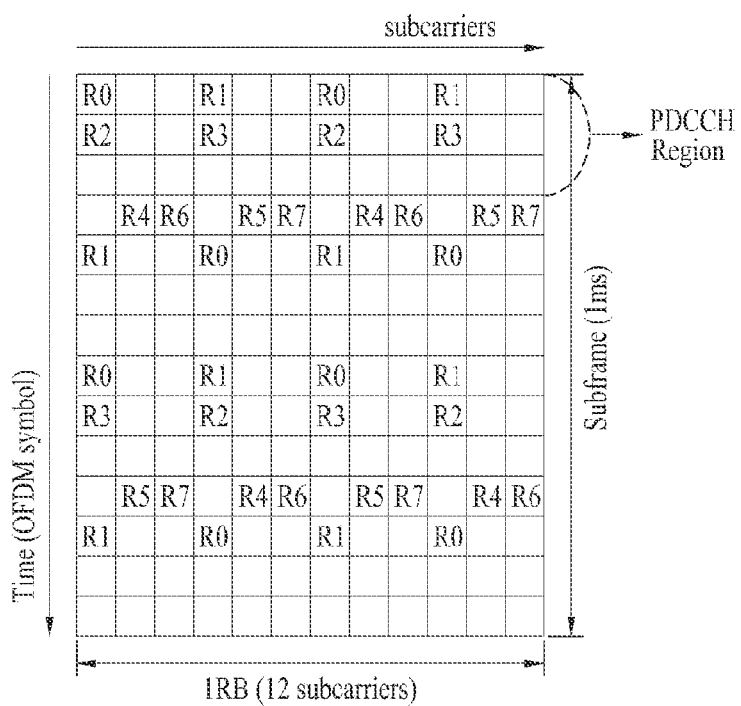
Figure 81:
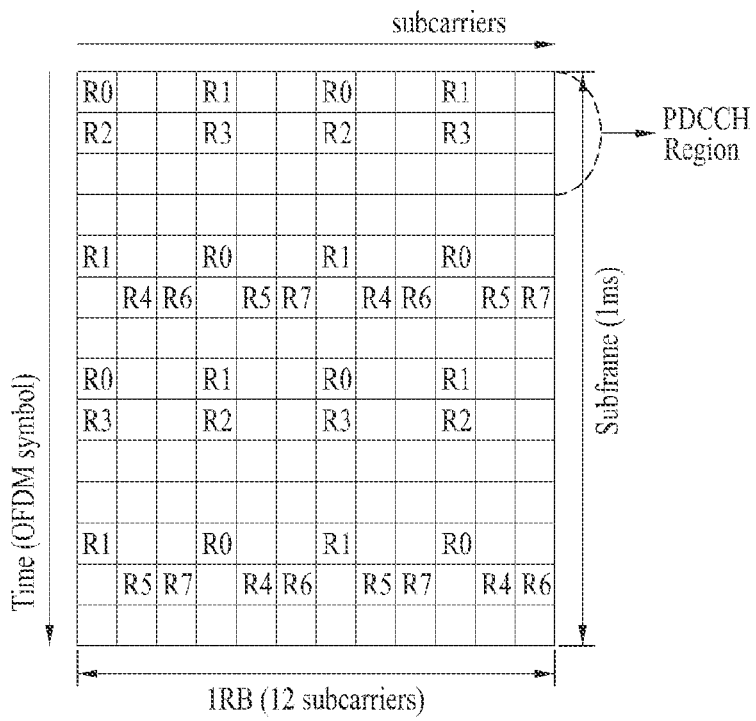
Figure 82:
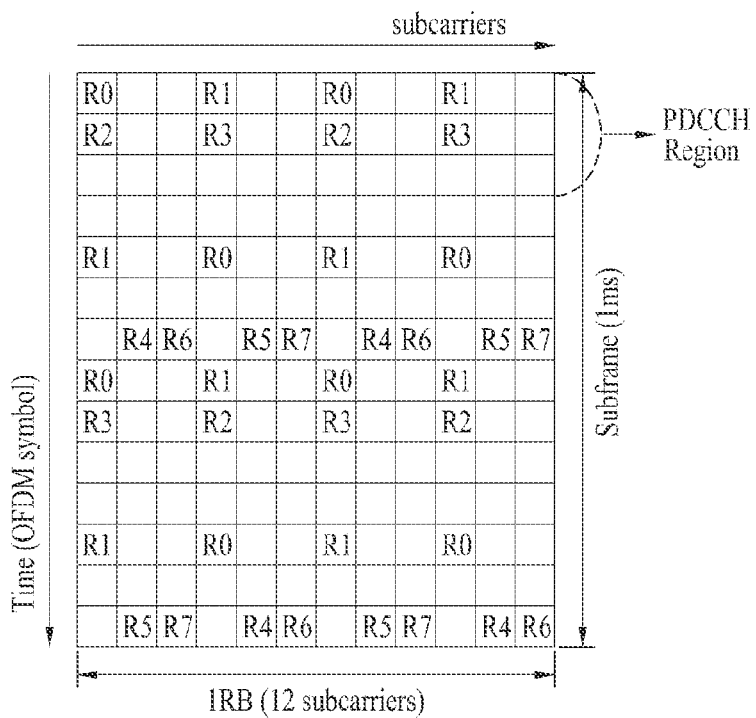
Figure 83:
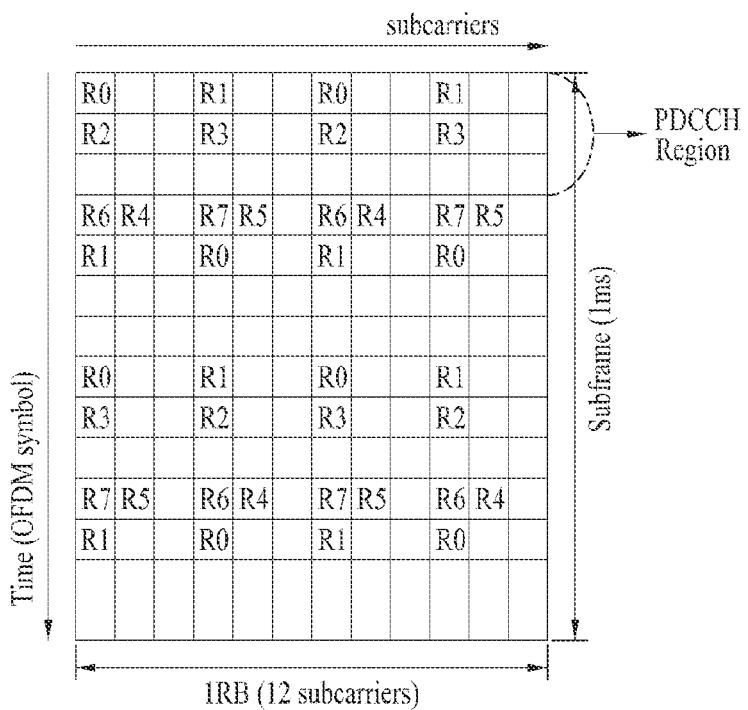
Figure 84:
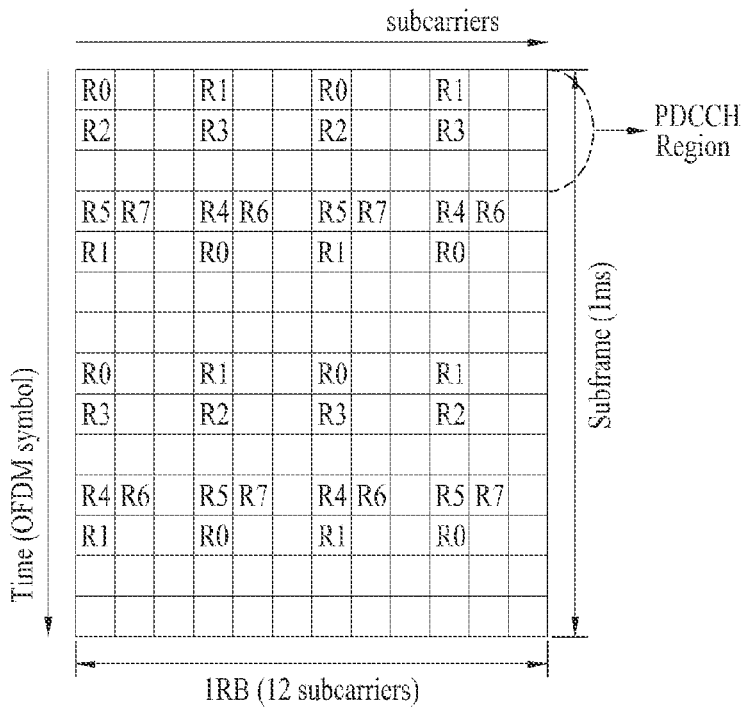
Figure 85:
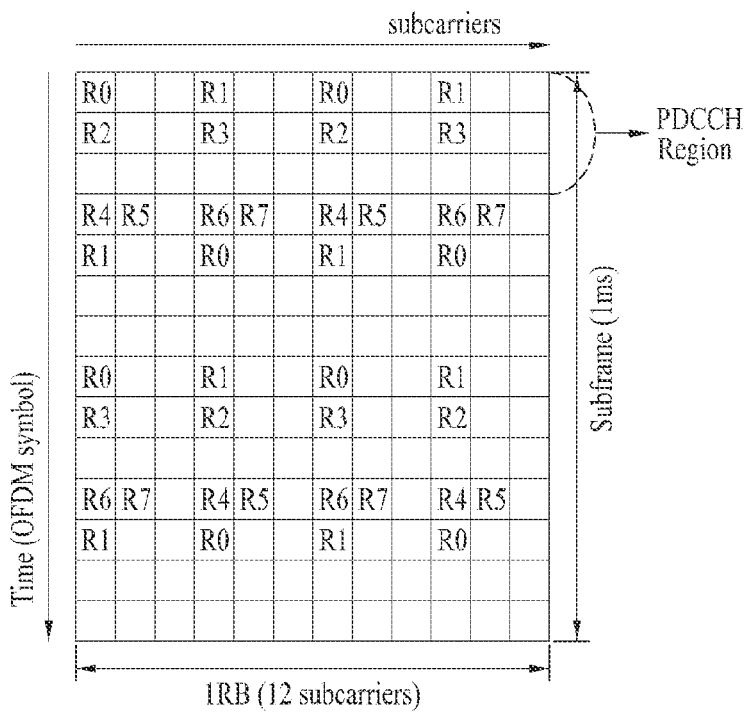
Figure 86:
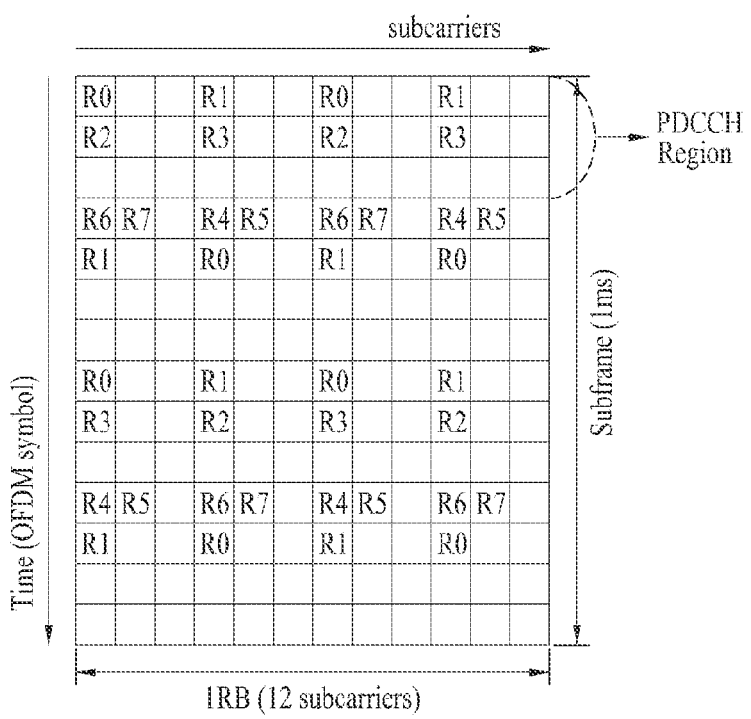
Figure 87:
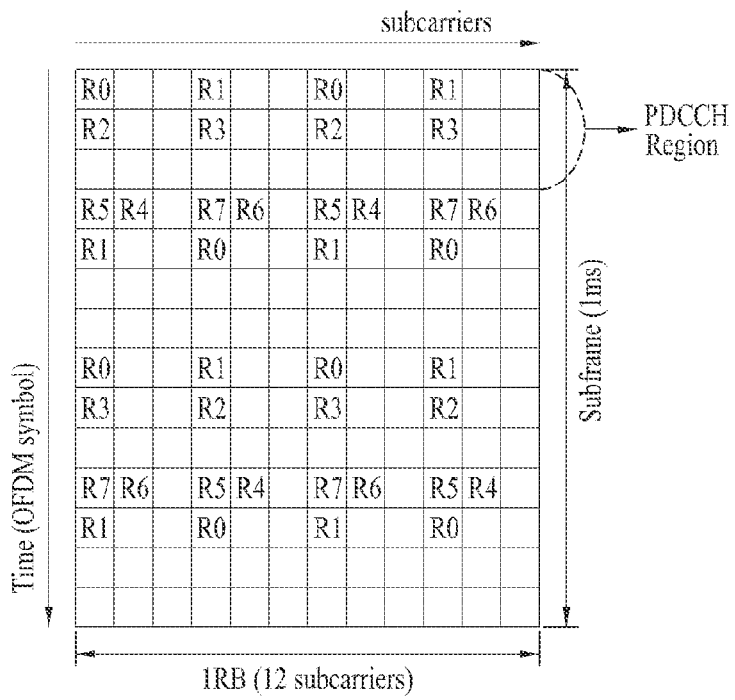
Figure 88:
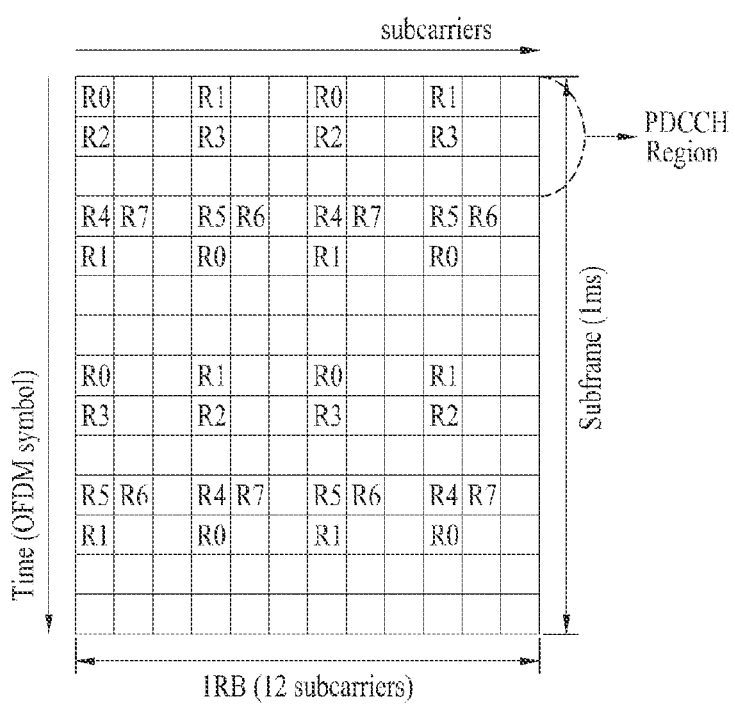
Figure 89:
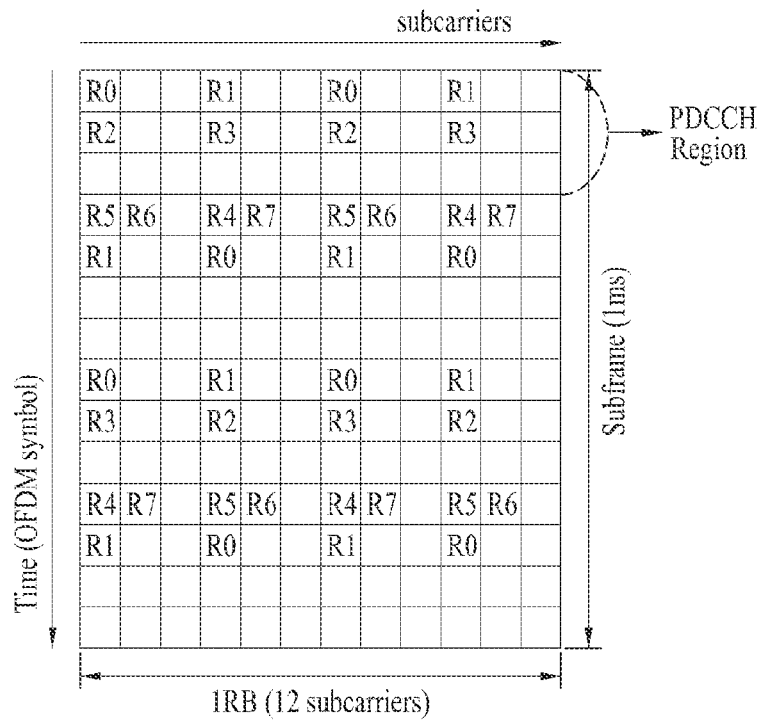
Figure 90:
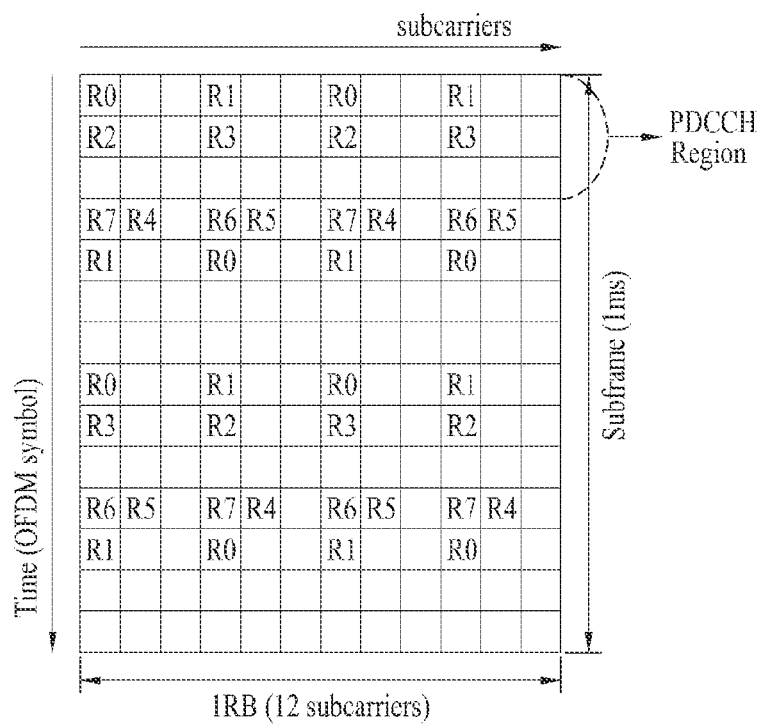
Figure 91:
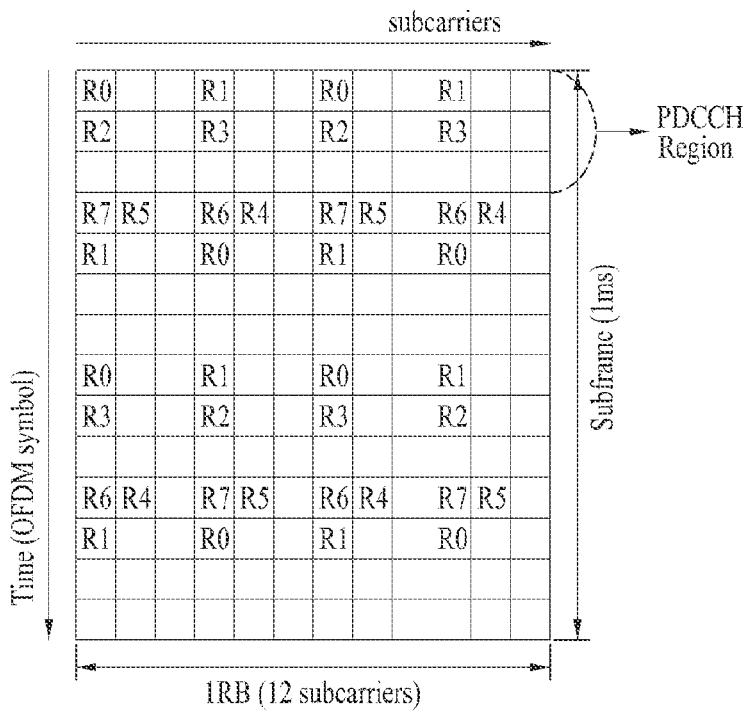
Figure 92:
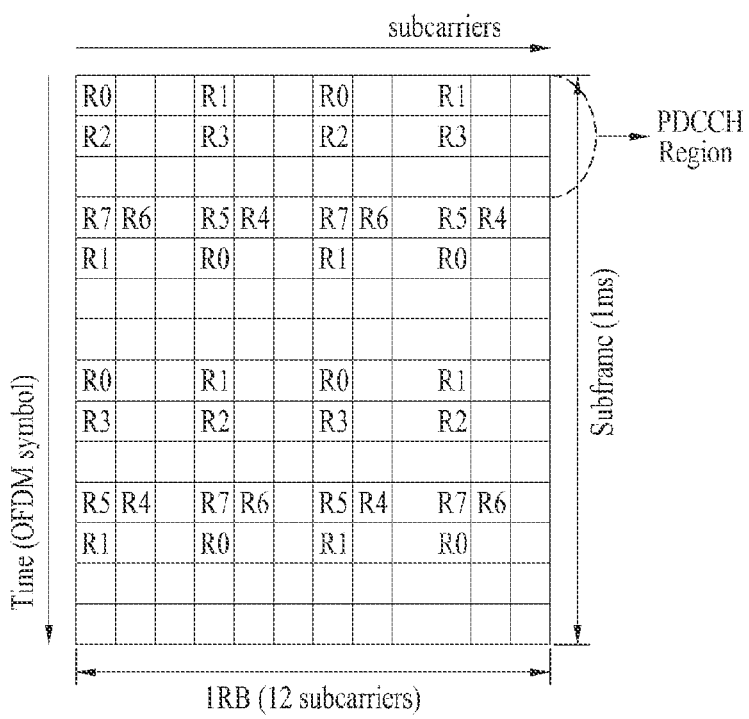
Figure 93:
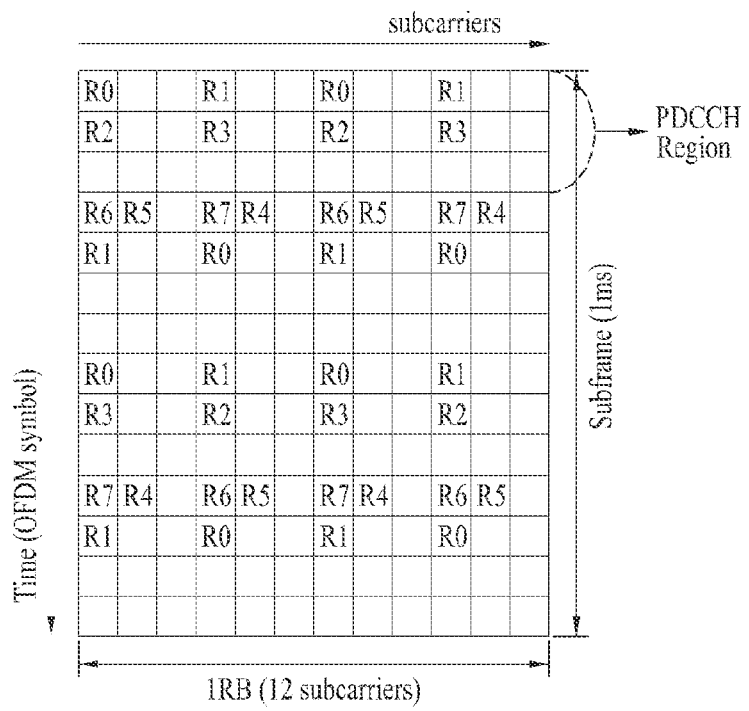

FIG. 77 illustrates a pilot structure according to an embodiment of the present invention. FIG. 78 to FIG. 93 illustrate structures cyclically shifting R4 to R7 within the pilot structure of FIG. 77 along a subcarrier direction or along an OFDM symbol direction. More specifically, FIG. 78 illustrates a pilot structure shifting R4 to R7 by as much as n=2, in the pilot structure of FIG. 77. FIG. 79 illustrates a structure shifting R4 to R7 by as much as n=3, in the pilot structure of FIG. 77. FIG. 80 illustrates a structure shifting R4 to R7 by as much as m=1 in the pilot structure of FIG. 77. The remaining FIG. 81 to FIG. 93 correspond to pilot structures having R4 to R7 of the pilot structure of FIG. 77 cyclically shifted along a cyclic subcarrier direction or an OFDM symbol direction, based upon the above-described method with reference to FIG. 20.

Figure 94:
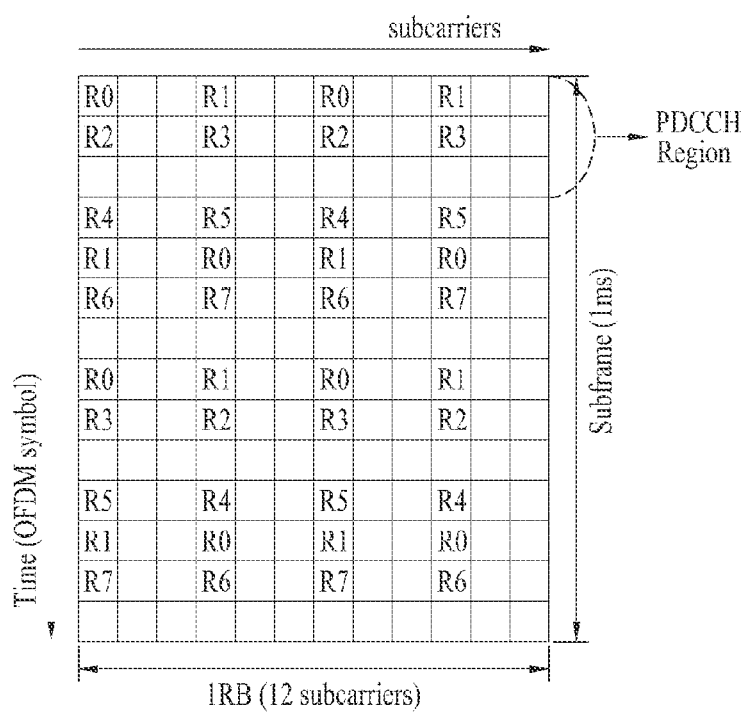
FIG. 94 illustrates a pilot structure according to an embodiment of the present invention.
Figure 95:
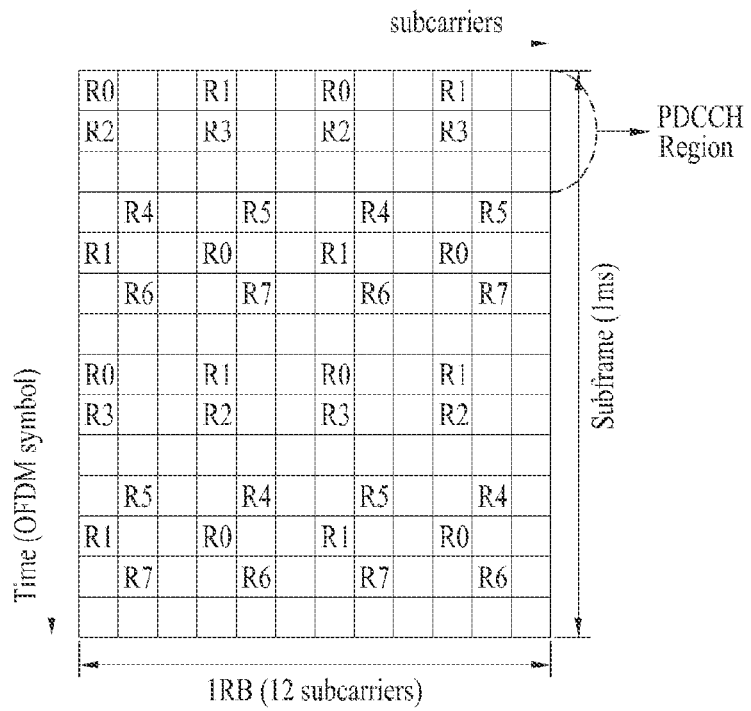
FIG. 95 and FIG. 96 illustrate structures cyclically shifting R4 to R7 within the pilot structure of FIG. 94 along a subcarrier direction or along an OFDM symbol direction.
Figure 96:
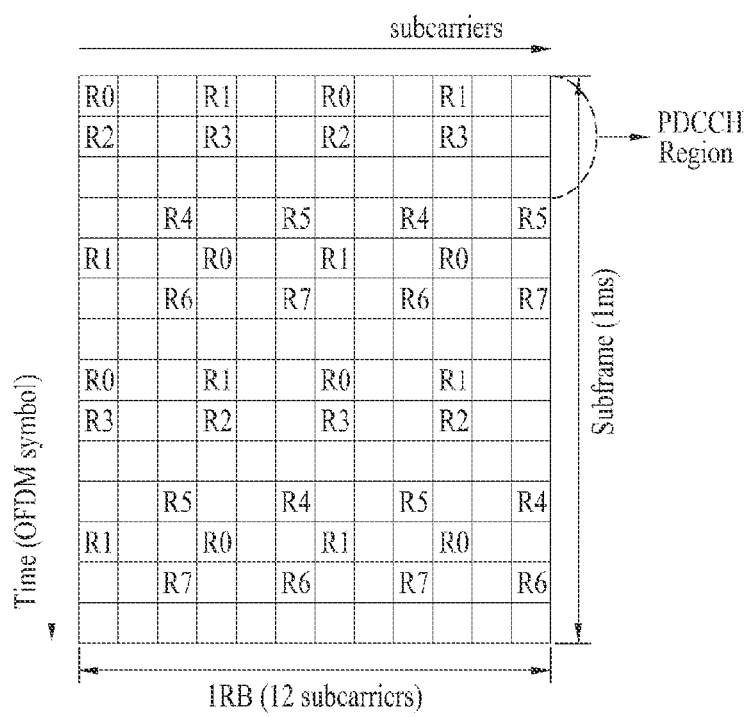

FIG. 94 illustrates a pilot structure according to an embodiment of the present invention. FIG. 95 and FIG. 96 illustrate structures cyclically shifting R4 to R7 within the pilot structure of FIG. 94 along a subcarrier direction or along an OFDM symbol direction. More specifically, FIG. 95 illustrates a pilot structure shifting R4 to R7 by as much as m=1, in the pilot structure of FIG. 94, and FIG. 96 illustrates a pilot structure shifting R4 to R7 by as much as m=2, in the pilot structure of FIG. 94.

Figure 97:
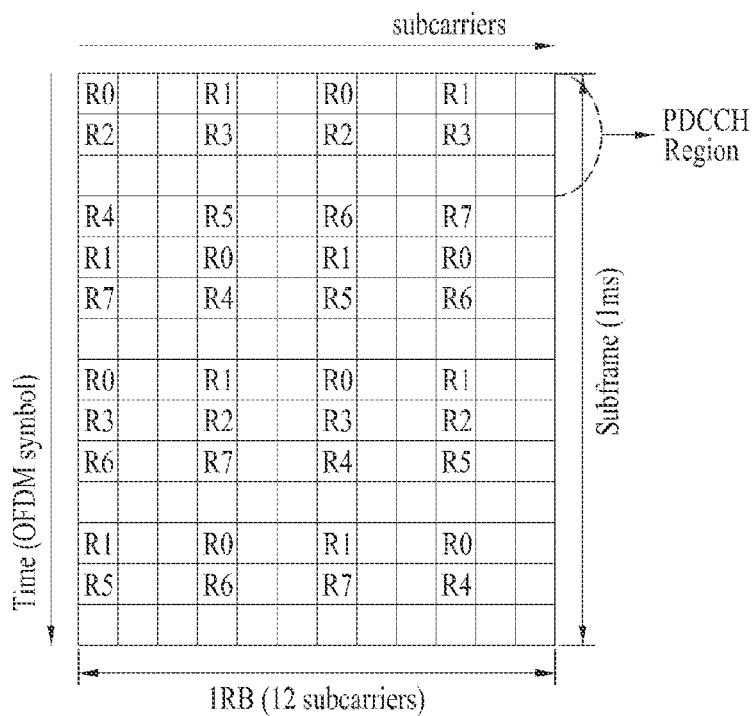
FIG. 97 and FIG. 98 illustrate pilot structures according to an embodiment of the present invention.
Figure 98:
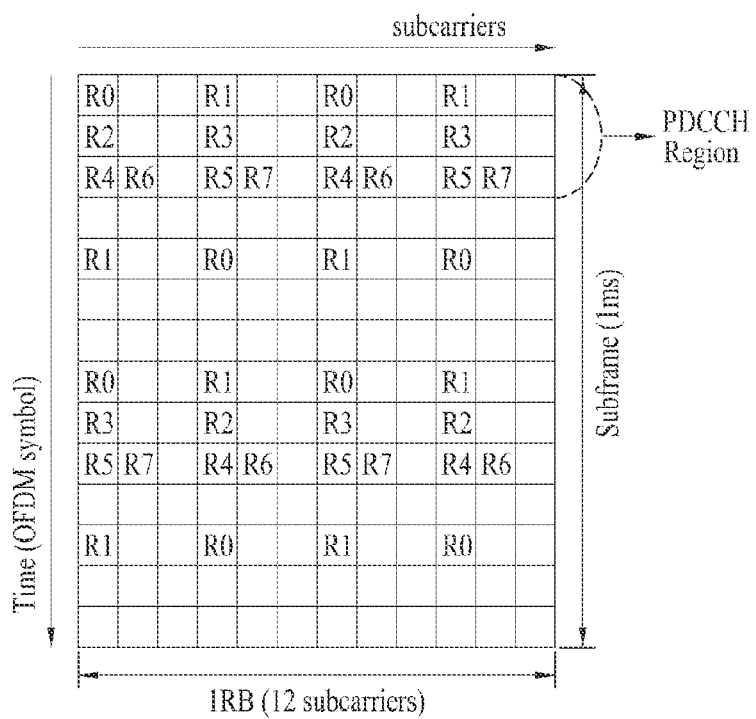

FIG. 97 and FIG. 98 illustrate pilot structures according to an embodiment of the present invention. It is possible to configure a pilot pattern just as the pilot structures shown in FIG. 97 and FIG. 98.

Pilot structures may be diversely designed, and the pilot structure may be designed by using the method described below.

Figure 99:
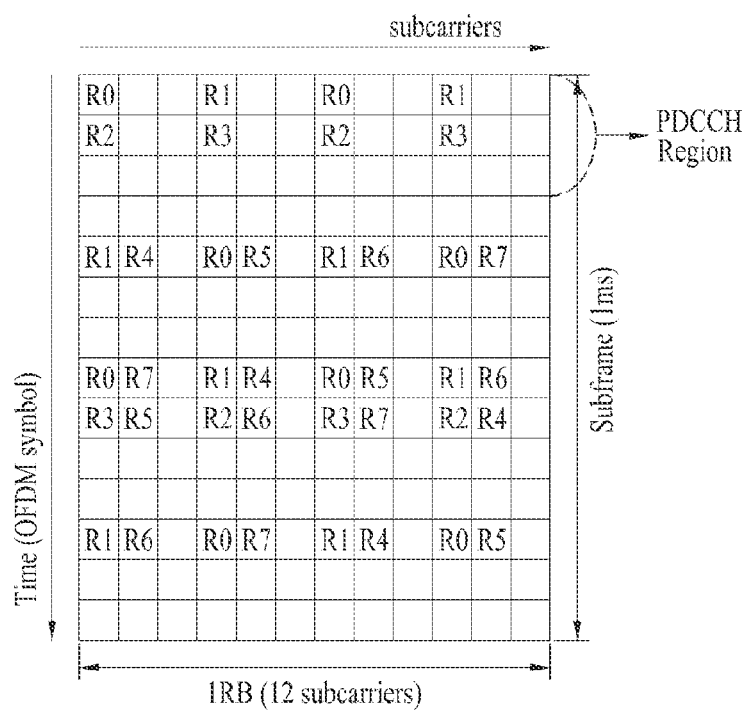
FIG. 99 illustrates a pilot structure according to an embodiment of the present invention.
Figure 100:
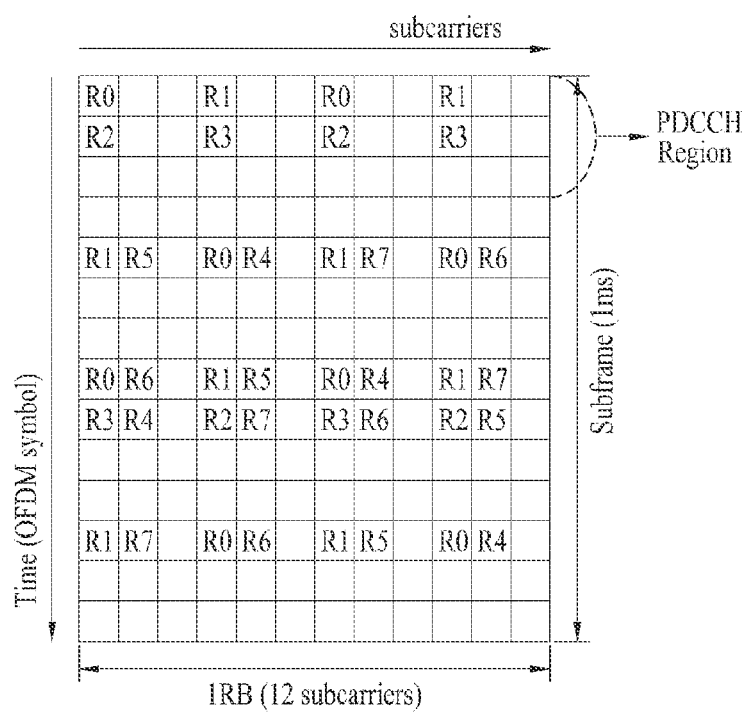
FIG. 100 to FIG. 106 illustrate structures cyclically shifting R4 to R7 within the pilot structure of FIG. 99 in accordance with a predetermined rule.
Figure 101:
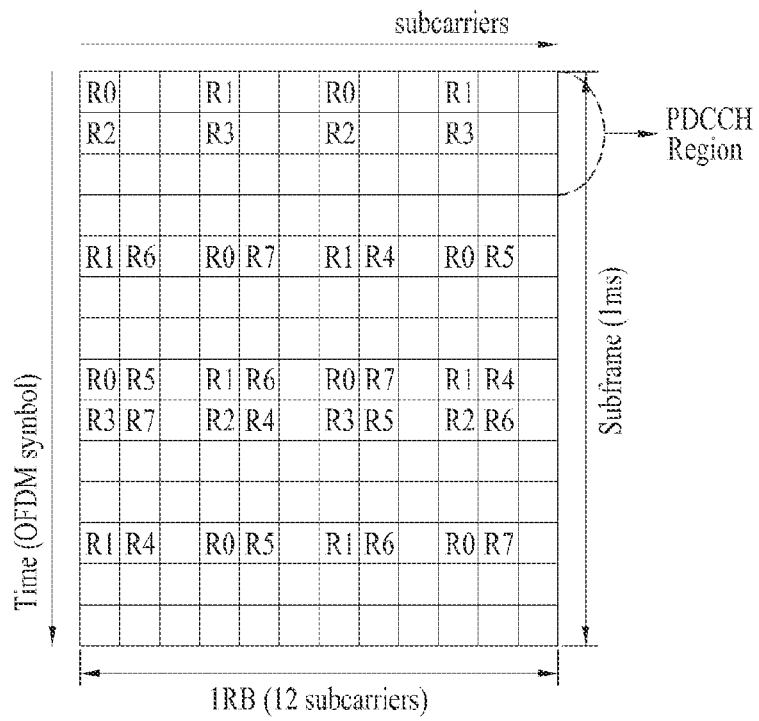
Figure 102:
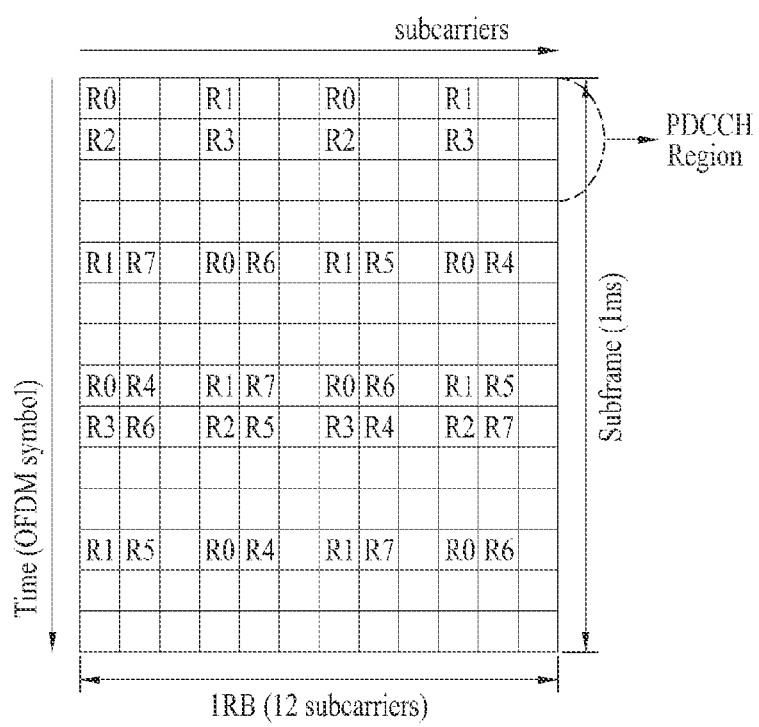

FIG. 99 illustrates a pilot structure according to an embodiment of the present invention. FIG. 100 to FIG. 106 illustrate structures cyclically shifting R4 to R7 within the pilot structure of FIG. 99 in accordance with a predetermined rule. More specifically, the pilot structure of FIG. 100 corresponds to a pilot structure having the positions of R4 and R5 inter-shifted to and from one another and having the positions of R6 and R7 inter-shifted to and from one another, in the pilot structure of FIG. 99. FIG. 101 illustrates a pilot structure having the positions of R4 and R6 inter-shifted to and from one another and having the positions of R5 and R7 inter-shifted to and from one another, in the pilot structure of FIG. 99. Also, FIG. 102 illustrates a pilot structure having the positions of R4 and R7 inter-shifted to and from one another and having the positions of R5 and R6 inter-shifted to and from one another, in the pilot structure of FIG. 99.

Figure 103:
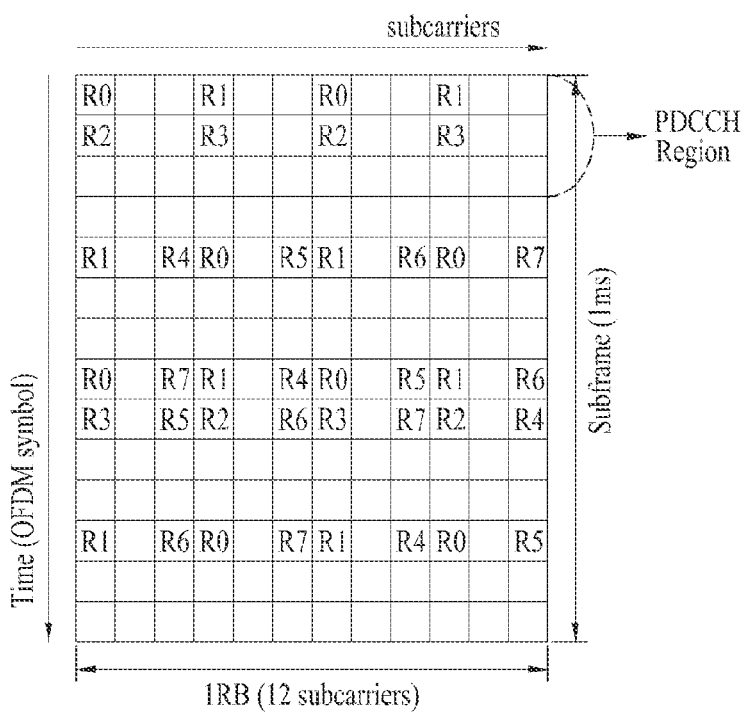
Figure 104:
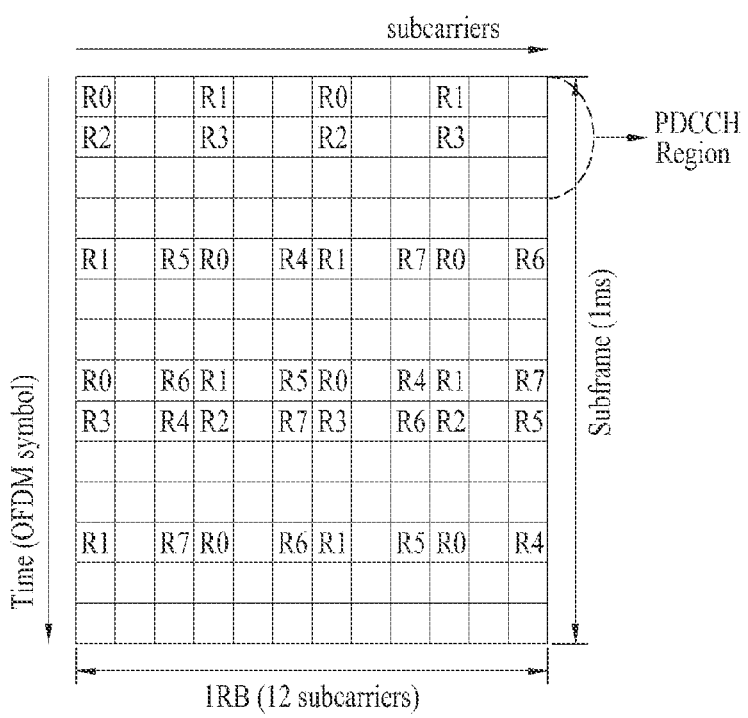
Figure 105:
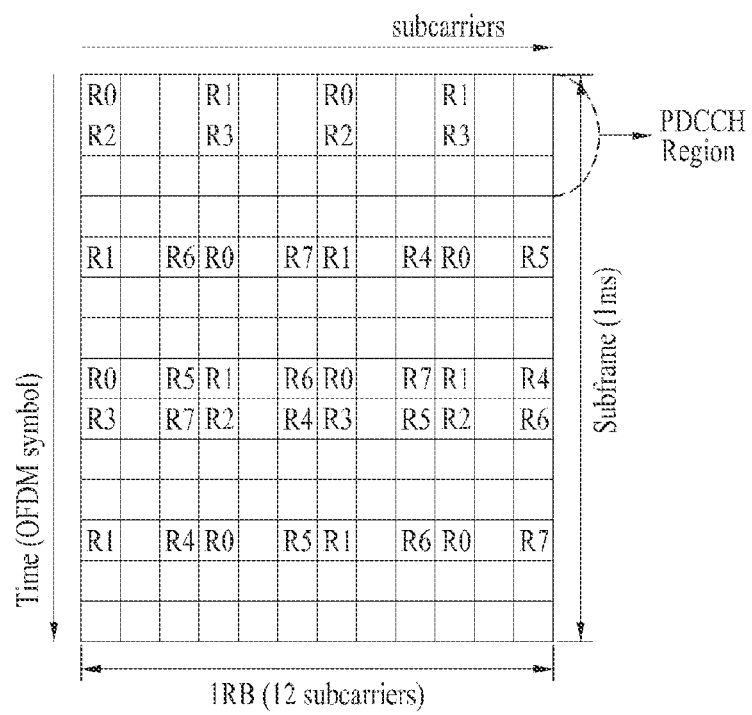
Figure 106:
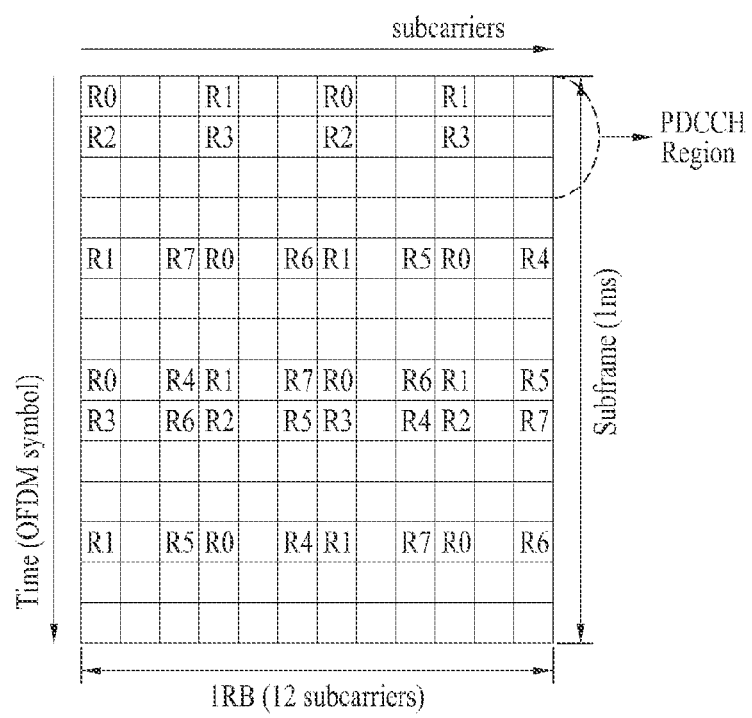

Meanwhile, FIG. 103 illustrates a pilot structure shifting R4 to R7 by as much as m=1, in the pilot structure of FIG. 99. The pilot structure of FIG. 104 corresponds to a pilot structure having the positions of R4 and R5 inter-shifted to and from one another and having the positions of R6 and R7 inter-shifted to and from one another, in the pilot structure of FIG. 103. FIG. 105 illustrates a pilot structure having the positions of R4 and R6 inter-shifted to and from one another and having the positions of R5 and R7 inter-shifted to and from one another, in the pilot structure of FIG. 103. Furthermore, FIG. 106 illustrates a pilot structure having the positions of R4 and R7 inter-shifted to and from one another and having the positions of R5 and R6 inter-shifted to and from one another, in the pilot structure of FIG. 103.

A user equipment receiving transmitted pilot symbols, which are designed by using the above-described method, uses the received pilot symbols to obtain channel information between the base station and the user equipment, so as to feedback the channel information to the base station.

Figure 107:
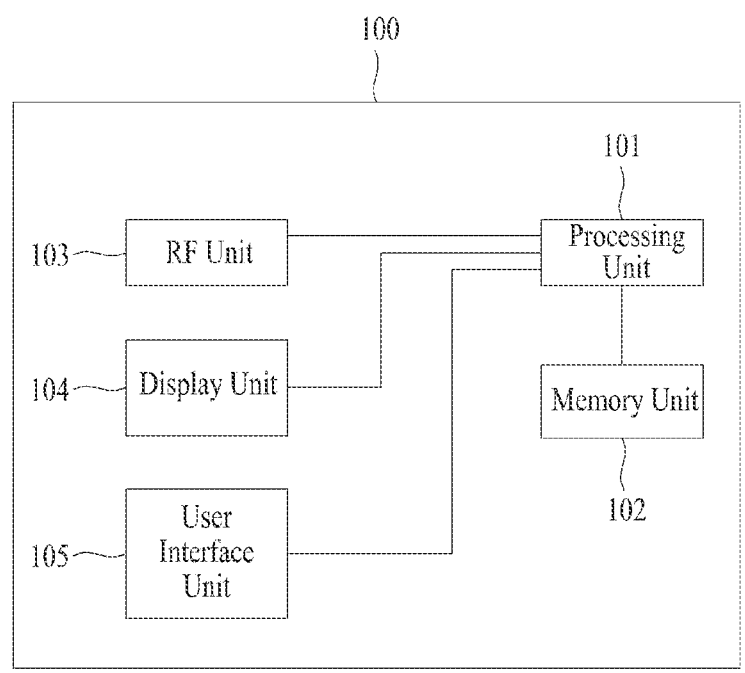
FIG. 107 illustrates a block view showing the structure of a device that can be applied to a base station and a user equipment and that can perform the above-described method.

FIG. 107 illustrates a block view showing the structure of a device that can be applied to a base station and a user equipment and that can perform the above-described method. As shown in FIG. 107, a device (100) includes a processing unit (101), a memory unit (102), an RF (Radio Frequency) unit (103), a display unit (1044), and a user interface unit (105). A layer of a physical interface protocol is performed in the processing unit (101). And, the processing unit (101) provides a control plane and a user plane. The function of each layer is performed by the processing unit (101). The memory unit (102) is electrically connected to the processing unit (011) and stores an operating system, applications, and general files. If the device (100) corresponds to a user equipment, the display unit (104) may display diverse information. And, the display unit (104) may be realized by using as LCD (Liquid Crystal Display), OLED (Organic Light Emitting Diode) as disclosed herein. The user interface unit (105) may be configured by being combined with any one of the disclosed user interfaces, such as a keypad, a touch screen, and so on. RF unit (103) is electrically connected to the processing unit (101) and either transmits or receives radio signals.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

In the present invention, the term User Equipment (UE) may be replaced with the terms MS (Mobile Station), SS (Subscriber Station), MSS (Mobile Subscriber Station), or Mobile Terminal, and so on.

Meanwhile, Meanwhile, PDAs (Personal Digital Assistants), cellular phones, PCS (Personal Communication Service) phones, GSM (Global System for Mobile) phones, WCDMA (Wideband CDMA) phones, MBS (Mobile Broadband System) phones may be used as the user equipment of the present invention.

MODE FOR CARRYING OUT THE PRESENT INVENTION

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

It will be apparent to those skilled in the art that various modifications and variations can be made in the present invention without departing from the technical and essential spirit or scope of the invention. Therefore, the detailed description of the present invention should not be interpreted as limiting in all aspects of the present invention, but should be considered as exemplary. The scope of the appended claims of the present invention shall be decided based upon rational interpretation, and all modifications within the scope of the appended claims and their equivalents will be included in the scope of the present invention. Furthermore, claims that do not have any explicit citations within the scope of the claims of the present invention may either be combined to configure another embodiment of the present invention, or new claims may be added during the amendment of the present invention after the filing for the patent application of the present invention.

INDUSTRIAL APPLICABILITY

The present invention may be used in a mobile station, base station, or other equipments of a wireless mobile communication system.

What is claimed is:

1. A method for transmitting, by a base station (BS), pilot signals in a downlink multiple input multiple output (MIMO) system the method comprising:

mapping, by the BS which includes 'N' transmit antennas 0 to N−1 for transmission of cell-specific pilot symbols $R_0$ to $R_{N-1}$ and 'M-N' transmit antennas N to M−1 for transmission of user-specific pilot symbols $R_N$ to $R_{M-1}$, where M>N, the user-specific pilot symbols $R_N$ to $R_{M-1}$ for channel measurement to a resource block (RB) in a downlink subframe;

broadcasting, by the BS, RB information indicating a position of the RB to which the user-specific pilot symbols $R_N$ to $R_{M-1}$ are mapped; and transmitting the cell-specific pilot symbols $R_0$ to $R_{N-1}$ and the user-specific pilot symbols $R_N$ to $R_{M-1}$ in the downlink subframe, wherein the downlink subframe includes a plurality of orthogonal frequency division multiplexing (OFDM) symbols in a time axis and a plurality of RBs in a frequency axis, wherein the user-specific pilot symbols $R_N$ to $R_{M-1}$ are dedicated to a second UE supporting up to the 'M' transmit antennas of the BS and transmitted only on the RB through the transmit antennas N to M−1 when the RB is assigned to the second UE, where $R_i$ is a user-specific pilot symbol transmitted through a transmit antenna i, wherein i is an integer that is one of N to M−1, wherein the cell-specific pilot symbols $R_0$ to $R_{N-1}$ are transmitted via the transmit antenna 0 to N−1 to a first user equipment (UE) supporting up to the 'N' transmit antennas of the BS and the second UE, where $R_j$ is a cell-specific pilot symbol transmitted via a transmit antenna j, wherein j is an integer that is one of 0 to N−1, wherein the user-specific pilot symbols $R_N$ to $R_{M-1}$ are dedicated to the second UE and transmitted only on the RB via the transmit antennas N to M−1 when the RB is assigned to the second UE, and wherein the RB information is broadcast to allow the first UE, as well as the second UE, to use the user-specific pilot symbols $R_N$ to $R_{M-1}$ for channel measurement.

2. The method of claim 1, wherein the RB information is broadcast via a physical downlink control channel (PDCCH) that is masked with a predefined user ID known to the first and second UEs or via a PDCCH that is configured with a predefined number of control channel elements in a predefined position known to the first and second UEs.

3. The method of claim 1, wherein 'N' is equal to 4, and 'M' is equal to 8.

4. The method of claim 3, wherein the user-specific pilot symbols $R_N$ to $R_{M-1}$ are transmitted on the RB according to the following table 1 or a cyclic-shift table produced by cyclically shifting '$R_4$' to '$R_7$' of the following table 1 in accordance with at least the time axis or the frequency axis:

TABLE 1

| | first slot | | | | | | | second slot | | | | | | |
|---|---|---|---|---|---|---|---|---|---|---|---|---|---|---|
| | l=0 | l=1 | l=2 | l=3 | l=4 | l=5 | l=6 | l=0 | l=1 | l=2 | l=3 | l=4 | l=5 | l=6 |
| k=11 | | | | | | | | | | | | | | |
| k=10 | | | | | | | | | | | | | | |
| k=9 | R1 | R3 | | | R0 | R5 | | R1 | R2 | | | R0 | R7 | |
| k=8 | | | | | | | | | | | | | | |
| k=7 | | | | | | | | | | | | | | |
| k=6 | R0 | R2 | | | R1 | R4 | | R0 | R3 | | | R1 | R6 | |
| k=5 | | | | | | | | | | | | | | |
| k=4 | | | | | | | | | | | | | | |
| k=3 | R1 | R3 | | | R0 | R5 | | R1 | R2 | | | R0 | R7 | |
| k=2 | | | | | | | | | | | | | | |
| k=1 | | | | | | | | | | | | | | |
| k=0 | R0 | R2 | | | R1 | R4 | | R0 | R3 | | | R1 | R6, | | where 'k' indicates a subcarrier index in the RB, '/' indicates an OFDM symbol index in a slot of the downlink subframe, '$R0$' to '$R3$' respectively indicates positions for the cell-specific pilot symbols $R_0$ to $R_{N-1}$, and '$R4$' to '$R7$' respectively indicate positions for the user-specific pilot symbols $R_N$ to $R_{M-1}$.

5. The method of claim 3, wherein the user-specific pilot symbols $R_N$ to $R_{M-1}$ are transmitted on the RB according to the following table 2 or a cyclic-shift table produced by cyclically shifting '$R_4$' to '$R_7$' of the following table 2 in accordance with at least the time axis or the frequency axis:

TABLE 2

| | first slot | | | | | | | second slot | | | | | | |
|---|---|---|---|---|---|---|---|---|---|---|---|---|---|---|
| | l=0 | l=1 | l=2 | l=3 | l=4 | l=5 | l=6 | l=0 | l=1 | l=2 | l=3 | l=4 | l=5 | l=6 |
| k=11 | | | | | | | | | | | | | | |
| k=10 | | | | | | | | | | | | | | |
| k=9 | R1 | R3 | | | R0 | R7 | | R1 | R2 | | | R0 | | |
| k=8 | | | | | | | | | | | | | | |
| k=7 | | | | | | | | | | | | | | |
| k=6 | R0 | R2 | | | R1 | R6 | | R0 | R3 | | | R1 | | |
| k=5 | | | | | | | | | | | | | | |
| k=4 | | | | | | | | | | | | | | |
| k=3 | R1 | R3 | | | R0 | R5 | | R1 | R2 | | | R0 | | |
| k=2 | | | | | | | | | | | | | | |

TABLE 2-continued

| | first slot | | | | | | | second slot | | | | | | |
|---|---|---|---|---|---|---|---|---|---|---|---|---|---|---|
| | l = 0 | l = 1 | l = 2 | l = 3 | l = 4 | l = 5 | l = 6 | l = 0 | l = 1 | l = 2 | l = 3 | l = 4 | l = 5 | l = 6 |
| k = 1 | | | | | | | | | | | | | | |
| k = 0 | R0 | R2 | | | R1 | R4 | | R0 | R3 | | | R1 | | , | where 'k' indicates a subcarrier index in the RB, '/' indicates an OFDM symbol index in a slot of the downlink subframe, 'R0' to 'R3' respectively indicates positions for the cell-specific pilot symbols $R_0$ to $R_{N-1}$, and 'R4' to 'R7' respectively indicate positions for the user-specific pilot symbols $R_N$ to $R_{M-1}$.

6. The method of claim 3, wherein the user-specific pilot symbols $R_N$ to $R_{M-1}$ are transmitted on the RB according to the following table 3 or a cyclic-shift table produced by cyclically shifting '$R_4$' to '$R_7$' of the following table 3 in accordance with at least the time axis or the frequency axis:

TABLE 3

| | first slot | | | | | | | second slot | | | | | | |
|---|---|---|---|---|---|---|---|---|---|---|---|---|---|---|
| | l = 0 | l = 1 | l = 2 | l = 3 | l = 4 | l = 5 | l = 6 | l = 0 | l = 1 | l = 2 | l = 3 | l = 4 | l = 5 | l = 6 |
| k = 11 | | | | | | | | | | | | | | |
| k = 10 | | | | | | | | | | | | | | |
| k = 9 | R1 | R3 | R5 | R7 | R0 | | | R1 | R2 | R4 | R6 | R0 | | |
| k = 8 | | | | | | | | | | | | | | |
| k = 7 | | | | | | | | | | | | | | |
| k = 6 | R0 | R2 | R4 | R6 | R1 | | | R0 | R3 | R6 | R7 | R1 | | |
| k = 5 | | | | | | | | | | | | | | |
| k = 4 | | | | | | | | | | | | | | |
| k = 3 | R1 | R3 | R5 | R7 | R0 | | | R1 | R2 | R4 | R6 | R0 | | |
| k = 2 | | | | | | | | | | | | | | |
| k = 1 | | | | | | | | | | | | | | |
| k = 0 | R0 | R2 | R4 | R6 | R1 | | | R0 | R3 | R5 | R7 | R1 | | , | where 'k' indicates a subcarrier index in the RB, '/' indicates an OFDM symbol index in a slot of the downlink subframe, 'R0' to 'R3' respectively indicates positions for the cell-specific pilot symbols $R_0$ to $R_{N-1}$, and 'R4' to 'R7' respectively indicate positions for the user-specific pilot symbols $R_N$ to $R_{M-1}$.

7. The method of claim 3, wherein the user-specific pilot symbols $R_N$ to $R_{M-1}$ are transmitted on the RB according to the following table 4 or a cyclic-shift table produced by cyclically shifting '$R_4$' to '$R_7$' of the following table 4 in accordance with at least the time axis or the frequency axis:

where 'k' indicates a subcarrier index in the RB, '/' indicates an OFDM symbol index in a slot of the downlink subframe, 'R0' to 'R3' respectively indicates positions for the cell-specific pilot symbols $R_0$ to $R_{N-1}$, and 'R4' to 'R7' respectively indicate positions for the user-specific pilot symbols $R_N$ to $R_{M-1}$.

8. The method of claim 3, wherein the user-specific pilot symbols $R_N$ to $R_{M-1}$ are transmitted on the RB according to the following table 5 or a cyclic-shift table produced by cyclically shifting '$R_4$' to '$R_7$' of the following table 5 in accordance with at least the time axis or the frequency axis:

TABLE 4

| | first slot | | | | | | | second slot | | | | | | |
|---|---|---|---|---|---|---|---|---|---|---|---|---|---|---|
| | l = 0 | l = 1 | l = 2 | l = 3 | l = 4 | l = 5 | l = 6 | l = 0 | l = 1 | l = 2 | l = 3 | l = 4 | l = 5 | l = 6 |
| k = 11 | | | | | | | | | | | | | | |
| k = 10 | | | | R7 | | | | | | | R6 | | | |
| k = 9 | R1 | R3 | | R5 | R0 | | | R1 | R2 | | R4 | R0 | | |
| k = 8 | | | | | | | | | | | | | | |
| k = 7 | | | | R6 | | | | | | | R7 | | | |
| k = 6 | R0 | R2 | | R4 | R1 | | | R0 | R3 | | R5 | R1 | | |
| k = 5 | | | | | | | | | | | | | | |
| k = 4 | | | | R7 | | | | | | | R6 | | | |
| k = 3 | R1 | R3 | | R5 | R0 | | | R1 | R2 | | R4 | R0 | | |
| k = 2 | | | | | | | | | | | | | | |
| k = 1 | | | | R6 | | | | | | | R7 | | | |
| k = 0 | R0 | R2 | | R4 | R1 | | | R0 | R3 | | R5 | R1 | | , |

TABLE 5

| | first slot | | | | | | | second slot | | | | | | |
|---|---|---|---|---|---|---|---|---|---|---|---|---|---|---|
| | l = 0 | l = 1 | l = 2 | l = 3 | l = 4 | l = 5 | l = 6 | l = 0 | l = 1 | l = 2 | l = 3 | l = 4 | l = 5 | l = 6 |
| k = 11 | | | | | | | | | | | | | | |
| k = 10 | | | | R5 | | R7 | | | | | R4 | | R6 | |
| k = 9 | R1 | R3 | | | R0 | | | R1 | R2 | | | R0 | | |
| k = 8 | | | | | | | | | | | | | | |
| k = 7 | | | | R4 | | R6 | | | | | R5 | | R7 | |
| k = 6 | R0 | R2 | | | R1 | | | R0 | R3 | | | R1 | | |
| k = 5 | | | | | | | | | | | | | | |
| k = 4 | | | | R5 | | R7 | | | | | R4 | | R6 | |
| k = 3 | R1 | R3 | | | R0 | | | R1 | R2 | | | R0 | | |
| k = 2 | | | | | | | | | | | | | | |
| k = 1 | | | | R4 | | R6 | | | | | R5 | | R7, | |
| k = 0 | R0 | R2 | | | R1 | | | R0 | R3 | | | R1 | | | where 'k' indicates a subcarrier index in the RB, 'l' indicates an OFDM symbol index in a slot of the downlink subframe, 'R0' to 'R3' respectively indicates positions for the cell-specific pilot symbols $R_0$ to $R_{N-1}$, and 'R4' to 'R7' respectively indicate positions for the user-specific pilot symbols $R_N$ to $R_{M-1}$.

9. The method of claim 3, wherein the user-specific pilot symbols $R_N$ to $R_{M-1}$ are transmitted on the RB according to the following table 6 or a cyclic-shift table produced by cyclically shifting 'R4' to 'R7' of the following table 6 in accordance with at least the time axis or the frequency axis:

TABLE 6

| | first slot | | | | | | | second slot | | | | | | |
|---|---|---|---|---|---|---|---|---|---|---|---|---|---|---|
| | l = 0 | l = 1 | l = 2 | l = 3 | l = 4 | l = 5 | l = 6 | l = 0 | l = 1 | l = 2 | l = 3 | l = 4 | l = 5 | l = 6 |
| k = 11 | | | | | | | | | | | | | | |
| k = 10 | | | | | | | | | | | | | | |
| k = 9 | R1 | R3 | | R7 | R0 | R6 | | R1 | R2 | R5 | | R0 | R4 | |
| k = 8 | | | | | | | | | | | | | | |
| k = 7 | | | | | | | | | | | | | | |
| k = 6 | R0 | R2 | | R6 | R1 | R5 | | R0 | R3 | R4 | | R1 | R7 | |
| k = 5 | | | | | | | | | | | | | | |
| k = 4 | | | | | | | | | | | | | | |
| k = 3 | R1 | R3 | | R5 | R0 | R4 | | R1 | R2 | R7 | | R0 | R6 | |
| k = 2 | | | | | | | | | | | | | | |
| k = 1 | | | | | | | | | | | | | | |
| k = 0 | R0 | R2 | | R4 | R1 | R7 | | R0 | R3 | R6 | | R1 | R5, | | where 'k' indicates a subcarrier index in the RB, 'l' indicates an OFDM symbol index in a slot of the downlink subframe, 'R0' to 'R3' respectively indicates positions for the cell-specific pilot symbols $R_0$ to $R_{N-1}$, and 'R4' to 'R7' respectively indicate positions for the user-specific pilot symbols $R_N$ to $R_{M-1}$.

10. A method for receiving, by a user equipment (UE), pilot signals in a multiple input multiple output (MIMO) system the method comprising:

receiving broadcast resource block (RB) information indicating a position of an RB, to which user-specific pilot symbols $R_N$ to $R_{M-1}$ are mapped, from a base station (BS) that includes 'N' transmit antennas 0 to N−1 for transmission of cell-specific pilot symbols $R_0$ to $R_{N-1}$ and 'M-N' transmit antennas N to M−1 for transmission of the user-specific pilot symbols $R_N$ to $R_{M-1}$, where M>N;

receiving the cell-specific pilot symbols $R_0$ to $R_{N-1}$ and the user-specific pilot symbols $R_N$ to $R_{M-1}$ in a downlink subframe; and feeding back channel information indicating a channel status between the BS and the UE by using the cell-specific pilot symbols $R_0$ to $R_{N-1}$ and the user-specific pilot symbols $R_N$ to $R_{M-1}$ regardless of whether the UE is a first UE supporting up to the 'N' transmit antennas of the BS or a second UE supporting up to the 'M' transmit antennas of the BS, wherein the cell-specific pilot symbols $R_0$ to $R_{N-1}$ are common to the first and second UEs, and wherein the user-specific pilot symbols $R_N$ to $R_{M-1}$ are dedicated to the second UE and received only on the RB when the RB is assigned to the second UE.

11. The method of claim 10, wherein the broadcast RB information is received via a physical downlink control channel (PDCCH) masked with a predefined user ID known to the first and second UEs or via a PDCCH configured with a predefined number of control channel elements in a predefined position known to the first and second UEs.

12. The method of claim 10, wherein 'N' is equal to 4, and 'M' is equal to 8.

13. The method of claim 12, wherein the user-specific pilot symbols $R_N$ to $R_{M-1}$ are received on the RB according to the following table 1 or a cyclic-shift table produced by cyclically shifting 'R4' to 'R7' of the following table 1 in accordance with at least the time axis or the frequency axis:

TABLE 1

| | first slot | | | | | | | second slot | | | | | | |
|---|---|---|---|---|---|---|---|---|---|---|---|---|---|---|
| | l = 0 | l = 1 | l = 2 | l = 3 | l = 4 | l = 5 | l = 6 | l = 0 | l = 1 | l = 2 | l = 3 | l = 4 | l = 5 | l = 6 |
| k = 11 | | | | | | | | | | | | | | |
| k = 10 | | | | | | | | | | | | | | |
| k = 9 | R1 | R3 | | | R0 | R5 | | R1 | R2 | | | R0 | R7 | |
| k = 8 | | | | | | | | | | | | | | |
| k = 7 | | | | | | | | | | | | | | |
| k = 6 | R0 | R2 | | | R1 | R4 | | R0 | R3 | | | R1 | R6 | |
| k = 5 | | | | | | | | | | | | | | |
| k = 4 | | | | | | | | | | | | | | |
| k = 3 | R1 | R3 | | | R0 | R5 | | R1 | R2 | | | R0 | R7 | |
| k = 2 | | | | | | | | | | | | | | |
| k = 1 | | | | | | | | | | | | | | |
| k = 0 | R0 | R2 | | | R1 | R4 | | R0 | R3 | | | R1 | R6, | | where 'k' indicates a subcarrier index in the RB, '/' indicates an OFDM symbol index in a slot of the downlink subframe, 'R0' to 'R3' respectively indicates positions for the cell-specific pilot symbols $R_0$ to $R_{N-1}$, and 'R4' to 'R7' respectively indicate positions for the user-specific pilot symbols $R_N$ to $R_{M-1}$.

14. The method of claim 12, wherein the user-specific pilot symbols $R_N$ to $R_{M-1}$ are received on the RB according to the following table 2 or a cyclic-shift table produced by cyclically shifting 'R$_4$' to 'R$_7$' of the following table 2 in accordance with at least the time axis or the frequency axis:

where 'k' indicates a subcarrier index in the RB, '/' indicates an OFDM symbol index in a slot of the downlink subframe, 'R0' to 'R3' respectively indicates positions for the cell-specific pilot symbols $R_0$ to $R_{N-1}$, and 'R4' to 'R7' respectively indicate positions for the user-specific pilot symbols $R_N$ to $R_{M-1}$.

15. The method of claim 12, wherein the user-specific pilot symbols $R_N$ to $R_{M-1}$ are received on the RB according to the following table 3 or a cyclic-shift table produced by cyclically

TABLE 2

| | first slot | | | | | | | second slot | | | | | | |
|---|---|---|---|---|---|---|---|---|---|---|---|---|---|---|
| | l = 0 | l = 1 | l = 2 | l = 3 | l = 4 | l = 5 | l = 6 | l = 0 | l = 1 | l = 2 | l = 3 | l = 4 | l = 5 | l = 6 |
| k = 11 | | | | | | | | | | | | | | |
| k = 10 | | | | | | | | | | | | | | |
| k = 9 | R1 | R3 | | | R0 | R7 | | R1 | R2 | | | R0 | | |
| k = 8 | | | | | | | | | | | | | | |
| k = 7 | | | | | | | | | | | | | | |
| k = 6 | R0 | R2 | | | R1 | R6 | | R0 | R3 | | | R1 | | |
| k = 5 | | | | | | | | | | | | | | |
| k = 4 | | | | | | | | | | | | | | |
| k = 3 | R1 | R3 | | | R0 | R5 | | R1 | R2 | | | R0 | | |
| k = 2 | | | | | | | | | | | | | | |
| k = 1 | | | | | | | | | | | | | | |
| k = 0 | R0 | R2 | | | R1 | R4 | | R0 | R3 | | | R1, | | | shifting 'R$_4$' to 'R$_7$' of the following table 3 in accordance with at least the time axis or the frequency axis:

TABLE 3

| | first slot | | | | | | | second slot | | | | | | |
|---|---|---|---|---|---|---|---|---|---|---|---|---|---|---|
| | l = 0 | l = 1 | l = 2 | l = 3 | l = 4 | l = 5 | l = 6 | l = 0 | l = 1 | l = 2 | l = 3 | l = 4 | l = 5 | l = 6 |
| k = 11 | | | | | | | | | | | | | | |
| k = 10 | | | | | | | | | | | | | | |
| k = 9 | R1 | R3 | R5 | R7 | R0 | | | R1 | R2 | R4 | R6 | R0 | | |
| k = 8 | | | | | | | | | | | | | | |
| k = 7 | | | | | | | | | | | | | | |
| k = 6 | R0 | R2 | R4 | R6 | R1 | | | R0 | R3 | R6 | R7 | R1 | | |
| k = 5 | | | | | | | | | | | | | | |
| k = 4 | | | | | | | | | | | | | | |
| k = 3 | R1 | R3 | R5 | R7 | R0 | | | R1 | R2 | R4 | R6 | R0 | | |
| k = 2 | | | | | | | | | | | | | | |
| k = 1 | | | | | | | | | | | | | | |
| k = 0 | R0 | R2 | R4 | R6 | R1 | | | R0 | R3 | R5 | R7 | R1, | | | where 'k' indicates a subcarrier index in the RB, 'l' indicates an OFDM symbol index in a slot of the downlink subframe, 'R0' to 'R3' respectively indicates positions for the cell-specific pilot symbols $R_0$ to $R_{N-1}$, and 'R4' to 'R7' respectively indicate positions for the user-specific pilot symbols $R_N$ to $R_{M-1}$.

16. The method of claim 12, wherein the user-specific pilot symbols $R_N$ to $R_{M-1}$ are received on the RB according to the following table 4 or a cyclic-shift table produced by cyclically shifting 'R4' to 'R7' of the following table 4 in accordance with at least the time axis and the frequency axis:

TABLE 4

| | first slot | | | | | | | second slot | | | | | | |
|---|---|---|---|---|---|---|---|---|---|---|---|---|---|---|
| | l = 0 | l = 1 | l = 2 | l = 3 | l = 4 | l = 5 | l = 6 | l = 0 | l = 1 | l = 2 | l = 3 | l = 4 | l = 5 | l = 6 |
| k = 11 | | | | | | | | | | | | | | |
| k = 10 | | | | R7 | | | | | | | R6 | | | |
| k = 9 | R1 | R3 | | R5 | R0 | | | R1 | R2 | | R4 | R0 | | |
| k = 8 | | | | | | | | | | | | | | |
| k = 7 | | | | R6 | | | | | | | R7 | | | |
| k = 6 | R0 | R2 | | R4 | R1 | | | R0 | R3 | | R5 | R1 | | |
| k = 5 | | | | | | | | | | | | | | |
| k = 4 | | | | R7 | | | | | | | R6 | | | |
| k = 3 | R1 | R3 | | R5 | R0 | | | R1 | R2 | | R4 | R0 | | |
| k = 2 | | | | | | | | | | | | | | |
| k = 1 | | | | R6 | | | | | | | R7 | | | |
| k = 0 | R0 | R2 | | R4 | R1 | | | R0 | R3 | | R5 | R1, | | | where 'k' indicates a subcarrier index in the RB, 'l' indicates an OFDM symbol index in a slot of the downlink subframe, 'R0' to 'R3' respectively indicates positions for the cell-specific pilot symbols $R_0$ to $R_{N-1}$, and 'R4' to 'R7' respectively indicate positions for the user-specific pilot symbols $R_N$ to $R_{M-1}$.

17. The method of claim 12, wherein the user-specific pilot symbols $R_N$ to $R_{M-1}$ are received on the RB according to the following table 5 or a cyclic-shift table produced by cyclically shifting 'R4' to 'R7' of the following table 5 in accordance with at least the time axis or the frequency axis:

TABLE 5

| | first slot | | | | | | | second slot | | | | | | |
|---|---|---|---|---|---|---|---|---|---|---|---|---|---|---|
| | l = 0 | l = 1 | l = 2 | l = 3 | l = 4 | l = 5 | l = 6 | l = 0 | l = 1 | l = 2 | l = 3 | l = 4 | l = 5 | l = 6 |
| k = 11 | | | | | | | | | | | | | | |
| k = 10 | | | | R5 | | R7 | | | | | R4 | | R6 | |
| k = 9 | R1 | R3 | | | R0 | | | R1 | R2 | | | R0 | | |
| k = 8 | | | | | | | | | | | | | | |
| k = 7 | | | | R4 | | R6 | | | | | R5 | | R7 | |
| k = 6 | R0 | R2 | | | R1 | | | R0 | R3 | | | R1 | | |
| k = 5 | | | | | | | | | | | | | | |
| k = 4 | | | | R5 | | R7 | | | | | R4 | | R6 | |
| k = 3 | R1 | R3 | | | R0 | | | R1 | R2 | | | R0 | | |
| k = 2 | | | | | | | | | | | | | | |
| k = 1 | | | | R4 | | R6 | | | | | R5 | | R7, | |
| k = 0 | R0 | R2 | | | R1 | | | R0 | R3 | | | R1 | | | where 'k' indicates a subcarrier index in the RB, 'l' indicates an OFDM symbol index in a slot of the downlink subframe, 'R0' to 'R3' respectively indicates positions for the cell-specific pilot symbols $R_0$ to $R_{N-1}$, and 'R4' to 'R7' respectively indicate positions for the user-specific pilot symbols $R_N$ to $R_{M-1}$.

18. The method of claim 12, wherein the user-specific pilot symbols $R_N$ to $R_{M-1}$ are received on the RB according to the following table 6 or a cyclic-shift table produced by cyclically shifting 'R4' to 'R7' of the following table 6 in accordance with at least the time axis and the frequency axis:

TABLE 6

|  | first slot | | | | | | | second slot | | | | | | |
| --- | --- | --- | --- | --- | --- | --- | --- | --- | --- | --- | --- | --- | --- | --- |
|  | l = 0 | l = 1 | l = 2 | l = 3 | l = 4 | l = 5 | l = 6 | l = 0 | l = 1 | l = 2 | l = 3 | l = 4 | l = 5 | l = 6 |
| k = 11 | | | | | | | | | | | | | | |
| k = 10 | | | | | | | | | | | | | | |
| k = 9 | R1 | R3 | | R7 | R0 | R6 | | R1 | R2 | R5 | | R0 | R4 | |
| k = 8 | | | | | | | | | | | | | | |
| k = 7 | | | | | | | | | | | | | | |
| k = 6 | R0 | R2 | | R6 | R1 | R5 | | R0 | R3 | R4 | | R1 | R7 | |
| k = 5 | | | | | | | | | | | | | | |
| k = 4 | | | | | | | | | | | | | | |
| k = 3 | R1 | R3 | | R5 | R0 | R4 | | R1 | R2 | R7 | | R0 | R6 | |
| k = 2 | | | | | | | | | | | | | | |
| k = 1 | | | | | | | | | | | | | | |
| k = 0 | R0 | R2 | | R4 | R1 | R7 | | R0 | R3 | R6 | | R1 | R5, | | where 'k' indicates a subcarrier index in the RB, 'l' indicates an OFDM symbol index in a slot of the downlink subframe, 'R0' to 'R3' respectively indicates positions for the cell-specific pilot symbols $R_0$ to $R_{N-1}$, and 'R4' to 'R7' respectively indicate positions for the user-specific pilot symbols $R_N$ to $R_{M-1}$.

\* \* \* \* \*